United States Patent
Wehrung et al.

(10) Patent No.: US 6,853,876 B2
(45) Date of Patent: Feb. 8, 2005

(54) DISTRIBUTED CONTROL SYSTEM ARCHITECTURE AND METHOD FOR A MATERIAL TRANSPORT SYSTEM

(75) Inventors: Brian Wehrung, San Jose, CA (US); Clifford Holden, San Jose, CA (US)

(73) Assignee: Asyst Technologies, Inc., Fremont, CA (US)

( * ) Notice: Subject to any disclaimer, the term of this patent is extended or adjusted under 35 U.S.C. 154(b) by 333 days.

(21) Appl. No.: 09/825,619

(22) Filed: Apr. 3, 2001

(65) Prior Publication Data

US 2001/0023377 A1 Sep. 20, 2001

Related U.S. Application Data

(63) Continuation of application No. 09/212,002, filed on Dec. 14, 1998, now Pat. No. 6,240,335.

(51) Int. Cl.[7] .......................... B65G 37/00; B65G 43/10
(52) U.S. Cl. ...................... 700/230; 198/571; 198/575; 198/577
(58) Field of Search ................................. 700/230, 213; 198/369.1, 369.5, 460.1, 571, 572, 575, 577, 598, 781.06

(56) References Cited

U.S. PATENT DOCUMENTS

| | | | |
|---|---|---|---|
| 5,078,257 A | | 1/1992 | Carter, Jr. |
| 5,228,558 A | * | 7/1993 | Hall ........................... 198/784 |
| 5,577,596 A | * | 11/1996 | Van Essen .................. 198/349 |
| 6,039,316 A | | 3/2000 | Jackson et al. |
| 6,223,886 B1 | | 5/2001 | Bonora et al. |
| 6,240,335 B1 | | 5/2001 | Wehrung et al. |

OTHER PUBLICATIONS

C.L. Haines and L.D. Hyde, "Distributed Microprocessor Based Control Architecture for a Modular Conveyor System", IBM Technical Disclosure Bulletin, vol. 27, No. 9, Feb. 1985, 700/230.*

* cited by examiner

Primary Examiner—F. J. Bartuska
(74) Attorney, Agent, or Firm—O'Melveny & Myers LLP

(57) ABSTRACT

An automated transport system for use in a material handling system. The automated transport system employs a distributed control system including a top level controller (transport controller), a plurality of second-level controllers (control logic computers) and a plurality of third-level controllers (intelligent drivers). The transport controller (TC) receives material commands from a conventional material control system (MCS). The TC breaks the command into sub-commands directing selected control logic computers (CLCs) to acquire, move to a destination or otherwise interact with a particular container designated by the MCS command. The transport controller selects the CLCs based on the transport system topology, the content of the MCS command and knowledge of which regions of the transport system are controlled by respective CLCs. Each CLC implements the sub-commands by issuing to the intelligent drivers low level control commands to accelerate, elevate, rotate, load or unload the container. Each intelligent driver directly controls one of the electromechanical devices that compose the transport system hardware in accordance with these low level commands. The electromechanical devices can include rail sections (zones), directors, elevators, load port transfer devices and tag readers.

8 Claims, 50 Drawing Sheets

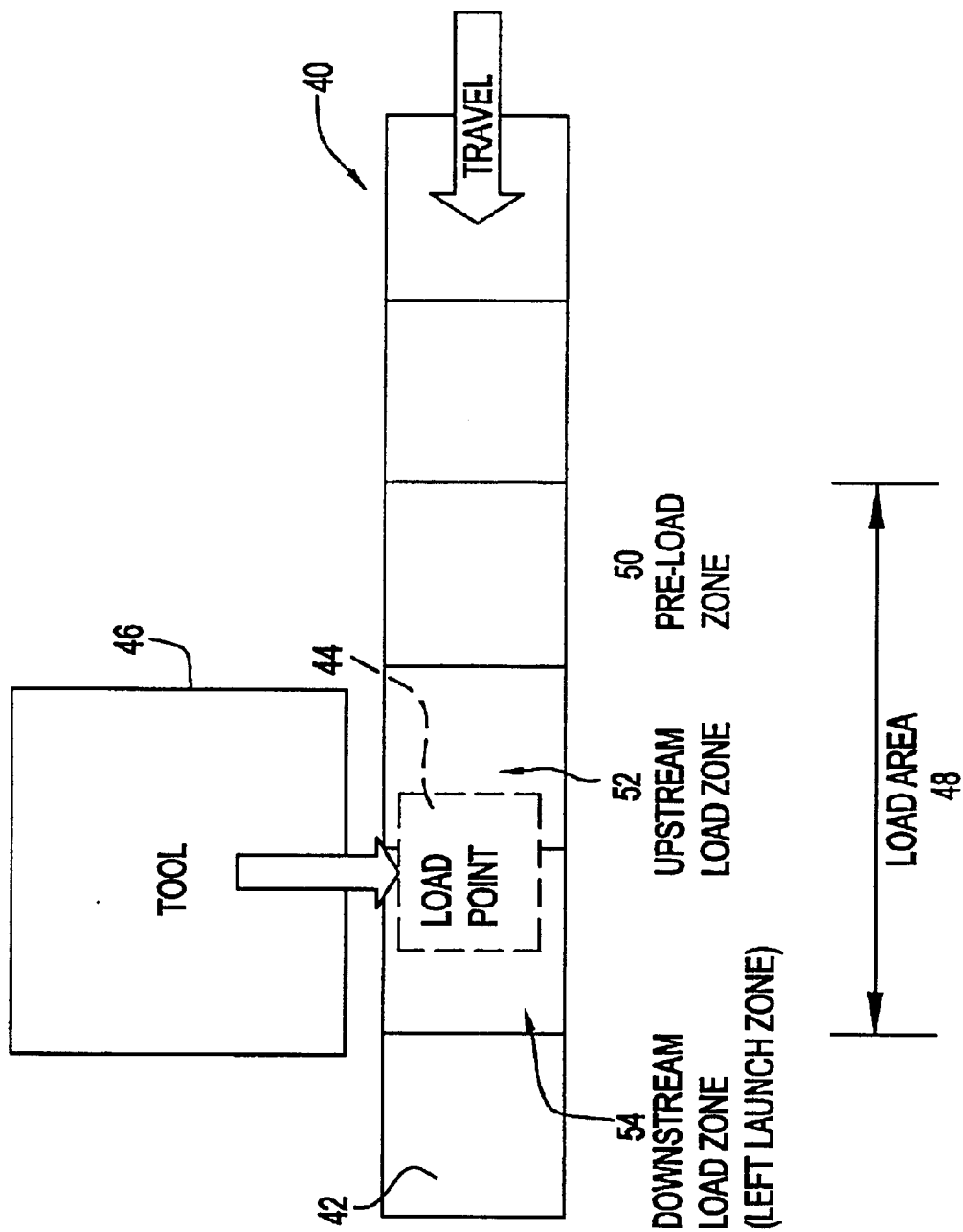

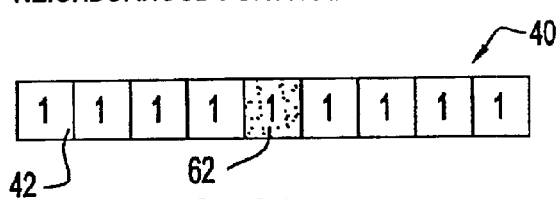
FIG. 3A NEIGHBORHOOD FOR A RAIL ZONE
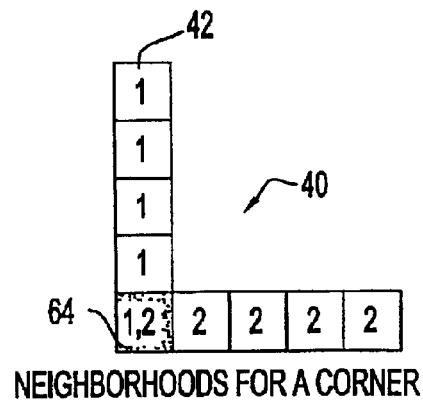
FIG. 3B NEIGHBORHOODS FOR A CORNER
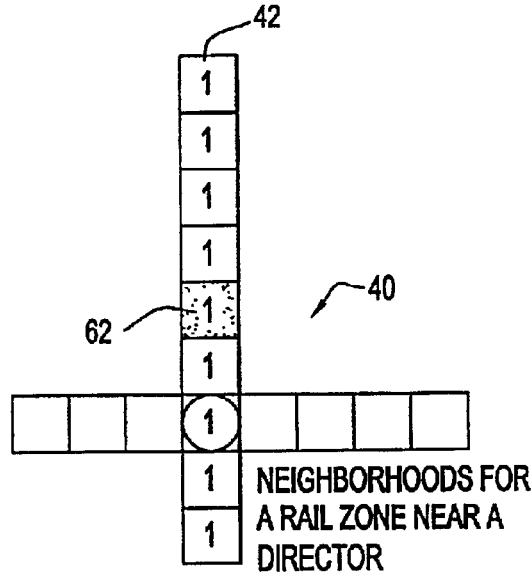
FIG. 3C NEIGHBORHOODS FOR A RAIL ZONE NEAR A DIRECTOR
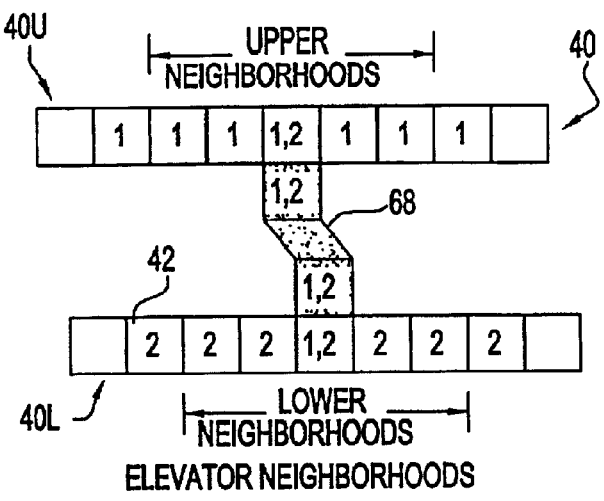
FIG. 3D ELEVATOR NEIGHBORHOODS
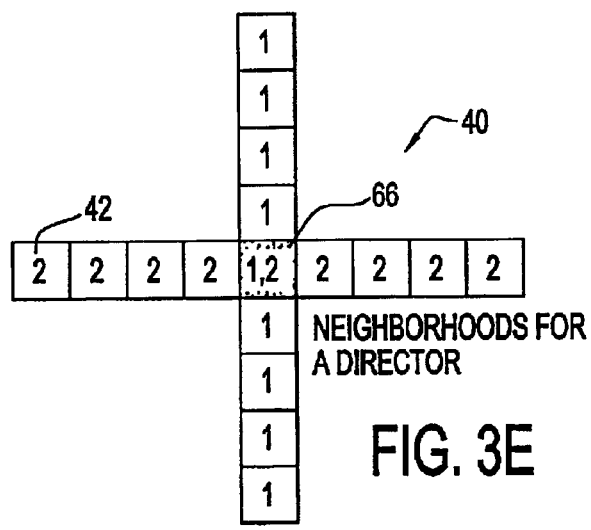
FIG. 3E NEIGHBORHOODS FOR A DIRECTOR

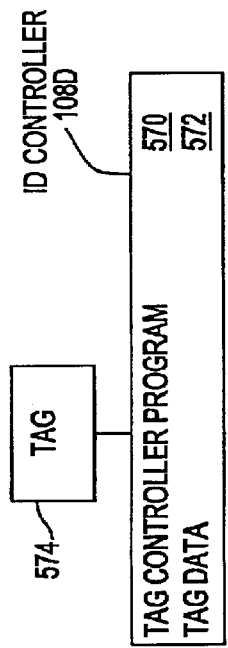
FIG. 9E
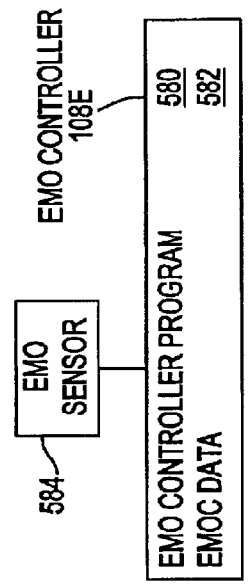
FIG. 9F
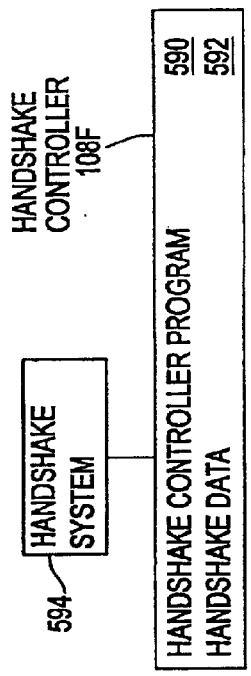
FIG. 9G
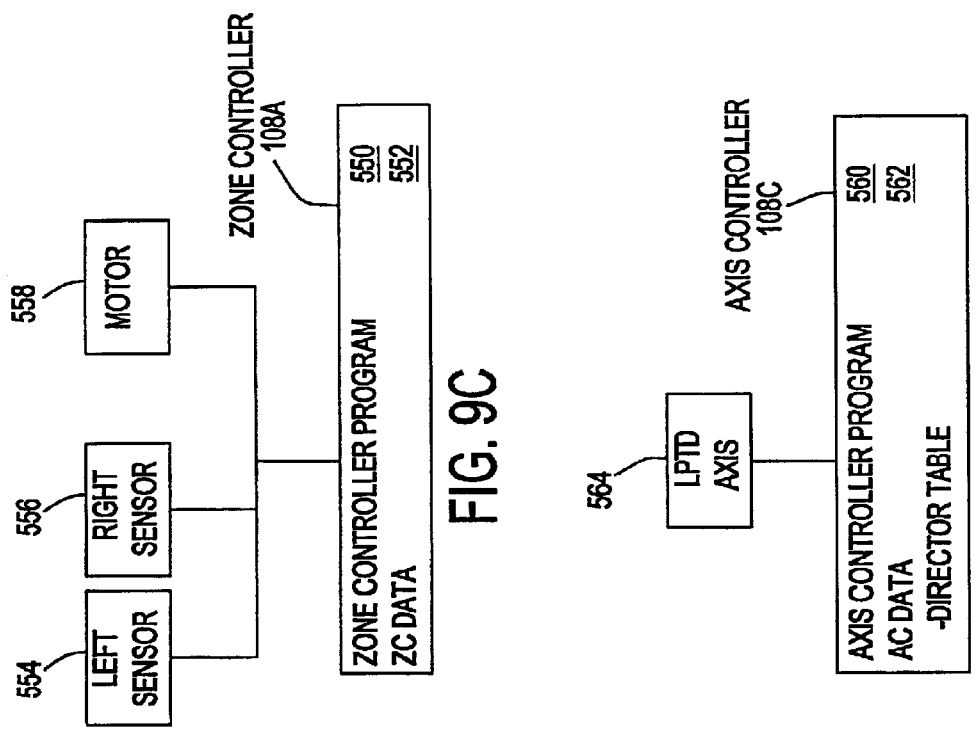
FIG. 9C
FIG. 9D

CONTINUED TO FIG. 22B

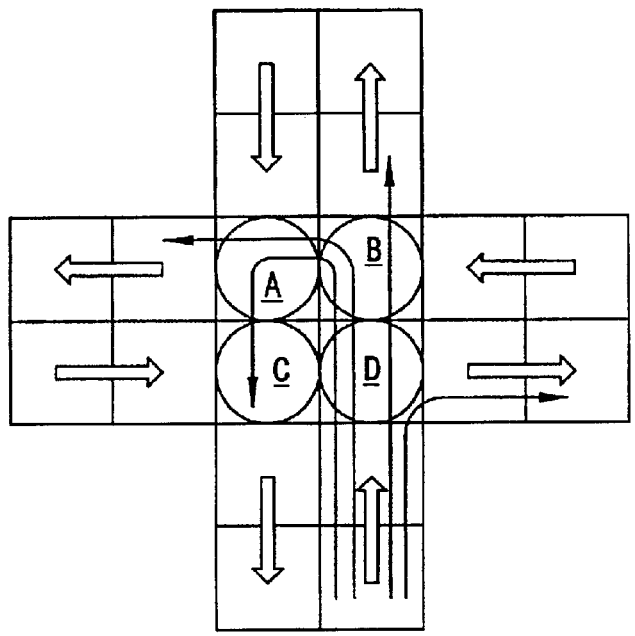
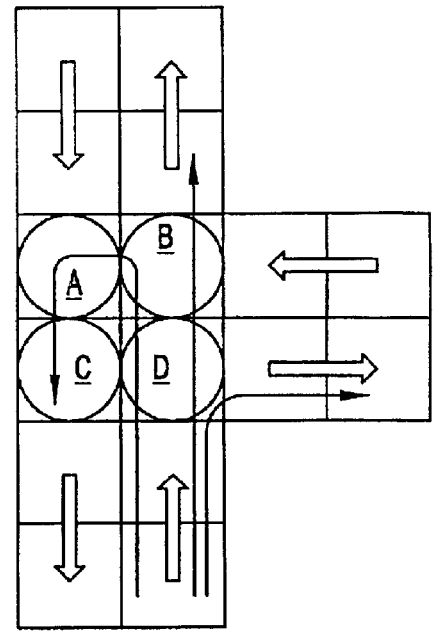
FIG. 33A          FIG. 33B
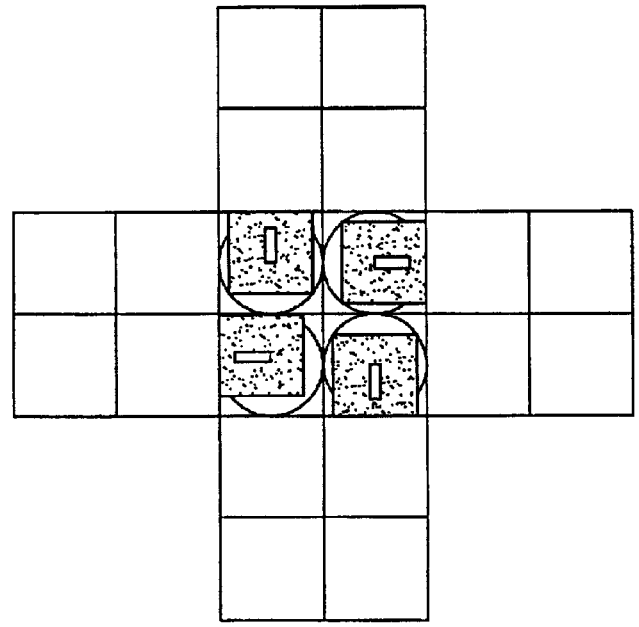
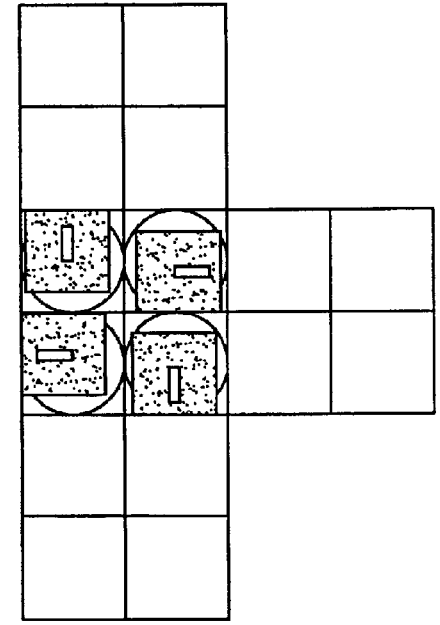
FIG. 33C          FIG. 33D

FAILED DIRECTOR:
EXAMPLE LAYOUT:

DISTRIBUTED CONTROL SYSTEM ARCHITECTURE AND METHOD FOR A MATERIAL TRANSPORT SYSTEM

This application is a continuation of U.S. patent application Ser. No. 09/212,002 filed Dec. 14, 1998 now U.S. Pat. No. 6,240,335.

The present invention relates generally to manufacturing control systems and, particularly, to control systems for use in material transport systems.

BACKGROUND OF THE INVENTION

Automated conveyor systems are used in a variety of applications to transport material. The material is typically loaded onto the conveyor using automated equipment which controls the flow of the material. Automated equipment is also used to remove the material at the exit point, with the conveyor and/or removal equipment being designed to allow several articles to accumulate near the contact point while preventing collisions between adjacent material units. With some applications, including semiconductor processing, the material must be temporarily moved from the conveyor to a work station at one or more locations along the conveyor path. The material is later returned to the conveyor, which then transports the material to the next work station or the exit point. Moving the material between the conveyor and work stations along the path can be complicated as care must be taken to ensure the transfer is accomplished without significantly interrupting the flow of material on the conveyor. A system for efficiently and conveniently transferring material between a conveyor system and a work station, without interfering with conveyor material flow, is desirable.

One example of a field in which material is temporarily removed from the conveyor at intermediate locations is the field of semiconductor processing. In this field, a conveyor may be used to transport semiconductor wafers or other substrates to several different processing machines or to transport reticles from a stocker to a stepper. The material (i.e., the wafers or reticles) must be transferred to the machine for processing and, after processing has been completed, returned to the conveyor for delivery to the next processing machine. The material is typically retained in a protective container such as a sealed transport pod to minimize any exposure of the substrates to the environment outside of the processing machines and protect the material against particulate contamination. The entrance of each processing machine is provided with a load port designed to automatically remove the material from the transport pod in a protected environment. During operation of the facility, material must be frequently moved between the load port and conveyor.

Typically, the semiconductor manufacturing facility is organized into a plurality of bays each including several processing machines. Various systems (called intra-bay transport systems) are employed to move the material between the machines within a bay. For example, many systems rely upon human workers to transfer the material from port to port using a cart. The worker typically actuates a manual robotic link or other lifting device to move the material to the port and, after processing has been completed, to return the transport pod to the cart. The press is repeated at the next machine. Another system of intra-bay transport relies upon automatic guided vehicles (AGVs) which carry the pods between the machines and automatically move the pods into the load port. The cart and AGV lack the advantages associated with an automated conveyor, which can efficiently and rapidly move articles along a conveyor path and has much higher capacity than the cart and AGV.

Semiconductor wafers are delicate and, particularly in the later stages of processing, quite valuable. Integrated circuits are manufactured by forming a plurality of layers on a semiconductor wafer or other substrate. With advances in technology, integrated circuits have become increasingly complex and typically include multiple layers of intricate wiring. The number of integrated circuits positioned on a single wafer has increased due to the decreasing size of the integrated circuits. The standard size of the semiconductor wafers will increase from 200 mm to 300 mm in the next few years, further increasing the number of integrated circuits which may be formed on a single wafer. As a result of the increased complexity and decreased size of the integrated circuits, the value of the semiconductor wafer increases substantially as the wafer progresses through the various processing stages. Also, the increased weight of a pod of 300 mm wafers creates ergonomic problems in manual wafer handling. Thus, considerable care must be taken in handling the semiconductor wafers, particularly during the later processing stages, since damaged wafers could result in considerable monetary losses. The requirement of a clean room environment, substantially free of particulate contamination, for processing the wafers places further restraints on the systems which may be used to transfer the material. A system for transferring material between a conveyor and load port which is suitable for operation in a clean room environment is desirable.

A transfer system for moving material, such as semiconductor wafers, transport pods carrying semiconductor wafers, or other containers, between a conveyor and a load port or other work station is desirable. A transfer system which may be used in fields other than semiconductor processing, including but not limited to pharmaceuticals, medical systems, flat panel displays and computer hardware, such as disc drive systems, modems and the like, is also desirable.

The movement of material in a conveyor-based transfer system is often managed by an automated control system (ACS). For example, one such system is employed in the baggage handling system at Denver International Airport. Another such system is employed by the U.S. Postal Service to control the conveyance of mail trays in the Processing and Distribution Center in Carol Stream, Ill. (for more information, refer to "U.S. Postal Facility Improves Operation with Honeywell's Smart Distributed System," available at http://www.honeywell.com/sensing/pressrel/9718.stm). An ACS has also been employed in at least one conveyor-based transfer system used in semiconductor manufacturing operations to manage the movement of pods of wafers.

In contrast with the post-office and baggage examples, an ACS for a conveyor-based transfer system used in semiconductor manufacturing operations must ensure that the pods of wafers being transferred never collide and are not subjected to excessive acceleration. Additionally, the ACS must assure timely deliver pods of wafers from one processing station to another. One such prior art ACS, the "Asyst Automation Control System," shown in FIG. 1, works with a transfer system that conveys pods or open casettes of wafers between and within processing bays. This transfer system includes track on which the material moves, directors, which are electromechanical units that provide rotation between track segments that meet at an angle, and elevators, which are electromechanical units that raise or lower a pod. The track includes a number of motors used to move the material and sensors that sense the location of the material.

Referring to FIG. 1, the Asyst Automation Control System includes multiple PLCs (Programmable Logic Controllers), each of which controls the movement of one or more pods in a respective region of the transfer system in accordance with system goals. Each PLC is coupled via a ProfiBus to the sensors and motors that compose its respective region of the track. The ProfiBus is a sensor bus, meaning that it is only used to transfer signals between a smart controller (the PLCs) and clients (motors, sensors, directors, elevators, etc.) with no autonomy. The PLCs are interconnected, enabling them to share information about pod movement and location. The number of sensors and motors that can be controlled by a PLC is limited. This is because PLCs are polling devices that work in scans. For each scan a PLC reads every one of its associated sensors. Therefore, the more the sensors, the longer the scan time, and the fewer scans pers second, resulting in a less responsive system. One additional problem with this architecture is that the PLC must know the control interfaces of each of its associated devices. As a result, a PLC needs to be modified whenever new sensor or motor interfaces are added to the transfer system. Another problem is that a PLC is simultaneously concerned with high-level control issues, such as moving a pod to its destination without collisions, and low level issues, such as accelerating a motor. As a result, PLC computing power becomes a key factor in the performance of the transfer system. Both problems are also a hindrance to transfer system scalability and reconfiguration.

Therefore, a transport system ACS that is scalable, efficiently employs computer resources so that high level and low level control operations are not in conflict and easily supports new types of the motors, electromechanical components and sensors would be desirable.

SUMMARY OF THE INVENTION

In summary, the present invention is a control system architecture and method for a material transport system that meets the needs described above. The present invention includes three levels of controllers. A high level (transport) controller interfaces with an external command system that issues control commands to the present control system indicating how the materials are to be moved. For example, in the preferred embodiment, which is implemented in the context of a material transport system for use in a semiconductor fabrication facility, these control commands include a command to move a particular container of material from one processing station to another station. The transport controller (TC) executes a control command by sequencing a series of basic operations that implement the control command. In one embodiment, the TC does this by breaking the control command into a series of atomic acquire, move and deposit commands that are executed by at least one second level controller (control logic computer, or CLC).

As befits a distributed control system, the TC is the only system entity that knows the physical topology of the entire material transport system. One representation of the topology stored by the TC is organized around the set of all possible system destinations and transport system zones. Each destination includes references to location and device information associated with zones from which pods can be preloaded to and launched from that destination. The TC also maintains status information for the transport system using information returned by the CLCs.

Each control logic computer (CLC) provides high level, real time control and coordination of a distinct region of the physical conveyance system by providing instructions to a set of third level controllers (intelligent drivers), each of which is in turn responsible for low-level control of one or more of the electromechanical devices in the CLC's region of control. For example, in a preferred embodiment, a region might include 64 zones, each including a set of sensors (e.g., 2), a length of track (e.g., 0.5 m) and drive motors (e.g., 1). Based on information from the sensors, knowledge of the region's topography and rules for speed control, routing and collision avoidance, the CLC executes the atomic commands by sending motor control commands down to its intelligent drivers.

In a preferred embodiment there are different types of electromechanical devices. Each different type is controlled by one or more type of intelligent driver. For example, in the preferred embodiment for use in a semiconductor fabrication facility the electromechanical devices can include a zone (a conveyor track segment and its associated sensor(s) and motor(s)), a tag/barcode reader, a load port transfer device (LPTD), an EMO (EMergency Off) sensor and a director (a track device with rotational capabilities). Accordingly, the preferred embodiment includes the following types of intelligent drivers:

zone controller reports sensor data to the CLC, accelerates and decelerates a motor in accordance with motor commands from the CLC;

tag controller provides two way communication with tag/barcode reader;

axis controller controls any axis of a LPTD, elevator or rotation of a director;

EMO controller monitors power supply and notifies CLC upon power failure; and handshake controller implements a multi-wire parellel interface used to synchronize the operation of separately-controlled electromechanical devices.

Each zone is associated with a neighborhood of n upstream zones and m downstream zones with which the zone is likely to interact during normal tranport system operations. These neighborhoods are defined differently depending on the position of a zone within the transport system's topology. For example, a zone in a portion of straight conveyor track might have a neighborhood consisting of 3 upstream and 3 downstream nodes because zone-to-zone interactions are limited in straight track. A director at the intersection of three portions of track would be covered by a neighborhood with more zones (e.g., 20), reflecting the wider scope of possible zone interactions. The CLC distributes the responsibility for carrying out commands affecting a particular neighborhood only to CLC threads (or programs) that are responsible for controlling the electromechanical devices associated with the zones that compose that neighborhood. These threads are configured to communicate among themselves to coordinate their actions. This distribution of CLC responsibilities down to the zone level enables the CLC tasks to be distributed across the different processors of a multiprocessor. Alternatively, the entire CLC could be run on a single processor or on multiple processors distributed on a network.

Each CLC collects status information from its associated intelligent drivers. The CLC reports some of the status information to the TC. The CLC also uses the status information to detect and handle report error conditions affecting its associated devices. These error conditions include: sensor faults, motor faults, failed load ports, unexpected removals, etc.

In addition to issuing commands, each of the control layers returns status information to the next higher control layer. The next higher layer is responsible for formulating strategy based on this status information.

BRIEF DESCRIPTION OF THE DRAWINGS

Additional objects and features of the invention will be more readily apparent from the following detailed description and appended claims when taken in conjunction with the drawings, in which:

FIG. 2A is a schematic of a transport system showing the relationship between a processing tool and a load area;

FIGS. 3A–3E show neighborhoods for, respectively, a rail zone, a corner, a rail zone near a director an elevator and a director;

FIG. 9C is a block diagram of a computer in which zone controller functions for an embodiment of the present invention are implemented;

FIG. 9D is a block diagram of a computer in which axis controller functions for an embodiment of the present invention are implemented;

FIG. 9E is a block diagram of a computer in which ID controller functions for an embodiment of the present invention are implemented;

FIG. 9F is a block diagram of a computer in which emergency off (EMO) controller functions for an embodiment of the present invention are implemented;

FIG. 9G is a block diagram of a computer in which handshake controller functions for an embodiment of the present invention are implemented;

FIGS. 33A–33B show possible director cluster configurations,

FIGS. 33C–33D show potential deadlock situations that could occur in the director cluster configurations of FIGS. 33A–33B;

DESCRIPTION OF THE EMBODIMENTS

The present invention is described herein with reference to a few specific embodiments. The present description uses terms whose meanings are provided in the following glossary:

A. Glossary of Terms

| Term | Definition |
| --- | --- |
| AMHS | Automated Material Handling System |
| CAN | Controller Area Network. Standard for networking embedded devices together. |
| Carrier | Synonym for Container. |
| CIM | Computer Integrated Manufacturing. In this context the term loosely means all computer systems with which the Transport System is in communication. |
| Container | Generic term used to refer to an Open Cassette, Box or Pod. A container is that object which is transported by the Transport System. |
| Control Logic Computer | Hardware Platform for the mid-tier software components. |
| CORBA | Common Object Request Broker Architecture. Standard developed by the Object Management Group (OMG) as a method for distributed software applications to interoperate over heterogeneous networks. |
| Corner | A corner is a director whose only function is to make carriers turn a corner (change directions by 90 deg). The corner has an Axis Controller and is software configurable as to which turn to make (right or left). A corner may have multiple inputs (up to 3), but must have one and only one output. |
| Director | A director is a mechanical device for allowing a container to perform a turn. There are two types of directors, intersection directors and corner directors. |
| Director controller | Software application running on a CLC which is responsible for the control of the components comprising a director. |
| Intelligent Driver Board | Hardware platform containing a local microcontroller and network support (e.g., CAN bus support) used to monitor or control devices. |
| E23 | Semiconductor Equipment and Materials International (SEMI) standard. Specification E23 defines a multi-wire, parallel handshake for material handoffs between two devices. |
| E23 Active Partner | The active partner is the device in a material transfer that has the components which physically removes the material. The Load Port Transfer Device is active, and the Load Port it services is passive. The Pod Lifter is passive, and the Overhead Hoist is active. |

-continued

Figure 1:
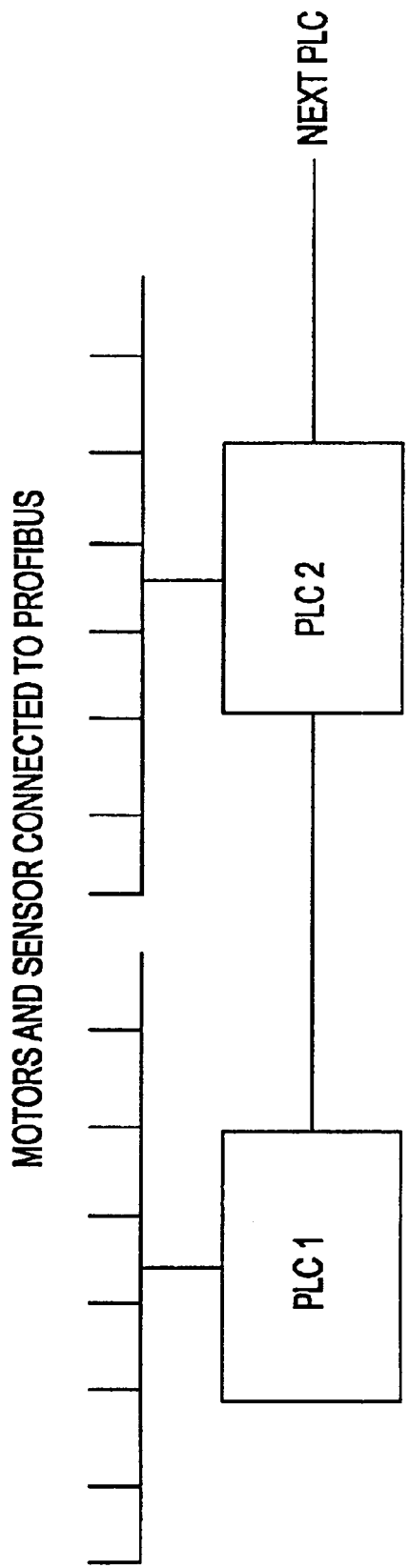
FIG. 1 is a block diagram of a prior art ACS for a transfer system employed in semiconductor manufacturing operations to convey pods of wafers between processing stations.
Figure 2B:
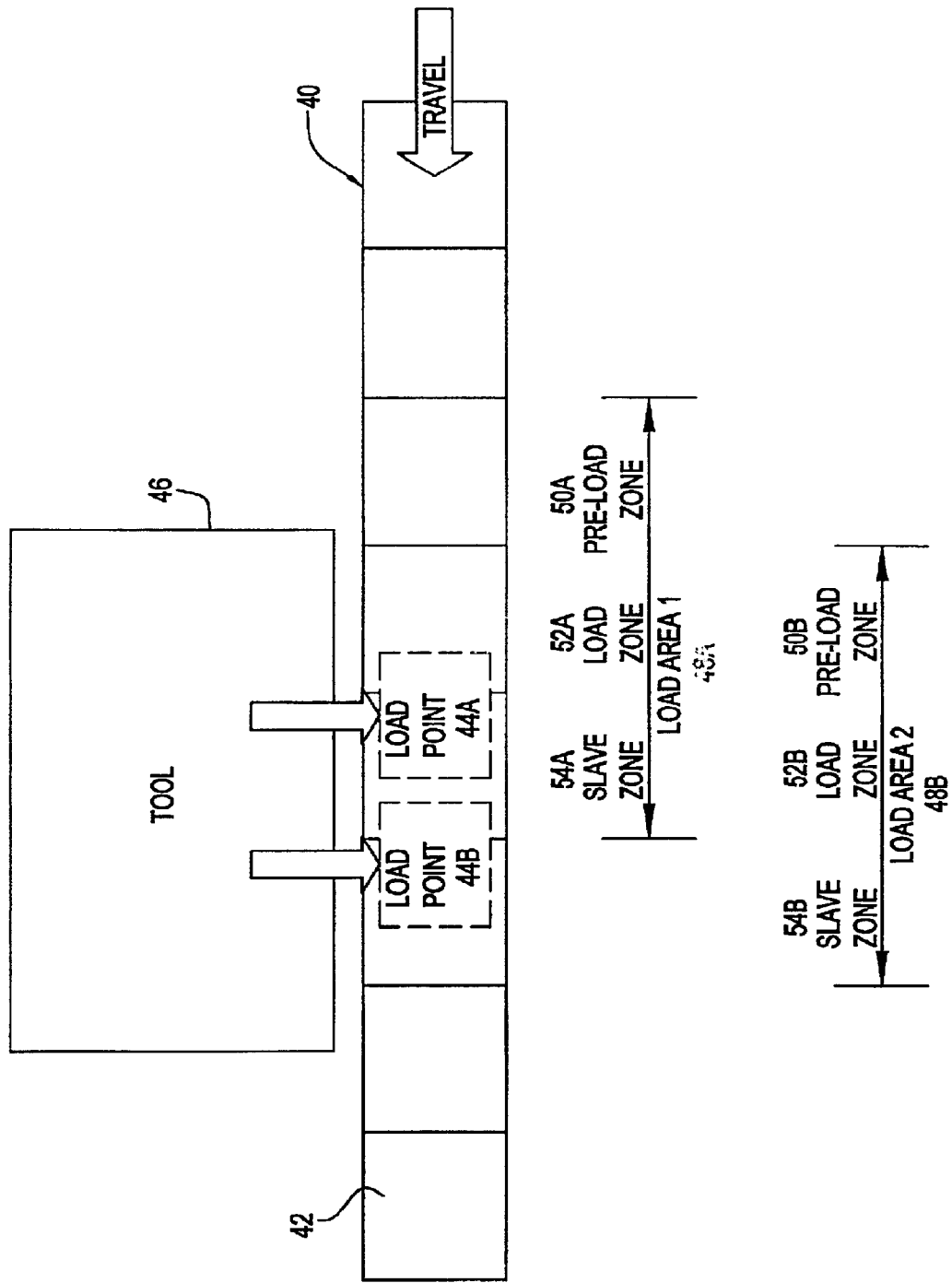
FIG. 2B is a schematic of a transport system showing the relationship between a processing tool with two load points and associated load areas.
Figure 2C:
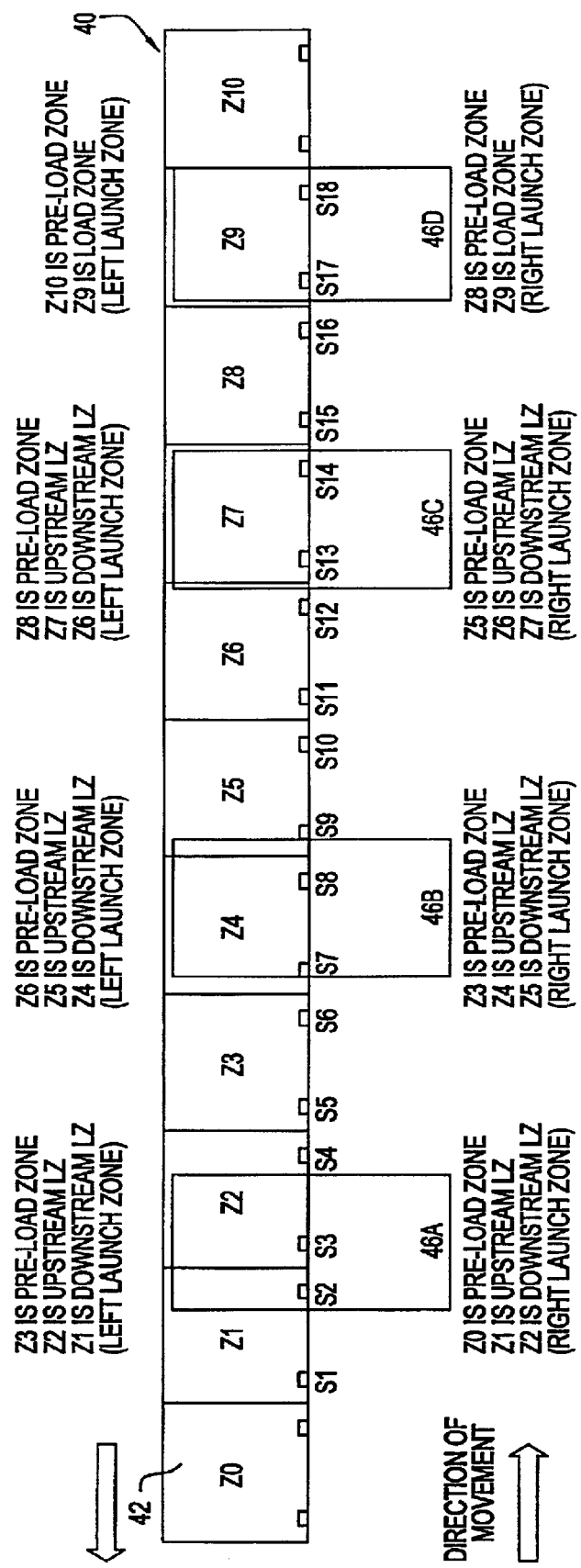
FIG. 2C is a schematic of a region of a transport system with load/unload points that are not aligned with a single zone showing possible portions of a load area in relation to the sensors in the conveyor zones.

| Term | Definition |
| --- | --- |
| E23 Passive Partner | The passive partner is the device that requests a load or unload of material. It does not have any mechanisms to effect the transfer. See E23 Active Partner for a description of which Transport System devices are active and passive. |
| E-Stop | Emergency Stop. An E-Stop is an action initiated to immediately stop all motors. An E-Stop does not physically remove power from any computing devices. |
| Elevator | An elevator is a track component that raises and lowers a platform. An elevator is used to move a container between conveyer located on different floors, or to move from ceiling to operator height (in which case it is typically called a lift). |
| Elevator Controller | Software application running on a CLC which is responsible for the control of the components comprising an elevator. |
| Entry Speed | The speed at which a zone's motors must be running when an incoming container's leading edge contacts the belt. If the zone upstream to another node is running an accel or decel profile, the entry speed is some intermediate value between the zone speed and exit speed. See exit speed and zone speed. |
| Exit Speed | The speed at which a zone's motors must be running when an outgoing container's trailing edge looses contact with the zone. See entry speed and zone speed. The exit speed of a zone is the same as the zone speed of the downstream zone. |
| FOUP | "Front Opening Unified Pod" - A FOUP refers to a pod that contains 300 mm wafer and opens in front. |
| Gate Stop | A gate stop is a device which is used to prevent the potential movement of a carrier off the end of the conveyer. A gate stop may be used in such locations as an elevator so that when the elevator is not in line with a particular track path, the gate stop would prevent dropping the carrier off the zone upstream from the elevator. A gate stop would also be used on a buffer. Gate stops are controlled by the zone software. |
| Handshake Controller | Software application running on a parallel I/O board. Implements a SEMI E23 interface with another device (e.g., a LPTD and Load Port). |
| Interbay | Transport system loop typically running down the center of the fab floor used for moving material from bay to bay. |
| Intersection Director | An intersection director allows incoming material to be routed to one of multiple output directions. This director may have either two or three output directions and one or two input directions. |
| Intrabay | Intrabay is a term generally applied to a transport system which is connected to the Interbay and provides transportation services within a single bay. |
| Launch Zone | The launch zone is the zone from which a pod will begin movement once on the rail. Synonymous with downstream load zone |
| Load Area | The load area includes a downstream load zone, an upstream load zone and a pre-load zone. The upstream and downstream zones compose a load point (i.e., the load point may straddle two zones). The pre-load zone is the zone where a container is held until it can be moved to the load point. Whether a zone is a downstream zone or an upstream zone depends on the direction of container movement (the container always moves from the upstream load zone to the downstream load zone). FIGS. 2A–2C show schematics of different regions of rail 40 that include multiple zones 42 and at least one tool 46 into which a container can be loaded. Each FIG. shows the position of the downstream and upstream load zones 54, 52 and preload zone 50 associated with the load point 44 of each tool 46. FIG. 2A shows a case where the tool 46 has a single load point 44 and associated load area 48. Because the container is moving from right to left, the pre-load zone 50 and the upstream load zone 52 are to the right of the downstream load zone 54. FIG. 2B shows a case where the tool 46 has two load points 46A, 46B. Each load point 46A, 46B has a respective load area 48A, 48B. Because the load points 46A, 46B are positioned in adjacent zones 42, the load |

-continued

| Term | Definition |
|---|---|
| | areas 48A, 48B overlap. For example, the downstream load zone 54A of the load area 48A is the same as the upstream load zone 52B of the load area 48B. FIG. 2C shows the potential locations of a load point relative to the load zones the identifies the pre-load zone, upstream and downstream load zones for both right and left movement. This FIG. is not intended to show an actual physical configuration. Each of the load points 44 is associated with a load port transfer device (LPTD) that moves a container from the rail (the upstream load zone 52) to the tool 46 for processing and back onto the rail (the downstream load zone 54) when processing is complete. Also, one LPTD can service multiple load points. |
| Lot | A set of wafers which are grouped together logically and (optionally) physically. Some fabs constrain a lot to a single cassette, while others may allow a lot to consist of multiple cassettes. The transport system will not track lots. |
| Lot ID | A human/machine readable designator which identifies a Lot |
| Micro-Controllers | A computer module embedded in the conveyer used for control of the electro-mechanical systems. |
| MMS Maintenance Management System | Maintenance Management System A system with responsibility for collecting and maintaining maintenance data for other systems. |
| Material | Generic term which, in this context, refers to semi-conductor WIP or Reticles or any other articles that can be moved in a transport system. |
| MCS | Material Control System |
| MES | Manufacturing Execution System |
| MOVE | An AMHS movement command which can be initiated by a component external to the transport system. |
| Movement Direction | Material may move in either of two directions on a rail. The direction of travel is defined from the point of view of an observer facing the rail. That is, movement to the observer's left is left movement and movement to the observer's right is right movement. |
| Neighborhood | A neighborhood is a collection of zones that surround a given zone and define a potential, physical path. A neighborhood consists of n zones upstream and m zones downstream from the given zone (typically, n = m). Each zone will be a member of multiple neighborhoods (typically, n + m neighborhoods). Corners, Elevators and Directors all have 2 neighborhoods. For example, an elevator's two neighborhoods are for its upper position and its lower position, respectively. A rail zone that is near a director has its neighborhood defined based on the straight through path of the director. Possible neighborhoods definitions for different track configurations are shown in FIG. 3A–3E. In each of these configurations n = m. FIG. 3A shows the zones 42 that compose a single neighborhood around a center zone 60 situated on a straight rail 40. The zones composing the neighborhood are numbered "1". FIG. 3B shows the zones 42 that compose two neighborhoods for a corner 64. The zones 42 are numbered "1" or "2" indicating the neighborhood(s) to which they belong. FIG. 3C shows the zones 42 that compose a single neighborhood for a center zone 60 situated on a straight rail 40 near a director 66. There is only a single neighborhood in this situation as the straight path through the director is assumed. FIG. 3D shows the zones 42 that compose two neighborhoods for an elevator 68 that connects an upper rail 40U and a lower rail 40U. The zones 42 are numbered "1" or "2" indicating the neighborhood(s) to which they belong. FIG. 3E shows the zones 42 that compose two neighborhoods for an intersection director 66. The zones 42 are numbered "1" or "2" indicating the neighborhood(s) to which they belong. |

-continued

| Term | Definition |
|---|---|
| RF Tag | A radio frequency transponder embedded in a cassette which is electronically readable/writeable and contains (minimally) sufficient information to uniquely identify the physical cassette. |
| ORB | Object Request Broker |
| Parallel I/O Board | Hardware platform supporting 8 and optionally 16 bits of digital I/O. Used to implement SEMI E23 interface for a Handshake Controller. |
| Pre-load zone | The pre-load zone is a destination zone. Material being delivered to a tool will stop in the pre-load zone prior to being moved to the load point for the tool. |
| RAM | Reliability, Availability, and Maintainability. Typically refers to Semi E-10 set of reports. |
| SEMI E-10 | Semiconductor Equipment Manufacturer's Institute. Specification E-10 covers data collection and report generation for reliability reports. |
| SEMI E-23 | See E23 |
| SmartTag | Asyst Technologies transponder product which may be attached to a Pod or Box and provides electronically readable/writeable data storage. |
| SmartTag Controller | Application running on a driver board which is responsible for the interface to a SmartTag probe (one type of Tag Controller). |
| SMIF Pod | Standard Mechanical Interface Pod. May contain reticules or WIP in a controlled mini-environment. SMIF pods are bottom opening and are not used for 300 mm wafers (see FOUP). |
| Speed Profile | A speed profile defines the speed of a container during the transit of a zone. A speed profile is defined by a Zone Speed and an Exit Speed. For example, a profile of 3 - 2 defines that a container will be moving at speed S3 when fully on the zone and will be decelerated so that the container will be moving at speed S2 when it looses contact with the zone's belts. A speed profile is initiated only when a container is fully contained within a single zone. Note that the speed of the container when it first contact's the belts of the zones is dependent upon the previous profile. |
| Tag Controller | Software application running on a driver board which implements an interface with a tag reader. |
| Transport Controller | Software system which is in charge of high level, non real time functions including external interfaces and inter-component coordination. |
| Transport System | Generic term applied to a system which move material from point to point within a fab. |
| WIP | Work in Process. Typically applied to semiconductor wafers. |
| Zone | That section of track that can start, stop and transfer a single carrier. A zone is at least as long as a carrier. For a 300 mm fab, a zone shall be 500 mm in length. |
| Zone Address | The network address of a zone within a node. Zone addresses will be 8 bits wide. |
| Zone Controller | Intelligent Driver Application software running on a driver board which is responsible for the low level, real time control of a single motor and related sensors. |
| Zone Max. Speed | The zone max. speed is the highest speed that a carrier may be at when it is detected by the end of zone sensor. (i.e. when the carrier is fully occupying the zone and no other zone) |
| Zone Speed | The speed at which a container is moving when fully contained within a single zone. See entry speed and exit speed. The zone speed of a zone is the same as the exit speed of the upstream zone. |

B. System Description

A transport system implemented in accordance with the present invention is responsible for the reliable, timely movement of material from a source device's load point to the load point associated with a destination device. Sources and destinations can be either storage systems, process tools, wafer sorters, or any other fabrication (fab) systems which operate on material moved by the transport system.

The transport system includes conveyer hardware, controlling computers and software that executes in the controlling computers. Conveyer hardware may be uni- or bi-directional rails, directors, corners, load port transfer devices (LPTD) or elevators. Except for the LPTD, each of these devices is composed of "zones", where each zone is a separately controlled physical region of conveyer that may hold a single container.

In one embodiment described herein a series of zones (and their controlling computers, called intelligent drivers) reside on a network. In the illustrated embodiment this network is a Controller Area Network (CAN) network, but any high speed network technology (e.g., LonWork, FireWire) could be used. Each local CAN network is connected to a control logic computer (CLC) running application specific software. In an embodiment for use with conveyor rails a CLC zone thread is responsible for high level control and a zone controller (ZC) intelligent driver controlled by the zone thread is responsible for low level control of the zones. Each zone belongs to multiple "neighborhoods", each of which consists of n zones upstream from a particular zone and m zones downstream from the particular zone. All of the CLC zone threads in a neighborhood share real-time information to insure proper movement and identification of material. The neighborhoods have different sizes depending on the topology of the physical system.

The transport system needs to communicate with a variety of storage devices, process tools and other devices residing on the fab LAN. In one embodiment communication with the load ports (which in turn communicate with process tools) is handled by a SEMI E23 parallel interface. In the illustrated embodiment communications between a high level controller for the transport system (called the Transport Controller, TC) and the fab CIM systems (e.g., MCS) are via an HSMS connection conforming to the SEMI Intrabay Specific Equipment Model, which is incorporated herein. Alternatively, communications between the TC and the high level controller could be implemented using any suitable communication technology and protocol. This is because operation of the present invention is independent from the configuration of this communication mechanism.

Safety system and fire door interlocks are handled by the direct I/O controllers that are connected directly to the CAN network. These controllers help determine the automatic changes in system operating modes. A version of this controller is built into the power distribution system to alarm power supply failures and to interconnect E-Stop devices. Additional details of the present transport system are now described in reference to FIG. 4.

Figure 4:
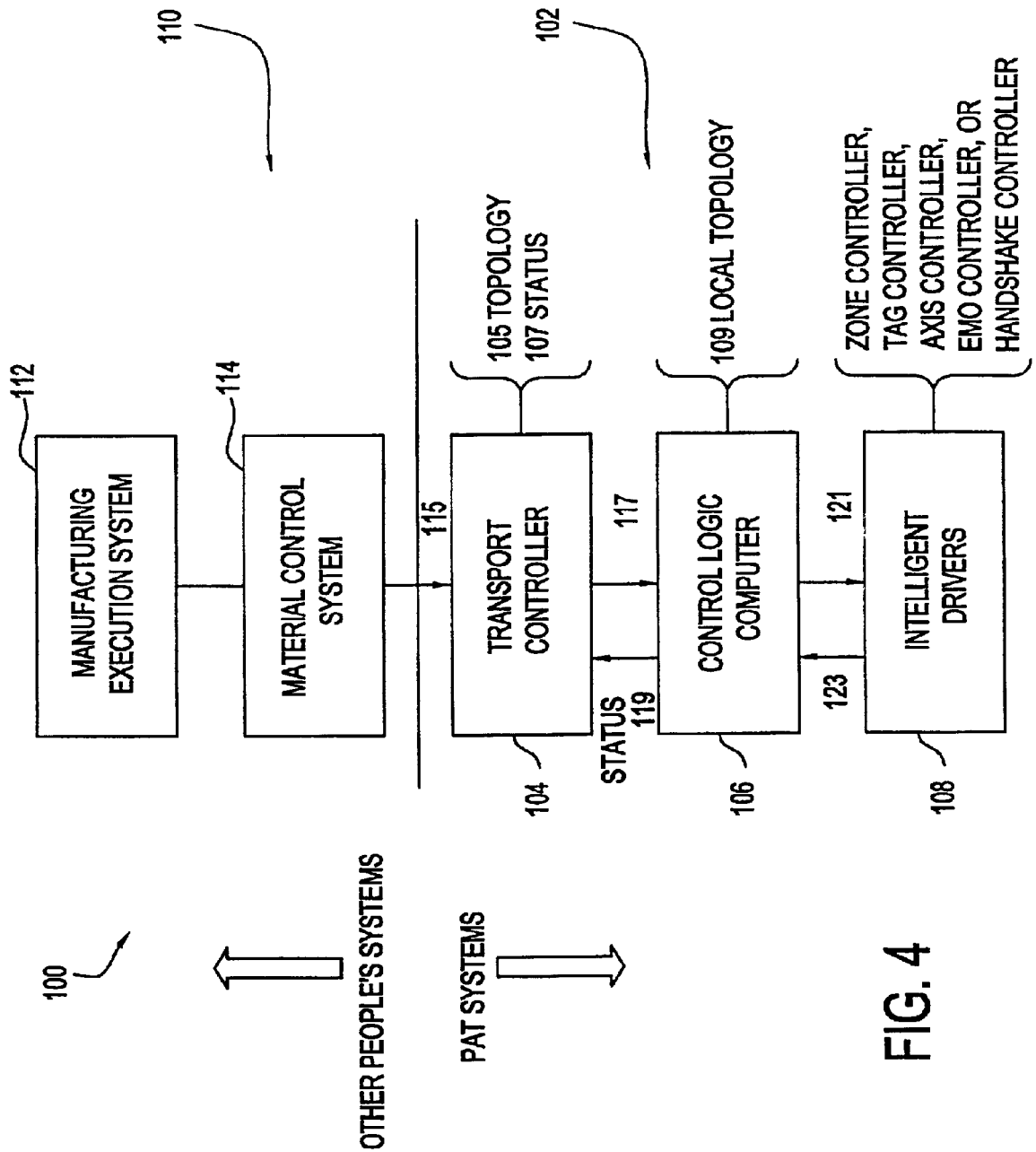
FIG. 4 is a block diagram of a preferred embodiment showing the hierarchy of ACS elements and the position of the inventive ACS in the context of a conventional semiconductor manufacturing control system.

Referring to FIG. 4, there is shown a block diagram of an automated manufacturing system 100 incorporating the transport system 102 of the present invention and a conventional automated manufacturing system 10. This figure omits conveyance hardware and emphasizes control system components, which are a focus of the present invention. The conventional manufacturing system 10 includes a Manufacturing Execution System (MES) 112 and a Material Control System (MCS) 114. The manufacturing execution system 112 tracks lots through the fab. The MCS 114 receives notification of the next process step for a particular lot from the manufacturing execution system 112, identifies a process tool and instructs the transport system 102 to deliver the lot to that tool.

The transport system 102 includes the transport controller (TC) 104, control logic computer(s) (CLC) 106 and intelligent drivers 108. The transport controller (TC) 104 receives from the material control system (MCS) 114 commands 115 indicating where materials are to be moved/handled. For example, the commands 115 include a command to transfer a particular container (or pod) of wafers from one processing tool to another processing tool. The TC 104 executes a MCS command 115 by sequencing a series of basic/atomic operations that implement the command. For example, the TC 104 breaks a transfer command into a series of acquire, move and deposit commands 117 that are executed by at least one of the control logic computers (CLC) 106. The MCS 114 may also issue these atomic operations.

The TC 104 stores the physical topology of the entire material transport system in a topology database 105. One representation of the topology 105 is organized around a set of all possible manufacturing system destinations (e.g., load port transfer devices). Each destination representation includes references to location and device information associated with zones from which containers can be preloaded into and launched from that destination. The TC 104 also maintains status information 107 for the transport system using status information 119 returned by the CLCs 106.

Each CLC 106 provides high level, real time control and coordination of a respective group of intelligent drivers 108 that drive a group of the electromechanical devices composing a distinct region of the physical conveyance system. Based on information 123 from the sensors, dynamic limits on movement of the materials, a map of neighborhood topography and rules for speed control, routing and collision avoidance, the CLC 106 executes the commands 115 by coordinating selected intelligent drivers 108 via low level commands 121. The CLC 106 needs to know only the physical topology of its associated region of the material transport system, which it stores in a local topology database 109. In addition, each thread only knows the topology that corresponds to its neighborhood.

In one embodiment there are different types of electromechanical devices. Each different type is controlled by one or more intelligent drivers 108. For example, in one embodiment the electromechanical devices can include a zone (a conveyor rail segment and its associated sensor(s) and motor(s)), a tag/barcode reader, a load port transfer device (LPTD), an EMO (EMergency Off) sensor, a director (a track device with rotational capabilities) and an elevator. Accordingly, the described embodiment includes the following types of intelligent drivers 108:

zone controller reports sensor data to the CLC, accelerates and decelerates a motor in accordance with motor commands from the CLC;

tag controller provides two way communication with tag/barcode reader;

axis controller controls any axis of a LPTD or an elevator or rotation of a director;

EMO controller monitors power supply and notifies the CLC upon power failure; and handshake controller implements a multi-wire parallel interface used to synchronize the operation of separately-controlled electromechanical devices.

Figure 5:
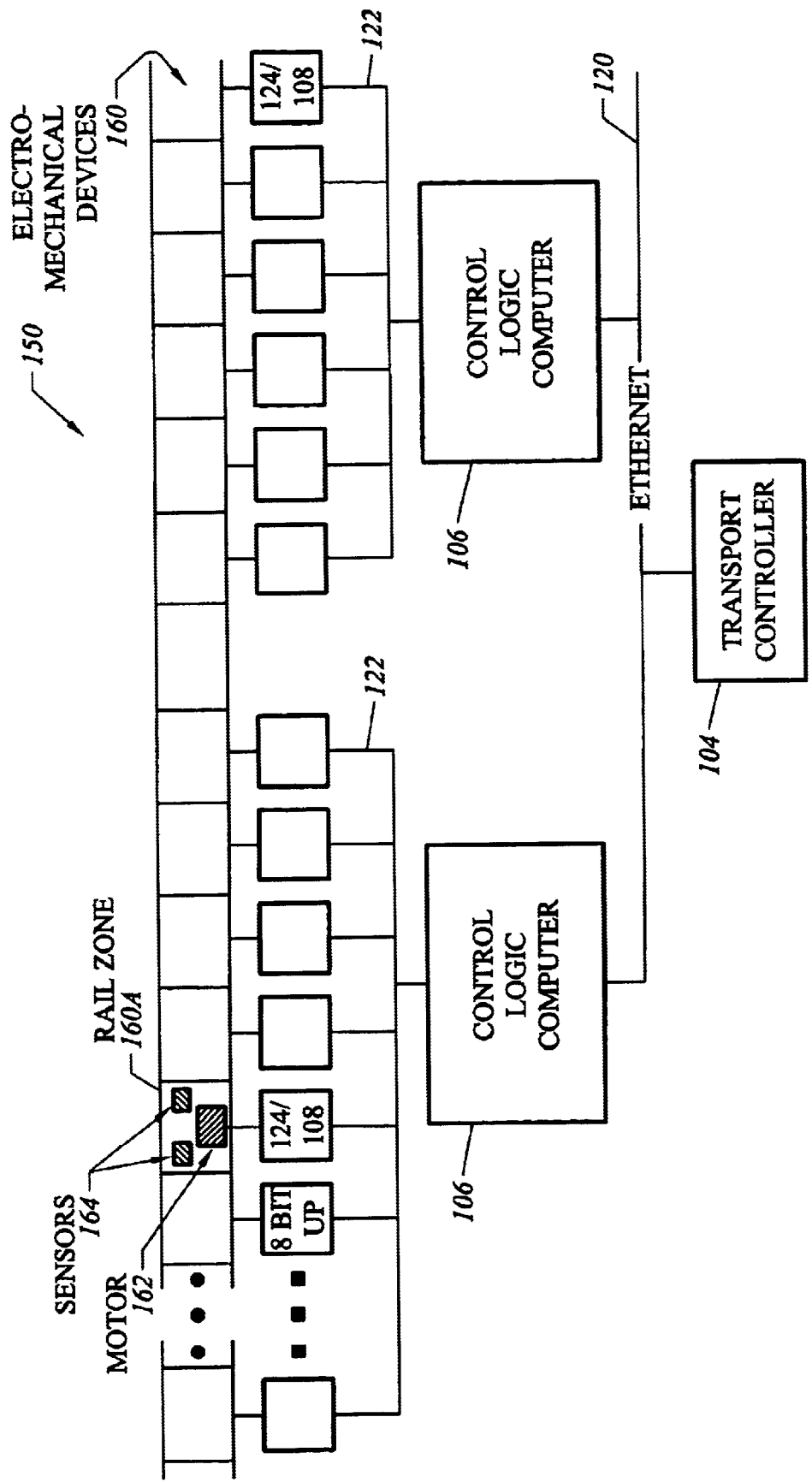
FIG. 5 is a block diagram showing interconnections between elements of an ACS implemented in accordance with the present invention for a semiconductor wafer transfer system.

Referring to FIG. 5, there is shown an expanded block diagram of one embodiment 150 of the control system 100. In the embodiment 150 there is a single TC 104 coupled via an Ethernet 120 to multiple CLCs 106. Each of the CLCs 106 is in turn coupled to multiple intelligent drivers 124 via one or more CAN busses. Each of the microprocessors 124 executes an active driver 108 for one of the electromechanical devices 160 composing the conveyance hardware. For example, a rail zone 160$a$ with one motor 162 and two sensors 164 is controlled by a zone controller (ZC) 108$a$. The microprocessors 124 are generic, which allows different types of active drivers 108 to be executed thereon.

Figure 5B:
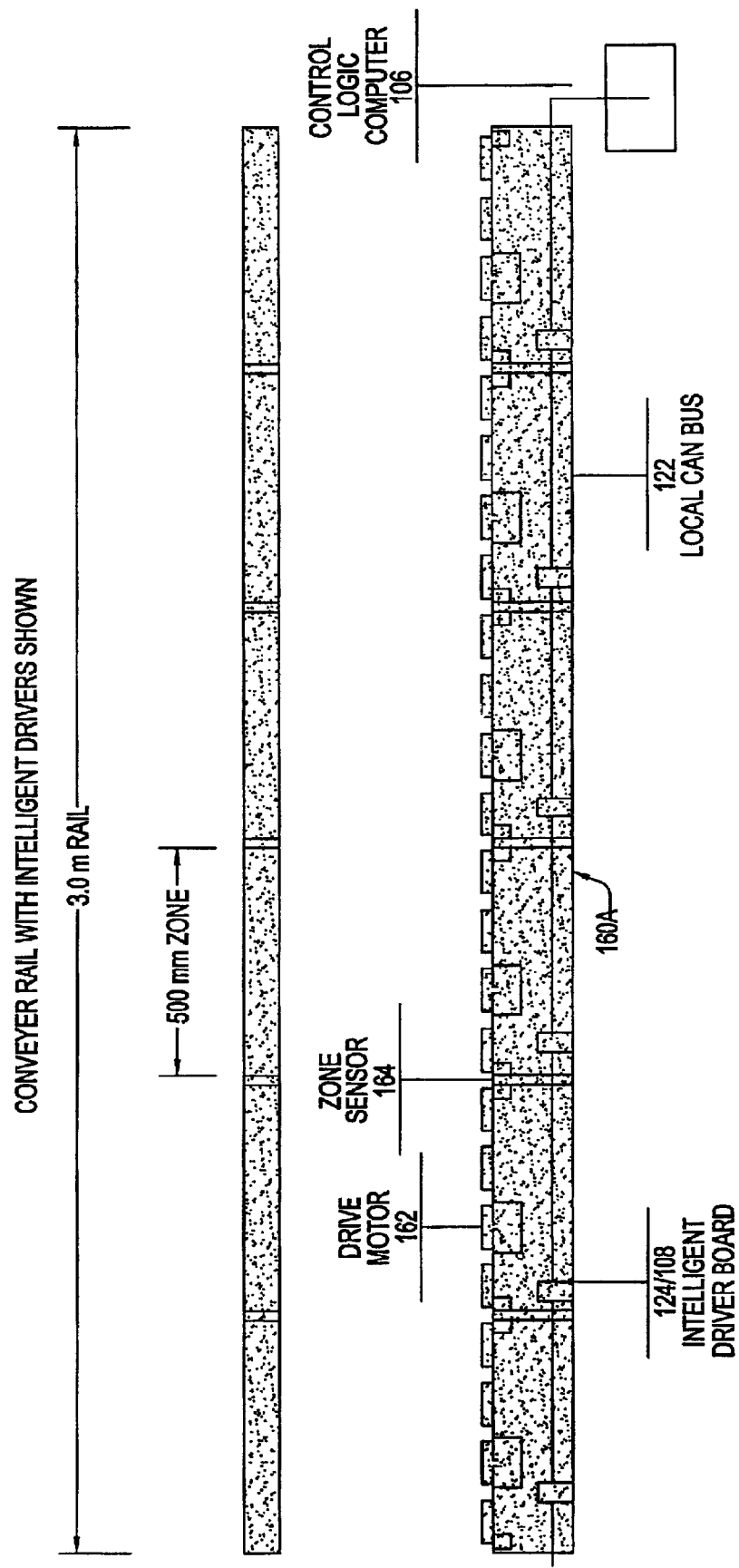
FIG. 5B is a block diagram showing additional details of the electromechanical devices, the CAN Bus and the Control Logic Computer of FIG. 5.

In the embodiment 150 there are 64 microprocessors 124 per CAN bus and up to 4 CAN busses controlled by a single CLC 106. The number of microprocessors 124 per CAN bus, number of CAN busses controlled by a single CLC 106 and the active drivers 108 per microprocessor 124 can be varied depending on the available computer hardware and physical layout. A more detailed view of the conveyor and the intelligent drivers is shown in FIG. 5B.

Figure 6:
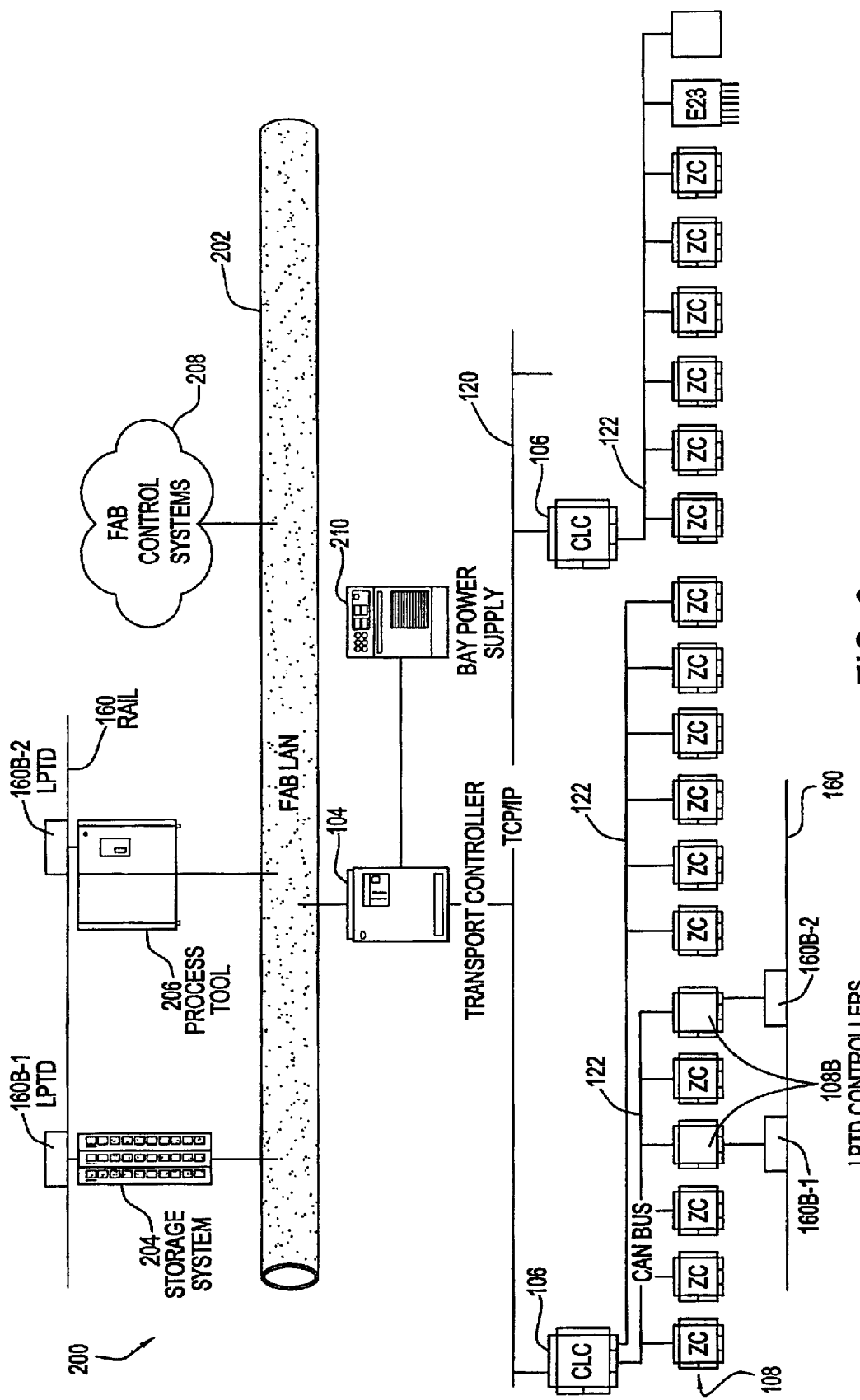
FIG. 6 is a schematic of a semiconductor fabrication facility incorporating elements of an ASC implemented in accordance with the present invention.
Figure 7:
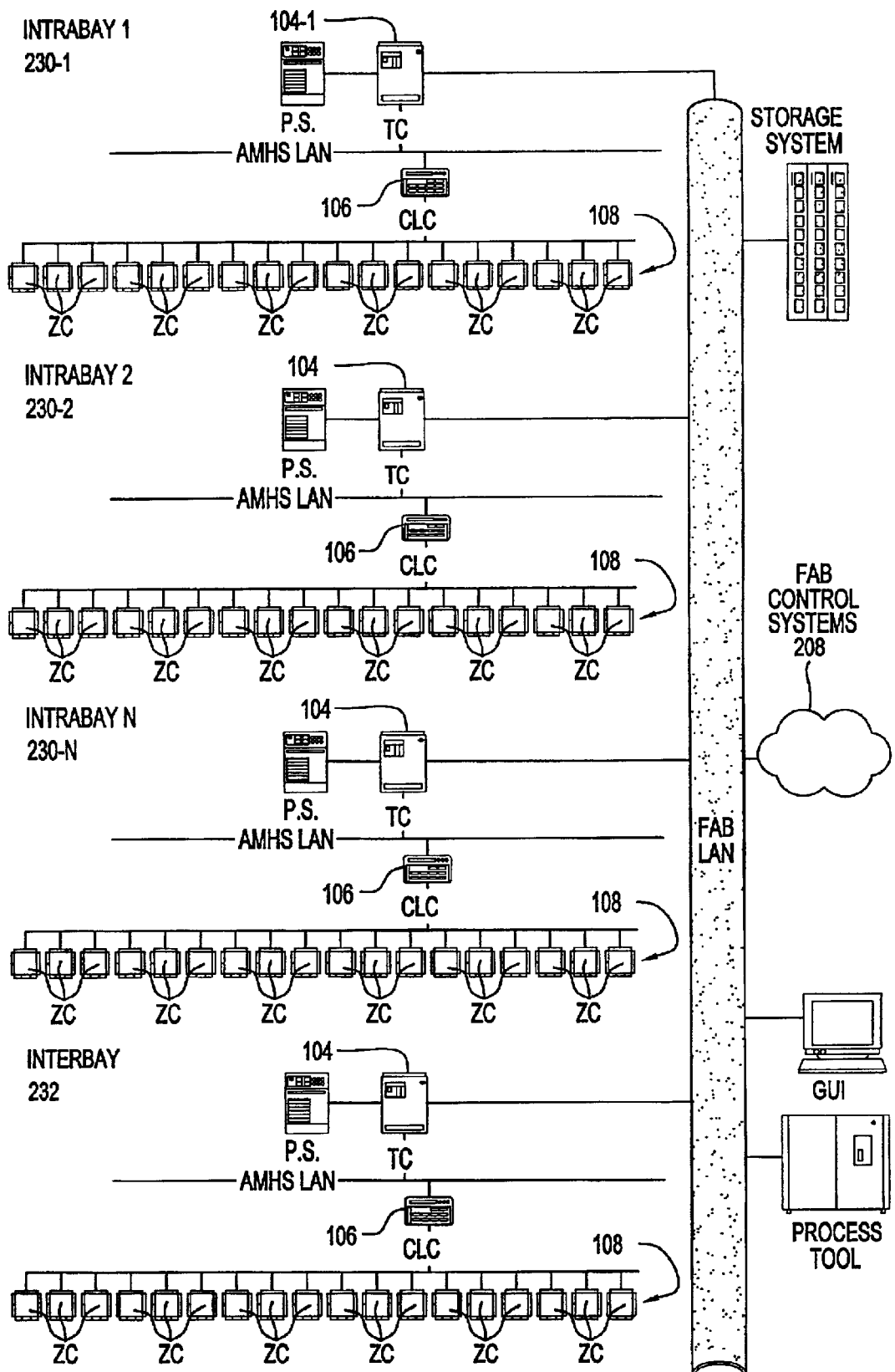
FIG. 7 is a schematic of a semiconductor fabrication facility with connected bays incorporating elements of an ASC implemented in accordance with the present invention.
Figure 8:
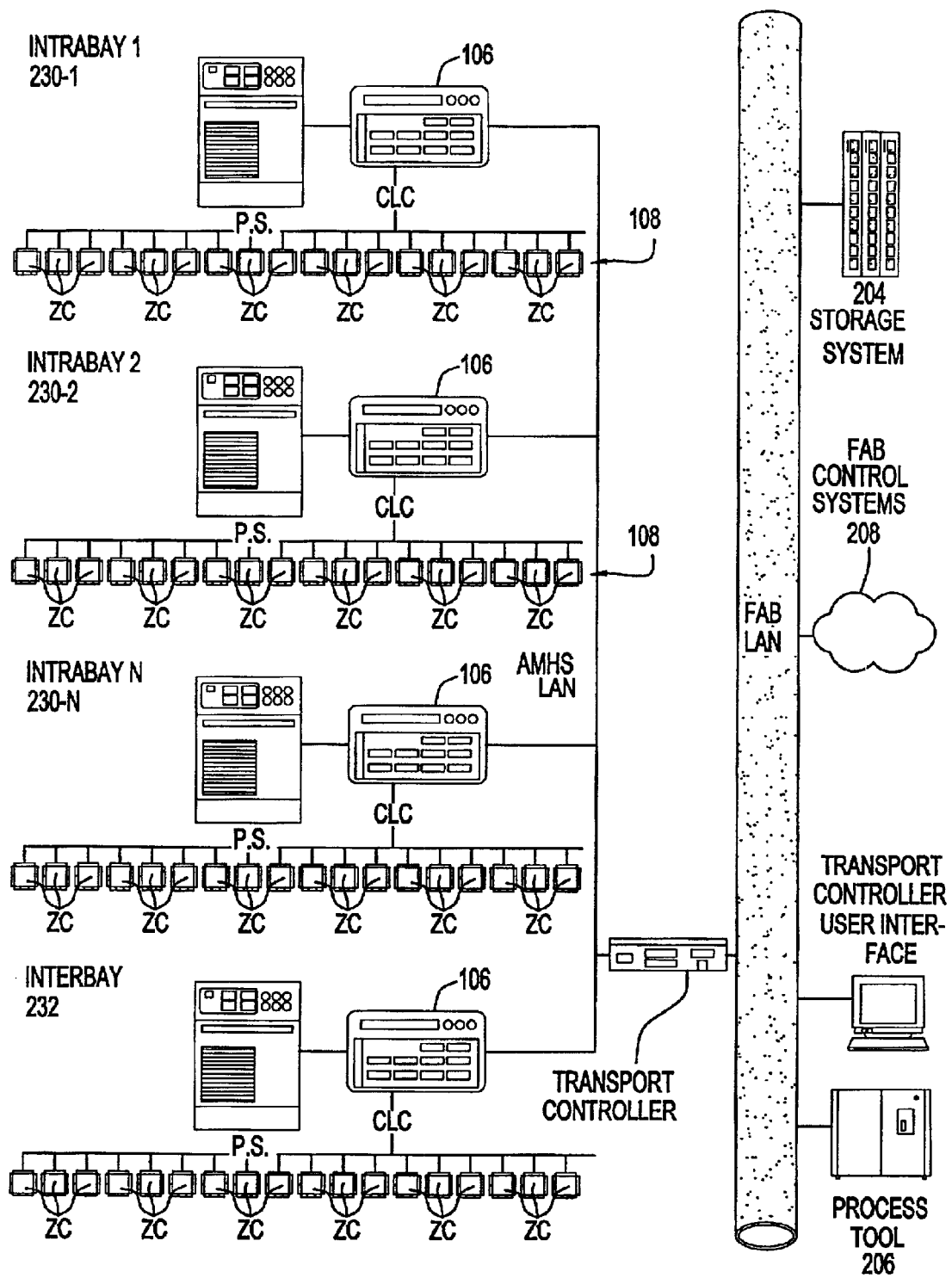
FIG. 8 is a schematic of a semiconductor fabrication facility with separate bays incorporating elements of an ASC implemented in accordance with the present invention.

Referring to FIGS. 6–8, there are shown schematics of different fabrication facility topologies incorporating both prior art elements and the transport system of the present invention. FIG. 6 shows a basic topology 200, including a fab LAN 202 that connects a wafer storage system 204, process tools 206, conventional fab control system 208 and a transport controller (TC) 104 implemented in accordance with the present invention. The storage system 204 and fab tools 206 are connected by a rail 160 or other conveyance system 160 that includes load port transfer devices 160b-1, 160b-2 for loading and unloading the storage system 204 and the process tools 206, respectively. The TC 104 monitors a bay power supply 210 and, as described above, controls the CLCs 106 via an Ethernet network. Each CLC 106 controls intelligent drivers 108 via one or more CAN busses 122. The intelligent drivers 108 in turn control a respective component of the conveyance system 160. For example, the intelligent drivers 108 include LPTD controllers 108b for the LPTDs 160b-1 and 160b-2. Other types of intelligent drivers 108 include zone controllers (ZC) and E23 interfaces (E23). Each intrabay and interbay is considered a wholly independent system that does not physically interact with the other intrabays or interbay.

FIG. 7. shows a manufacturing system including a series of independent bays, each having its own process tools 206 (shown for simplicity as a single process tool) and intrabay transport system 230. The bays are connected by stockers 204, which are coupled to the interbay transport system 232. Each intrabay transport system 230 and the interbay transport system 232 includes its own TC 104, CLCs 106 and intelligent drivers 108. The intrabay transport systems 230 are unaware of each other.

FIG. 8. shows a manufacturing system including a series of connected bays. In this layout, the intrabay and interbay transport systems 230, 232 operate as a single, interconnected system. As a result, there is a single TC 104 that controls the entire transport system (i.e., the intrabays and the interbay transport systems). Each intrabay system 230 and the interbay 230 system has its own CLC 106 and associated intelligent drivers 108. Additional details of the TC 104, CLC 106 and intelligent drivers 108 are now described in reference to FIGS. 9A–9H.

C. System Description and Logical Models

Figure 9A:
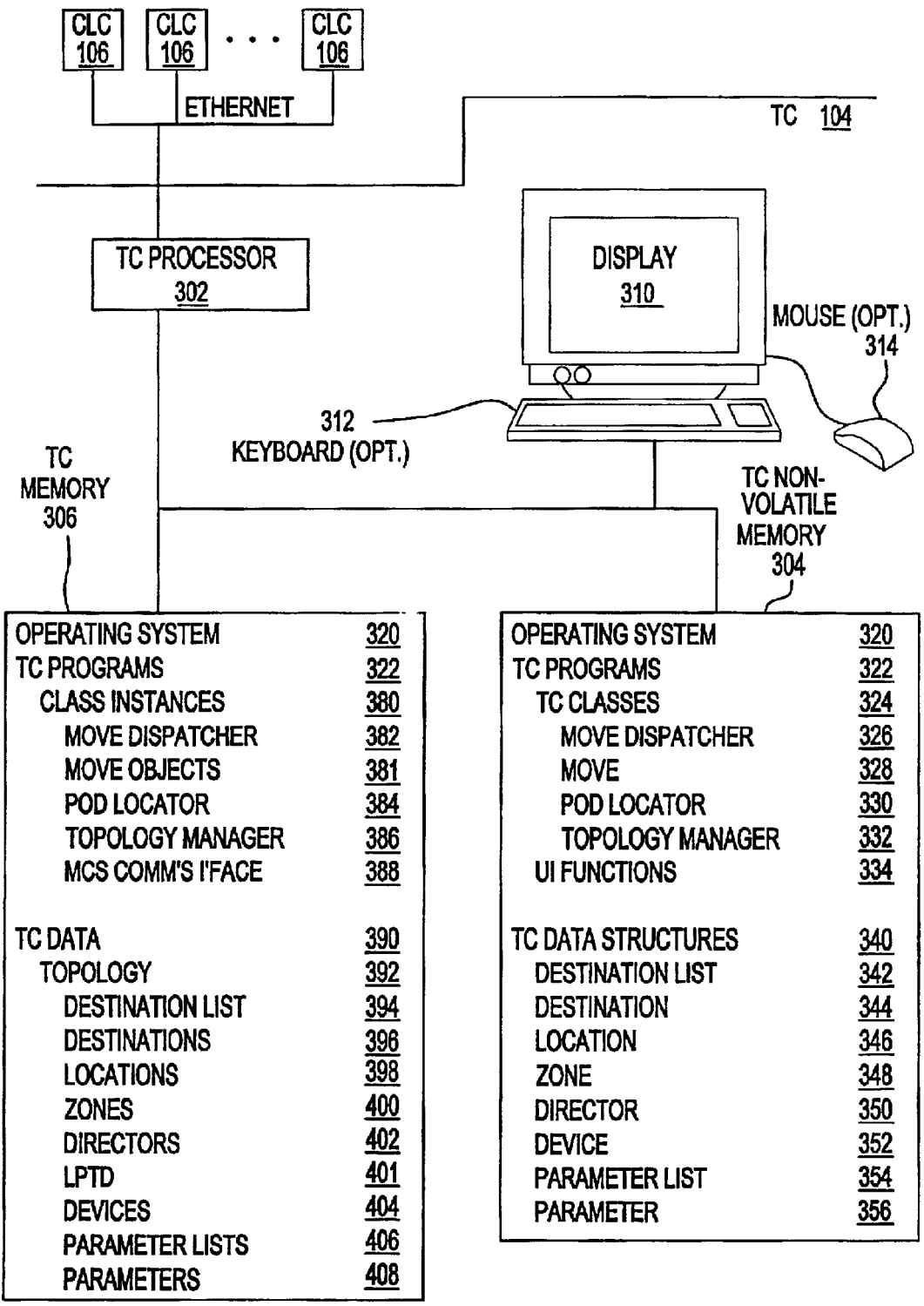
FIG. 9A is a block diagram of a computer in which transport controller functions of an embodiment of the present invention are implemented.

Referring to FIG. 9A, there is shown a block diagram of a transport controller (TC) 104. The TC 104 includes a processor 302; non-volatile memory 304, such as a hard disk or flash memory; a fast, primary memory 306, such as a semiconductor random access memory (RAM); and, optionally, a display 310 and user input devices, such as a keyboard 312 and mouse 314. According to well-known computing principles, the TC 104 executes programs in the memory 306 under control of an operating system 320 and allows for user interaction via the display 310 and user input devices 312, 314. The TC 104 controls one or more CLCs 106 in its region of influence via commands issued over an Ethernet (TCP/IP) connection. The display 310 and user input devices 312, 314 are optional if user input capabilities are not required.

The non-volatile memory 304 permanently stores an operating system 320, TC programs 322 and TC data structures 340. The TC programs 322 employ TC classes 324 that include, but are not limited to, a move dispatcher class 326, a move class 328, a pod locator class 330 and a topology manager class 332. The TC classes 324, which determine key aspects of the TC's functionality, are described in greater detail below. The TC programs also can include optional user interface functions 334 if user input capabilities are required. The TC programs 322, classes 326–332 and optional UI functions 334 can be stored as source code and/or executables.

The TC data structures 340 include a group of data structures that are used to define the physical topology of the region of the transport system for which the TC 104 is responsible. These data structures include:

destination list 342 header for list of destinations;

destination 344 holds information for a destination, including its name and pointers to locations corresponding to its left and right launch and preload zones;

location 346 defines an addressable physical location in the transport system, includes pointers to left and right neighbor locations and booleans indicating whether left or right movement from that physical location is allowed;

zone 348 holds the device name of a zone—modifies a location associated with a zone;

director 350 holds information for a director, including pointers to up and down neighbor locations associated with the director and whether up or down travel from the director is allowed—modifies a location associated with a director;

device 352 holds information for an electromechanical device, including a CAN bus address and a device name—one or more can be associated with each location, corresponding to each device associated with a location;

parameter list 354 a list of variables that are modifiable and characterize a device; and parameter 356 a data item that has a unique name, type (e.g., int, float, long, etc.) and value.

The operating system 320, TC programs 322, class instances 380 (sometimes referred to herein as "objects") and TC data 390 are loaded into the primary memory 306 for use by the processor 302. The class instances 380 include move dispatchers 382 move objects 381 pod locators 384 and topology managers 386, which are instances of the classes 326–332, respectively. The TC programs also include a MCS (Material Control System) Interface 388. The TC data 390 include a topology database 392, which comprises linked destination list 392, destinations 394, locations 396, zones 398, directors 400, devices 402, parameter lists 404 and parameters 406, which are instances, respectively of the data structures 342, 344, 346, 348, 350, 352, 354, 356.

The Transport Controller 104 performs the following functions using the TC programs 322 and the TC data 392:

Maintains an inventory of all nodes within its sphere of influence.

Downloads and verifies new programs and parameters in other controllers within its sphere of influence.

Maintains a backup copy of all data and parameters for the controllers within as its sphere of influence.

Accepts new material movement requests from the fab's control systems.

Verifies the availability of a tool's load port during the material delivery process.

Obtains destination information as part of the material acquisition process.

Provides services to multiple user interfaces for maintenance activities and to display current operating conditions.

Maintains mappings between internal material identifiers and external, fab-wide material identifiers.

Maintains mappings between internal destination addresses and external device identifiers.

Executes re-routing commands received from external systems.

Initiates, controls and monitors material movements.

Monitors power supply status.

Controls the operating state of the system.

Additional details of the operations of the TC 104 are provided below.

Figure 10:
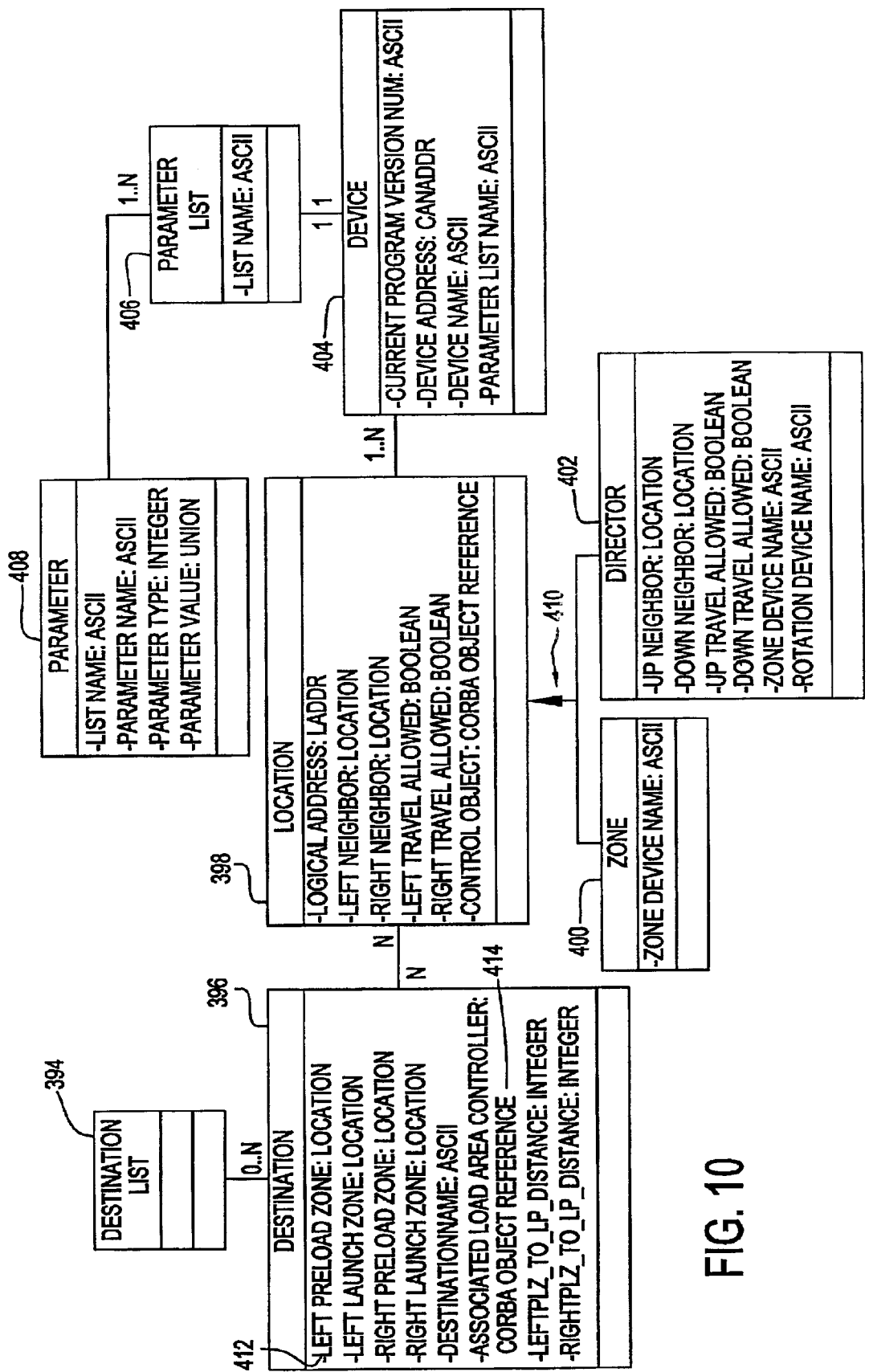
FIG. 10 is a block diagram of objects composing the internal topology maintained by the transport controller of FIG. 9A.

Referring to FIG. 10, there is shown a model of the topology 392. The notation employed in FIG. 10 is commonly used in object modeling (e.g., the Unified Modeling Language, or UML) and is therefore is described only briefly herein. Each type of object is shown as a box listing the object's attributes; associations between object instances are shown as lines between the boxes. The cardinality of each association (1 to 1, n to n, 1 to n, 1 to none, or 1 to 0 . . . n) is listed alongside each connecting line. For example, FIG. 10 shows that there can be between 0 and n destinations 396 in the destination list 394 and that each destination 396 can have links to n associated locations 398. An open arrow, such as the arrow 410, indicates inheritance of attributes. For example, the arrow 410 indicates that, while zone and director data instances 400, 402 can have their own unique attributes, both also inherit all of the attributes of a location data instance 398.

The listed attributes shown for each instance are employed in one embodiment and are not intended to restrict the scope of the present invention. Nor does the diagram attempt to define all attributes, only key ones. Each attribute is defined in the form: attribute name: data type. Attributes that are pointer data types are followed by an asterisk (*). Thus, the attribute Left PreLoad Zone 412 is a pointer to a Location 398. One data type that might require explanation is CORBA Object Reference. This data type is a reference to a software object that is resident in another address space. (either on the same or a different computer). For example, the attribute Associated Load Area Controller 414 maps a destination data instance 396 to a load area controller (LAC) thread (described in reference to FIG. 9B) in a CLC 106 that manages a corresponding transport system load area. Note that implementations of the present invention are not limited to the use of CORBA Object References, but can use any other middle ware product that enables object references to be mapped between different address spaces and platforms. For example, DCOM could also be used.

Figure 11:
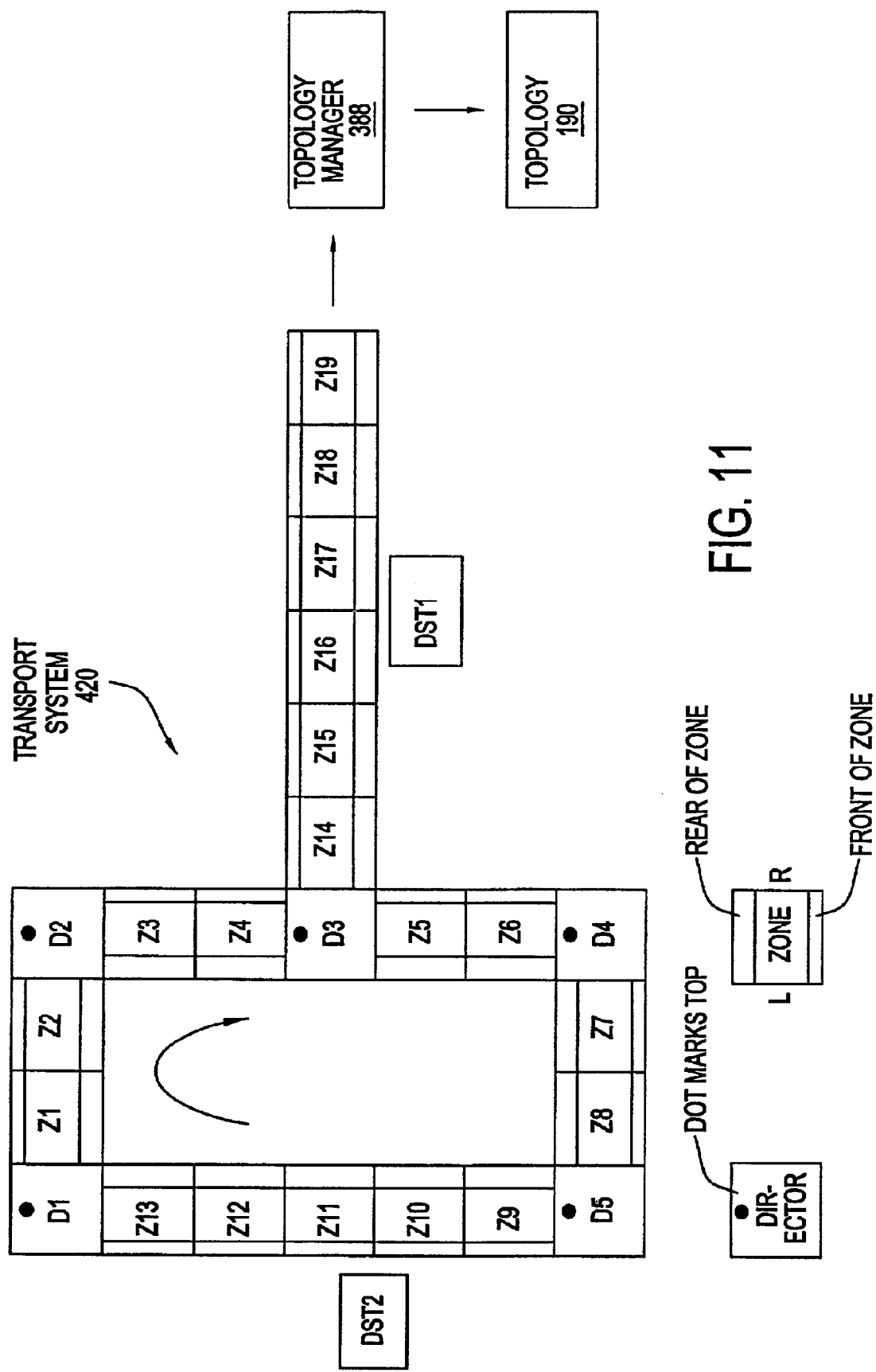
FIG. 11 is a schematic of a wafer transfer system incorporating a uni-directional loop and a bi-directional rail that is controllable with an embodiment of an ACS implemented in accordance with the present invention.

Referring to FIGS. 11 and 12, there are shown an example of a transport system configuration 420 and its representation as a topology 392. The transport system 420 includes a collection of directors D1–D5 and zones Z1–Z19 connected as a unidirectional ring and a straight length of rail. The transport system 420 includes a destination DST 1 between zones Z16 and Z17 and a destination DST 2 between zones Z10 and Z11. As described above, each of the destinations DST1, DST2 corresponds to a LPTD. Information describing the transport system 420 is provided to the TC 104 by the MCS 114 (FIG. 4). The topology manager 386 of the TC 104 subsequently generates the topology 392 (FIG. 12) from this information.

Figure 12A:
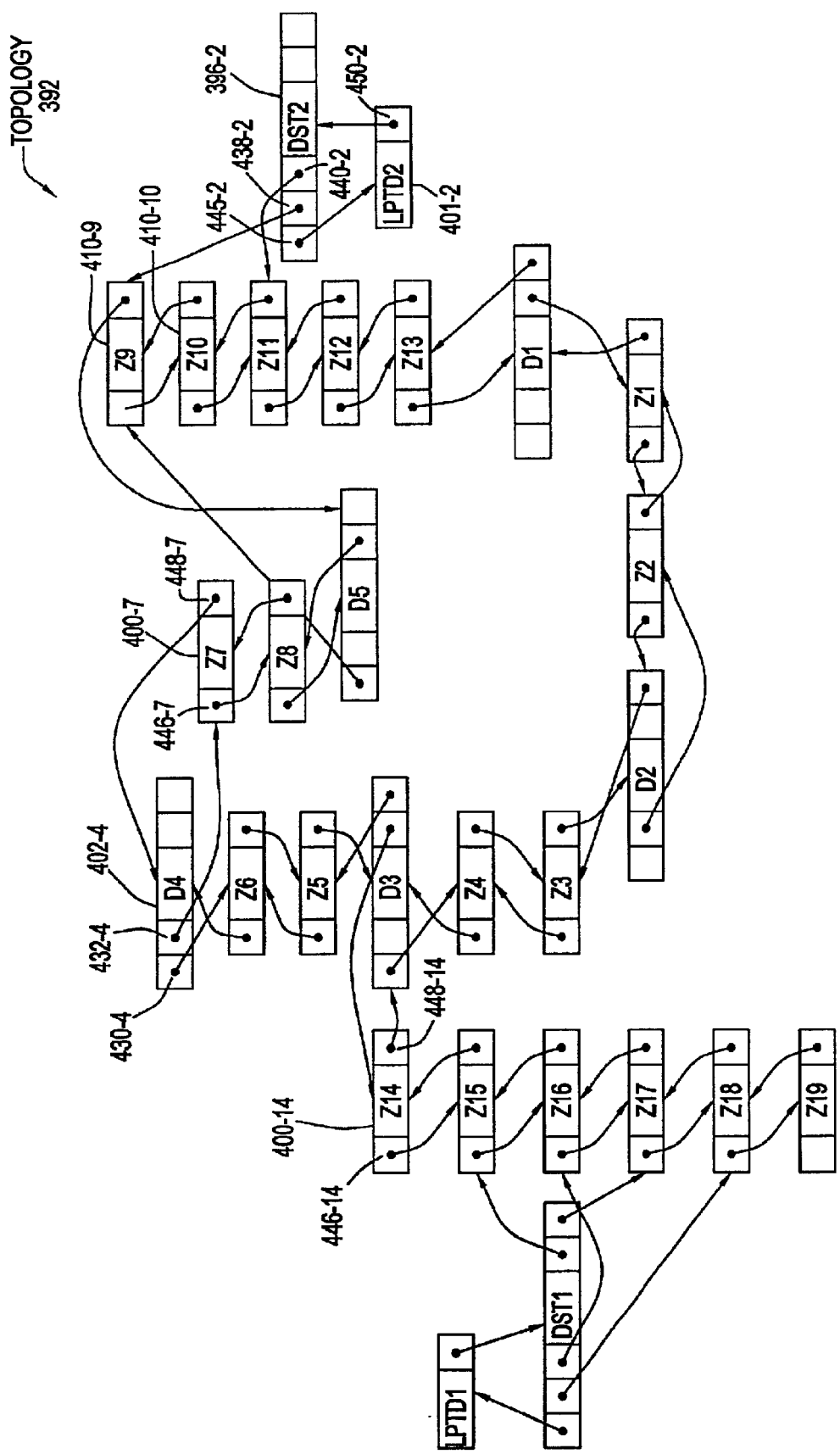
FIG. 12A is a block diagram of an internal topology maintained by the transport controller of FIG. 9A corresponding to the wafer transfer system of FIG. 11.
Figure 12B:
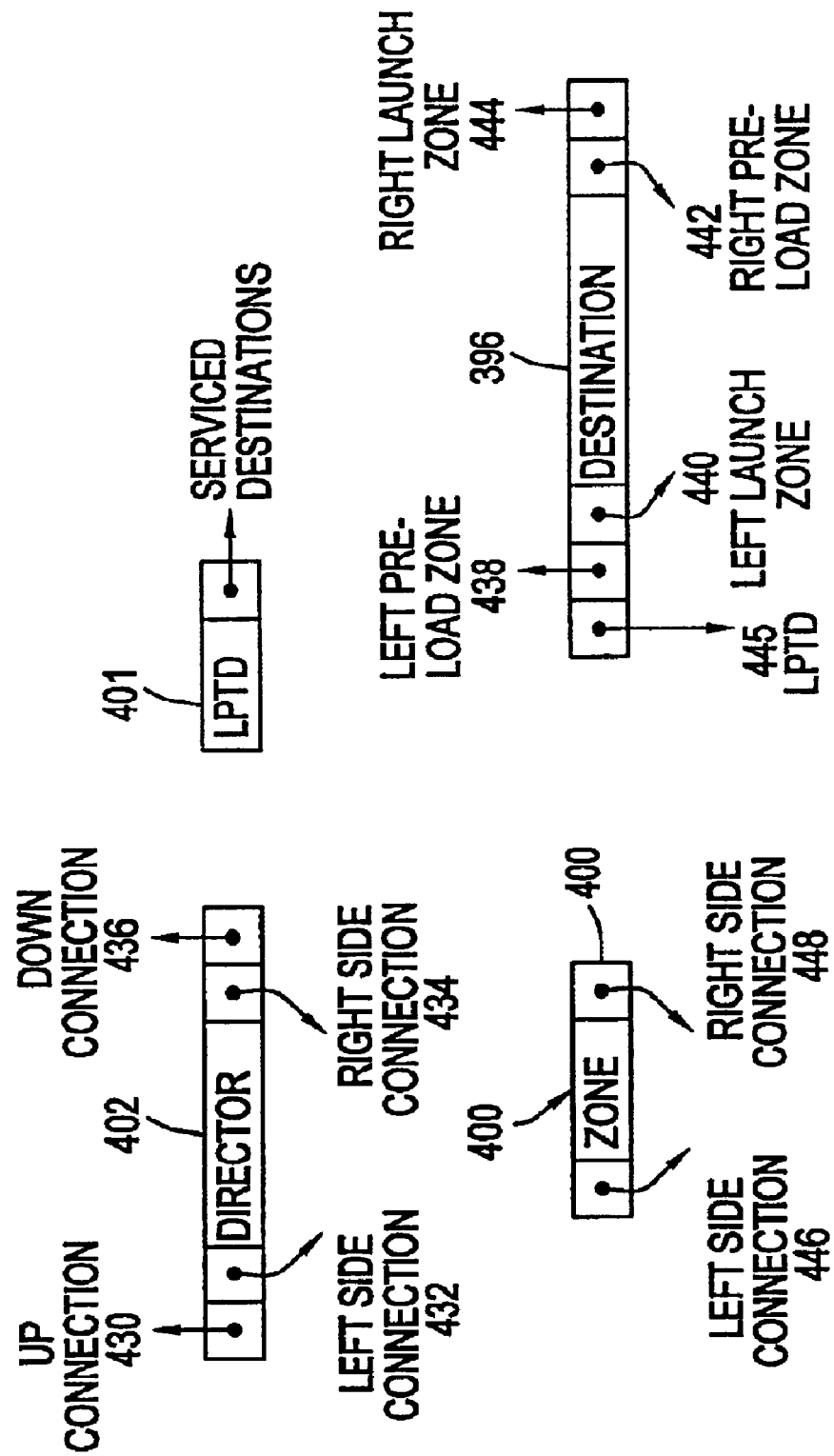
FIG. 12B describes the significance of connections used in FIG. 12A.

FIG. 12A shows the representation of the transport system 420 as a TC topology 392. Details of this representation are shown in FIG. 12B. Referring to FIG. 12B, each director data instance 402 has four pointers: an up connection 430, left side connection 432, a right side connection 434 and a down connection 436, corresponding to possible physical connections in two dimensions of a director. Each destination data instance 396 has five pointers: a left pre-load zone pointer 438, a left launch zone pointer 440, a right pre-load zone pointer 442, a right launch zone pointer 444 and an LPTD pointer 445. Each zone data instance 400 has two pointers: a left side connection 446 and a right side connection 448. Each LPTD instance 401 has a pointer 450 into a list of destinations it services. The TC 104 sets these pointers so as to completely represent the topology 392, as is shown in FIG. 12A. For example, the Destination DST2 396-2 has a left pre-load pointer 438 that points to the left pre-load zone Z9, a left launch pointer 440 that points to the left launch zone Z10 and an LPTD pointer 445-2 to the LPTD 401-2 associated with the destination DST2. The destination DST2 has right pre-load and right launch pointers 452, 454 with NULL values as containers can only move from left to right in the loop including the destination DST2 (i.e., there can be no pre-load or launch from the right of the destination DST2).

Figure 9B:
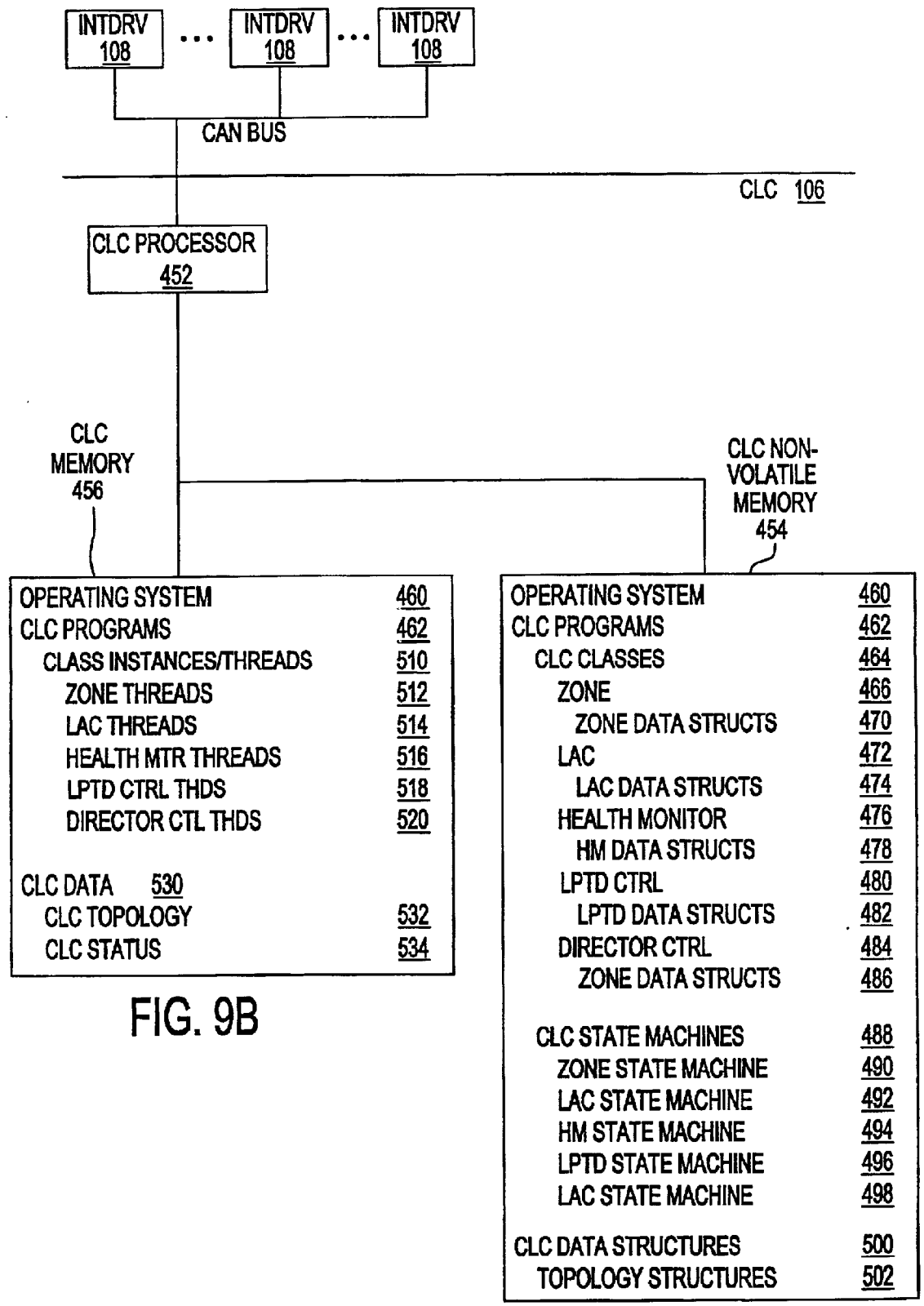
FIG. 9B is a block diagram of a computer in which control logic computer functions of an embodiment of the present invention are implemented.

Referring to FIG. 9B, there is shown a block diagram of a CLC 106. The CLC 106 includes a processor 452; a non-volatile memory 454, such as a hard disk or flash memory; and a fast, primary memory 456, such as a semiconductor, random access memory. According to well-known computing principles, the CLC 106 executes programs in the memory 456 under control of an operating system. The CLC 106 controls one or more intelligent drivers (IntDrv) 108 in its region of influence via commands issued over a CAN bus connection.

The non-volatile memory 454 permanently stores an operating system 460, CLC programs 462 and CLC data structures 500. The CLC programs 462 employ CLC classes 464 that include, but are not limited to, a zone class 466, a Load Area Controller (LAC) class 472, a Health Monitor (HM) class 476, a Load Port Transfer Device (LPTD) controller class 480 and a Director Controller (DC) class 484. Each of the CLC classes 464 includes respective methods (not shown) and data structures 470, 474, 478, 482, 486. The CLC classes 464, which determine key aspects of the CLC's functionality, are described in greater detail below. The CLC programs 462 also employ CLC state machines 488 that include, but are not limited to a zone state machine 490, LAC state machine 492, HM state machine 494, LPTD state machine 496 and a director state machine 498. The CLC classes 464 can include any other classes necessary to control a particular type of transport system component; e.g., the classes 464 can include a Elevator Controller (EC) class (not shown) when the system includes elevators. The CLC programs 462 and classes 464 can be stored as source code and/or executables.

The CLC data structures 500 include a group of data structures 502 that are used to define the physical topology of the neighborhoods of the transport system for which the CLC 106 is responsible. These data structures include information similar to but not necessarily identical in form to the various TC data structures 340 (FIG. 9A).

The operating system 460, CLC programs 462, class instances 510 (sometimes referred to herein as "objects" or "threads") and CLC data 530 are loaded into the primary memory 456 for use by the processor 452. The class instances 510 include zone threads 512, LAC threads 514, HM threads 516, LPTD control threads 518 and director control threads 520. Each of the threads 510 is an instance of one CLC class 464 and embodies the behavior specified by a respective CLC state machine 488. For example, a zone thread 512 is an instance of the zone class 466 and embodies the zone state machine 490. Similarly the LAC, HM, LPTD controller and DC threads 514, 516, 518, 520 are derived from the classes/state machines 472/494, 476/494, 480/494, 484/496. The CLC data 530 include a topology database 532 that comprises instances of the topology structures 502 linked to represent the CLC's local topology, and CLC status 534. A high level description of the various CLC threads 510 follows.

In one embodiment there is one zone thread 512 for each zone in the transport system. The zone thread controls a respective zone controller (ZC) 108a (FIG. 9C) and is intermediate between that zone controller and the TC 104. The zone thread operates cooperatively with other CLC threads 510, including other zone threads 512, LAC threads 514 and director control threads 520 associated with a common neighborhood. In particular, each zone thread 512 performs the following functions:

Maintains information about the status of all other zones within its neighborhood.

Communicates with its zone controller to effect motor control.

Communicates with its zone controller to obtain sensor data.

Communicates with its zone controller to forward new parameter and program data.

Executes the material spacing in speed control rules to allow safe, efficient movement of the material through the zone.

Controls access to the zone to insure only a single container may attempt to occupy the zone at any given time.

Figure 13:
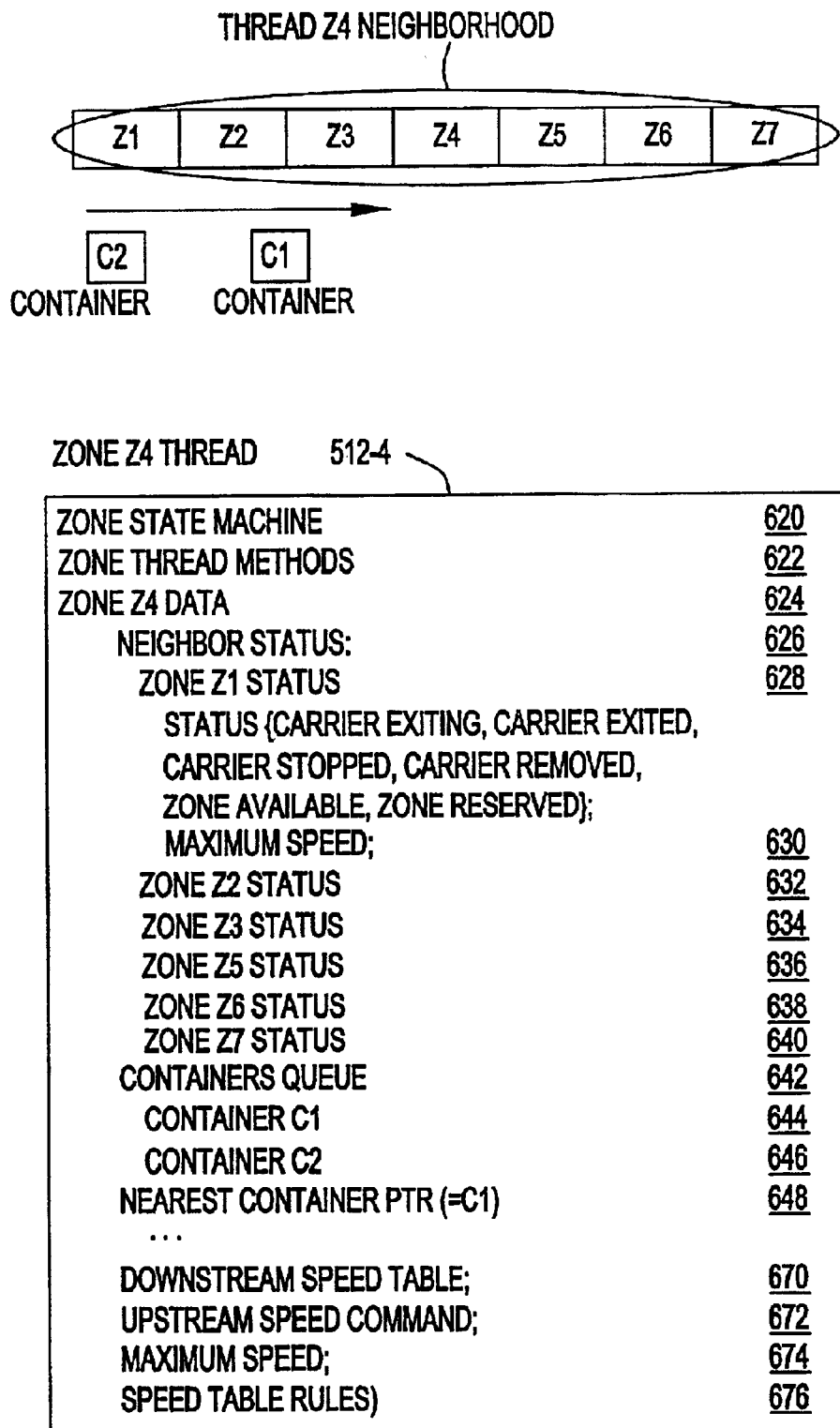
FIG. 13 is a block diagram of methods and data structures associated with a zone thread 512.

Additional details of the programs and data associated with a zone thread are now described in reference to FIG. 13.

Referring to FIG. 13, there is shown a block diagram of the programs and data structures associated with a representative zone thread 512-4 that controls a zone Z4. As shown in the upper portion of FIG. 13, one of the neighborhoods including the zone Z4 also includes the zones Z1–Z3 and Z5–Z7. For the purposes of the present description it is assumed that there are two containers C1 and C2 moving from left to right in the neighborhood. The zone thread 512-4 (and all zone threads) embodies a zone state machine 620, zone thread methods 622 and zone thread data 624. In particular, the zone thread data 620 for zone Z4 includes neighbor status 626, a containers queue 642, a nearest container pointer 648, a downstream speed table 670, an upstream speed command (or profile) 672, a maximum speed 674 and speed table rules 676.

The zone thread methods 622 perform the functions described above with reference to FIG. 9C under control of the zone state machine 620 using information contained in the zone data 626. The operations of the zone thread methods 622 are described in depth with reference to FIGS. 17–37.

The neighbor status 626 gives the status 628–640 of the neighboring zones Z1–Z3, Z5–Z7, respectively. Among other things, in one embodiment each zone status 628–640 can indicate one of:

carrier exiting (indicates a container is exiting the zone);

carrier exited (indicates a container has just exited the zone);

carrier stopped (indicates a container is stopped in the zone);

carrier removed (indicates a container has been unloaded from a zone—e.g., by a LPTD);

zone available (indicates that a container can move into the zone);

zone reserved (indicates that a zone has been reserved by a zone thread for movement of a container).

The containers queue 642 gives the status 644, 646 of the containers C1, C2, respectively. Each status record 644, 646 includes:

identification of the move object 381 associated with the container;

location of the container;

direction of movement of the container;

destination for the container.

The nearest container pointer 648 points to the record in the containers queue 642 associated with the container nearest the zone Z4.

For example, presuming that the destinations of the containers C1 and C2 are Dest1 and Dest2, respectively, and their move objects are 381-1 and 381-2, respectively, the container queue 642 for the situation shown in FIG. 11 would look as follows (the nearest container pointer 648 would point to the record 644 for the container C1):

| Containers Queue 642 | |
|---|---|
| Container | Queue data |
| C1 644 (nearest container) | move ID = 381-1;<br>location = exiting Z2;<br>move direction = right;<br>destination = Dest1; |
| C2 646 | move ID = 381-2;<br>location = Z1;<br>move direction = right;<br>destination = Dest2; |

In the illustrated embodiment the downstream speed table 670 contains current and historical speed data for containers passing through a zone. In one embodiment, the speed table 670 includes a speed number for each zone that is downstream from the current node (e.g., the speed table 670 for the zone Z4 would include current and historical speed numbers for the zones Z5, Z6 and Z7). The historical data is provided in case there is a need to revert to old data if a new speed profile is not executable. In other embodiments the historical speed data is not maintained. Each zone 512 updates its speed tables based on information received from upstream zones 512. For example, the zone Z4 512-4 updates its speed table 670 based on messages received from the zones Z1–Z3. Speed tables are discussed in depth below.

The speed table rules 676 describe how the zone thread Z4 uses the speed table information 670 to determine the next speed profile to be executed for a particular container. A speed profile specifies the speed of a container in the neighborhood zones that are downstream from the zone Z4. Among other things, a speed profile can specify that the speed of a container is to be maintained, slowed or increased in the neighboring, downstream zones. A speed profile can also be triangular, in which case the material ramps up to speed and back down again. Such a speed profile can be designated as a 0-0 profile executed in a single zone. In one embodiment the speed table rules 676 define how to derive a speed profile for a container as a function of current and historical speed of the container and other containers in the neighborhood (information available in the speed table 670)

and other factors, such as the physical configuration of the neighborhood. These profiles are predetermined to prevent collisions of pods in close proximity and to ensure smooth pod acceleration and deceleration. Other embodiments of the speed table rules 676 are also possible, including analytical expressions analyzed at runtime, expert system-type speed rules and combinations of any of the above.

The upstream speed command 672 is a command sent to the zone Z4 thread by an upstream zone thread to set the speed at which the zone Z4 thread must maintain, decelerate or accelerate the container when it is in the zone Z4. The upstream speed command 672 is derived from the downstream speed table of an upstream, neighboring zone (e.g, the zone Z3). The maximum speed 674 is a value that can be programmed or modified on the fly by an operator or the TC that limits the top speed at which a container can travel through a zone.

Referring again to FIG. 9B, in one embodiment there is a LAC thread 514 for each load area of the transport system. The LAC thread controls a handshake controller 108*f* (FIG. 9H) and, optionally, a tag controller 108*d* (FIG. 9F) and is an intermediary between those devices and the TC 104. The LAC 514 operates cooperatively with zone threads 512, a health monitor thread 516 and LPTD control threads 518 associated with a given load area. In particular, a LAC thread 514 performs the following functions:

Coordinates and communicates with an associated load port transfer device (LPTD) during material acquisition and deposition operations.

Coordinates and sequences the movement of material from an associated pre-load zone to load point during material deposition.

Coordinates and sequences the movement of material from the associated load point to downstream load zone during material acquisition operations.

In one embodiment there is one Health Monitor (HM) thread 516 running on each CLC 106. Each health monitor thread monitors the health of its associated intelligent drivers 108, is intermediate between that driver and the TC 104 and communicates with other CLC threads whose operations are associated with the same intelligent driver 108. In particular, a health monitor thread 516 performs the following functions:

Continuously monitors specified intelligent driver applications to insure that it is operating.

Notifies the associated control thread of any change in zone controller operational state.

In one embodiment there is one LPTD control thread 518 for each transfer mechanism that moves material on and off the transport system rail. Each LPTD control thread 518 controls the operations of its associated transfer mechanism. There is a particular type of LPTD control thread for each type of mechanism. Each LPTD control thread is an instance of a particular LPTD class. The function of a LPTD control thread is to:

Obtain, from a load port, material which is to be moved to a new location.

Optionally identify the material.

Transfer material from the track to a load port.

In one embodiment, there is one director control thread 520 for each director in the transport system. Each director control thread 520 controls the flow of one or more materials through its associated director according to the transfer system topology and allowed movement directions in the director's vicinity. In particular, a director control thread 520 performs the following functions:

allow material from multiple input locations to be routed to one of multiple output locations.

determine which output location to use based on knowing the destination of the material and the possible routes through the director to that destination.

The intelligent drivers controlled by the CLC threads 510 are now described in reference to FIGS. 9C–9H.

FIG. 9C is a block diagram of a computer in which zone controller functions for an embodiment of the present invention are implemented. The zone controller 108*a* includes a zone controller (ZC) program 550 and ZC data 552. Under direction of the ZC program 550 the zone controller 108*a* controls and monitors the hardware that composes a zone. Any information needed by the ZC program 550 is stored as the ZC data 552, which includes:

maximum speed of material, centimeters of travel per wheel revolution, sensor debounce count, zone length, and network address of device.

The zone controller 108*a* includes specialized hardware and software to interact with particular types of zones. E.g., the illustrated zone controller 108*a* and the ZC program 350 are specialized to interact with a zone including two sensors 554, 556 and a motor 558. Particular functions of the ZC 108*a* include:

Monitoring and debouncing the sensors 554, 556.

Communicating changes in sensor state to the associated zone thread 512 in the CLC 106.

Accepting and executing motor 558 control commands.

FIG. 9D is a block diagram of a computer in which axis controller functions for an embodiment of the present invention are implemented. The axis controller 108*c* includes an axis controller (AC) program 714 and AC data 720. Under direction of the AC program 720 the axis controller 108*c* operates a single axis of motion (x, y, z or theta) of a conveyance mechanism (e.g., a LPTD axis) 564. The axis controller 108*c* accepts commands to move between a pre-determined number of positions along the axis. The position locations may be determined by sensors or by an absolute offset from a known location. Any information needed by the AC program 714 is stored as the AC data 720, which includes:

microsteps from home to cache location, number and types of sensors, sensor threshold values, total axis travel distance, and axis controller network address.

The axis controller includes specialized hardware and software 714 to interact with particular mechanisms 564.

FIG. 9E is a block diagram of a computer in which ID controller functions for an embodiment of the present invention are implemented. The ID controller 108*d* includes a tag controller (TC) program 706 and TC data 572. Under direction of the TC program 572 the ID controller 108*d* reads pod identification data from a pod's identification tag. There is a specific ID controller application for each type of tag. For example, there would be separate applications for an Asyst RF tag, an Asyst IR tag or a barcode tag. Any information needed by the TC program 706 is stored as the TC data 572, which includes:

tag type, read lot ID (Y/N), read electronic serial number (ESN) (Y/N), lot ID length, ESN length, starting address of Lot ID in tag, and ID controller network address.

FIG. 9F is a block diagram of a computer 108e in which emergency off (EMO) controller functions for an embodiment of the present invention are implemented. The EMO controller 108e includes an EMO controller (EMOC) program 722 and EMOC data 582. Under direction of the EMOC program 722 the EMOC 108e monitors alerts from an EMO sensor 584 associated with a transport system power supply and reports alerts to a respective health monitor thread 516. There is a specific EMOC program 722 for each type of EMO sensor 584. Any information needed by the EMOC program 722 is stored as the EMO data 582, which includes:

EMO controller network address,

EMO sources (e.g., fire alarm, operator, push button, etc.), and message to send for each EMO source.

FIG. 9G is a block diagram of a computer 109f in which handshake controller functions for an embodiment of the present invention are implemented. The handshake controller 108f includes a handshake controller (HC) program 590 and HC data 592. Under direction of the HC program 590 the HC 108f provides a SEMI E-23 interface between the transport system and a load port. The handshake controller 108f is provided with commands that it converts to the proper handshake protocol, depending on whether the transport system is acting in the active or passive role. Any information needed by the HC program 590 is stored as the HC data 592, which includes:

HC network address,

Table that maps E23 control line names to physical I/O addresses.

The previous descriptions have been directed to one particular hardware embodiment where the TC, CLCs and intelligent drivers are implemented in separate computer systems. However, the present invention can be implemented in myriad hardware configurations. For example, the CLCs 106 and the TC 104 could be implemented as a single, powerful computer system or the CLC programs 462 could be distributed one by one to smaller CPUs. Common to all of these implementations is a basic logical model of the invention describing the control flow and interactions between the system software objects. These software objects include high-level components (e.g., the TC class instances 380) mid-level components (e.g, the CLC class instances 510) and low-level components (eg., the intelligent drivers 108). The system logical model is now described in reference to FIGS. 14–16.

Figure 14:
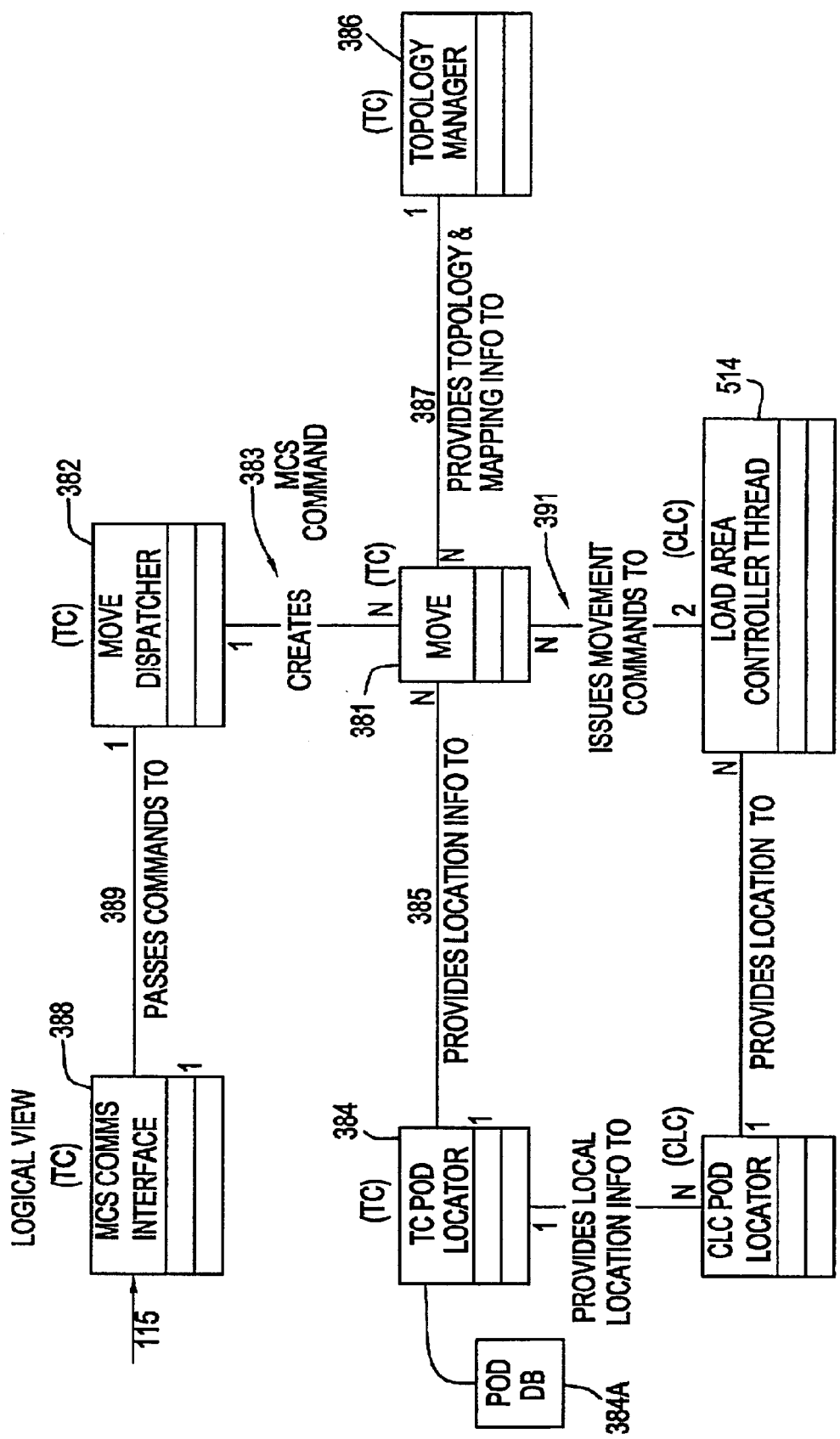
FIG. 14 is a logical view of software components of the TC and CLC that initiate and coordinate a move operation.

FIG. 14 shows a logical view of selected high-level (TC) and mid-level (CLC) software components that initiate and coordinate transport system operations in response to commands issued by the MCS 114. The high-level components include a MCS communications interface 388, a move dispatcher 382, move objects 381 and topology manager 386. The mid-level components include LAC controller threads 514, the topology manager 386 and the pod locator. The MCS communications interface 388 receives remote commands 115 (FIG. 4) from the MCS 114 and relays to the move dispatcher 382 those MCS commands 389 involving material movement.

The remote commands 115 are defined by the *Intrabay AMHS Transport Specific Equipment Model*, Document 2878, Rev A (Jul. 31, 1998), and its successors, published by Semiconductor Equipment and Materials International, Mountain View Calif., which is incorporated herein by reference. The remote commands 115 (FIG. 4) are summarized in TABLE 1, whose columns include: remote Command name, remote command Description and command Parameter name (sometimes referred to as cpname). The command parameters are described in TABLE 2.

TABLE 1

MCS Commands 115

| Command | Description | Parameters |
| --- | --- | --- |
| Cancel | cancel an outstanding remote command by command ID | COMMANDID PRIORITY |
| Identify | perform a carrier identification | COMMANDID PRIORITY VEHICLEID DESTPORT |
| Install | update the TC database by adding a specified carrier identification to a specified vehicle identification at a specified carrier location | COMMANDID PRIORITY VEHICLEID CARRIERID CARRIERLOC |
| Pause | remotely pause the state of the TC | None |
| Resume | remotely resume the state of the TC | None |
| Transfer | perform the entire transfer job for a single carrier to be transferred from one load point to another | COMMANDID PRIORITY TRANSFERINFO |

TABLE 2

Command Parameters

| CPNAME | DESCRIPTION | RANGE |
| --- | --- | --- |
| ACQUIREINFO | One record with two fields: XFERPORT CARRIERID | |
| CARRIERID | ID of the carrier being moved | alphanumeric |
| COMMANDID | Remote command ID (can be used to subsequently refer to a remote command) | |
| DEPOSITINFO | One record with two fields: XFERPORT CARRIERID | |
| DESTPORT | Destination port (load point) unique identifier | alphanumeric |
| PRIORITY | Remote command priority | NORMAL HIGH |
| SOURCEPORT | Source port (load point) unique identifier | alphanumeric |
| TRANSFERINFO | One record with three fields: CARRIERID SOURCEPORT DESTPORT | |
| TRANSFERPORT | Transfer port unique identifier | alphanumeric |

The move dispatcher 382 creates a move object 381 that coordinates the transport system operations needed to carry out a particular MCS command 383 using information 385, 387 provided by the pod locator 384 and the topology manager 386. The topology manager 386 provides the move object 381 with transport system layout information 387 to verify that there is a working route between the MCS specified source and destination locations. Each record of the pod database 384a includes for each pod within the transport system: CARRIERID of carrier and related move loaded in the pod.

As shown in FIG. 14, the pod locator 384 can communicate with all active move objects 384. The information 387, which is derived from the topology database 390 described in reference to FIG. 10, provides topology information for parts of the rail involved in the MCS command

383. The move object 381 executes the MCS command 383 by issuing a series of movement commands 391 to the Load Area Controller (LAC) threads 514 associated with the source and/or destination load ports associated with the command.

For example, assume that the move object 381 is to carry out the following move command 383:

TRANSFER (COMMANDID=020, PRIORITY=HIGH, SOURCE-PORT=37, DESTPORT=272).

The move object 381 queries the topology manager 386 for information on the transport system topology between the location "37" and the rail position associated with the unique destination point identifier "272", to which the pod is to be moved. Once the move object 381 has verified that there exists at least one operational route to the destination (DESTPORT=272), a command to acquire material is issued to the LAC associated with location "37". In the above example, this move command is assigned by a COMMANDID of 020 that uniquely identifies this command to the objects that implement it. Once the LAC has indicated the material has been acquired, additional commands will be issued to move the material to the destiantion location (under the control of another LAC), and then to move the material off the conveyor and onto the destination location. This scenario assumes that a pod to be moved starts out in a load area. When a pod to be moved is not initially in a load area (following a power failure) the move object 381 interacts directly with other types of threads (e.g., director control threads or zone threads) that are in a position to move the pod. It is now described in reference to FIG. 15 the connections between the LAC thread and other CLC threads that enable the movement commands 391 to be carried out in a distributed manner.

Figure 15:
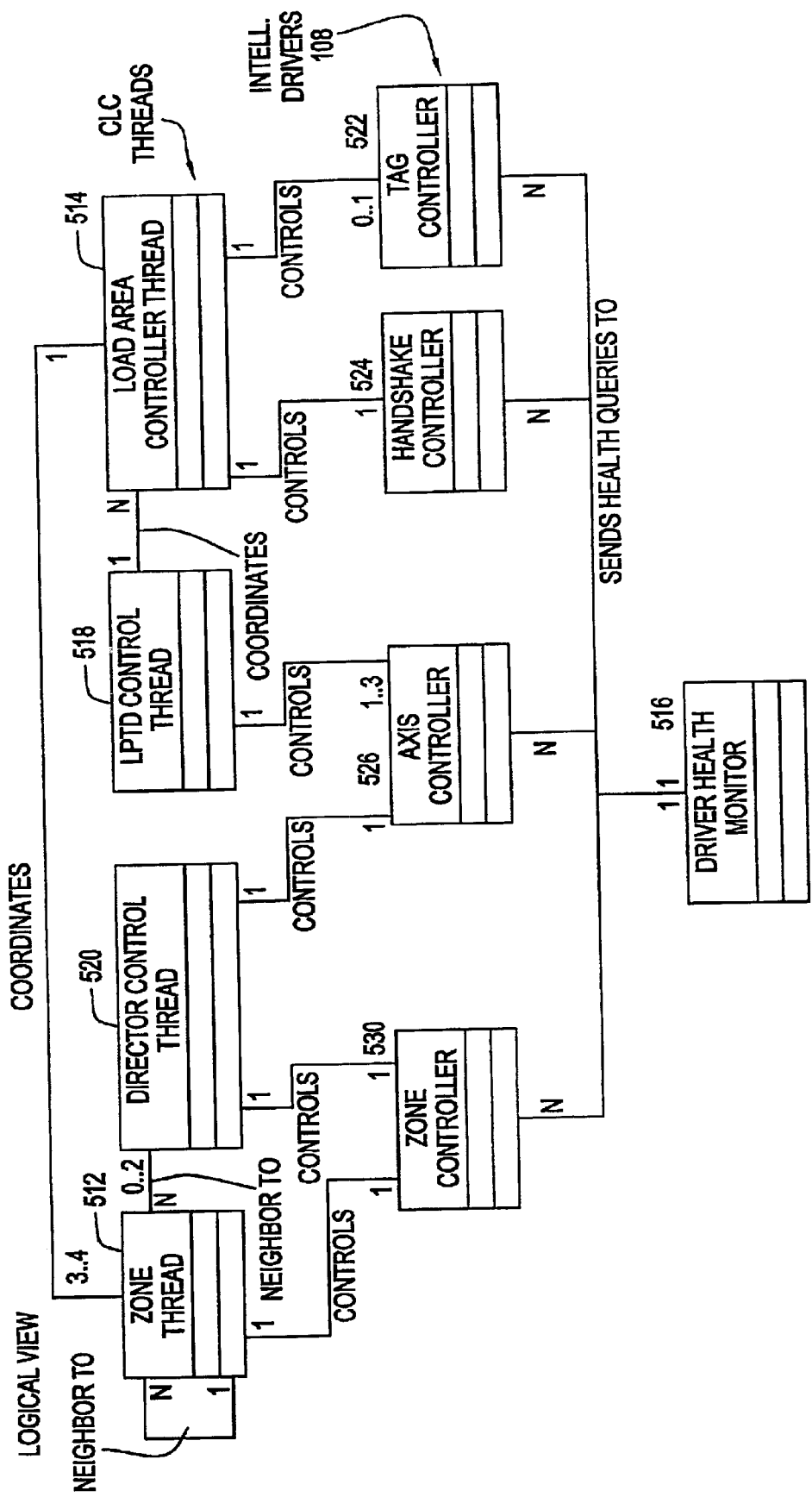
FIG. 15 is a logical view of software components of the CLC and the intelligent drivers that issue carry out the sub-commands that compose the move operation and other transport system operations.

FIG. 15 is a logical view of mid-level software components and the intelligent drivers that carry out the sub-commands that compose the movement commands 391. The mid-level components include the driver health monitor 516, LAC thread 514, LPTD control thread 518, director control thread 520 and zone threads 512. The intelligent drivers include the zone controllers 530, axis controllers 526, handshake controllers 524, tag controllers 530.

Each LAC thread 514 coordinates the operation of a LPTD control thread 518 and a number of zone threads 512 (those that form a load area). Each LPTD control thread 518 may interact with multiple LAC threads 514 as a single load port transfer device may service multiple load areas. Each zone thread 512 is a neighbor to one or many other zone threads 512 and also can be a neighbor to between 0 and 2 director control threads 520 (a zone thread has a director control thread as a neighbor when the zone thread's associated zones are in the neighborhood of a director). CLC threads, including the zone threads 512, director threads 520, LPTD control threads 518 and the LAC threads 514 typically control one or more intelligent drivers 108.

As already described, a zone thread 512 controls a zone controller 530, a director control thread 520 controls a zone controller 530 and an axis controller 526, a LPTD control thread 518 controls one to three axis controllers 526, and a LAC controller 514 controls a handshake controller 524 and an ID/tag controller 522. Each of the intelligent drivers 108 is also monitored by a CLC driver health monitor thread 516 that reports the health of a respective driver 108 back to the associated control object 381 (FIG. 14).

Figure 16:
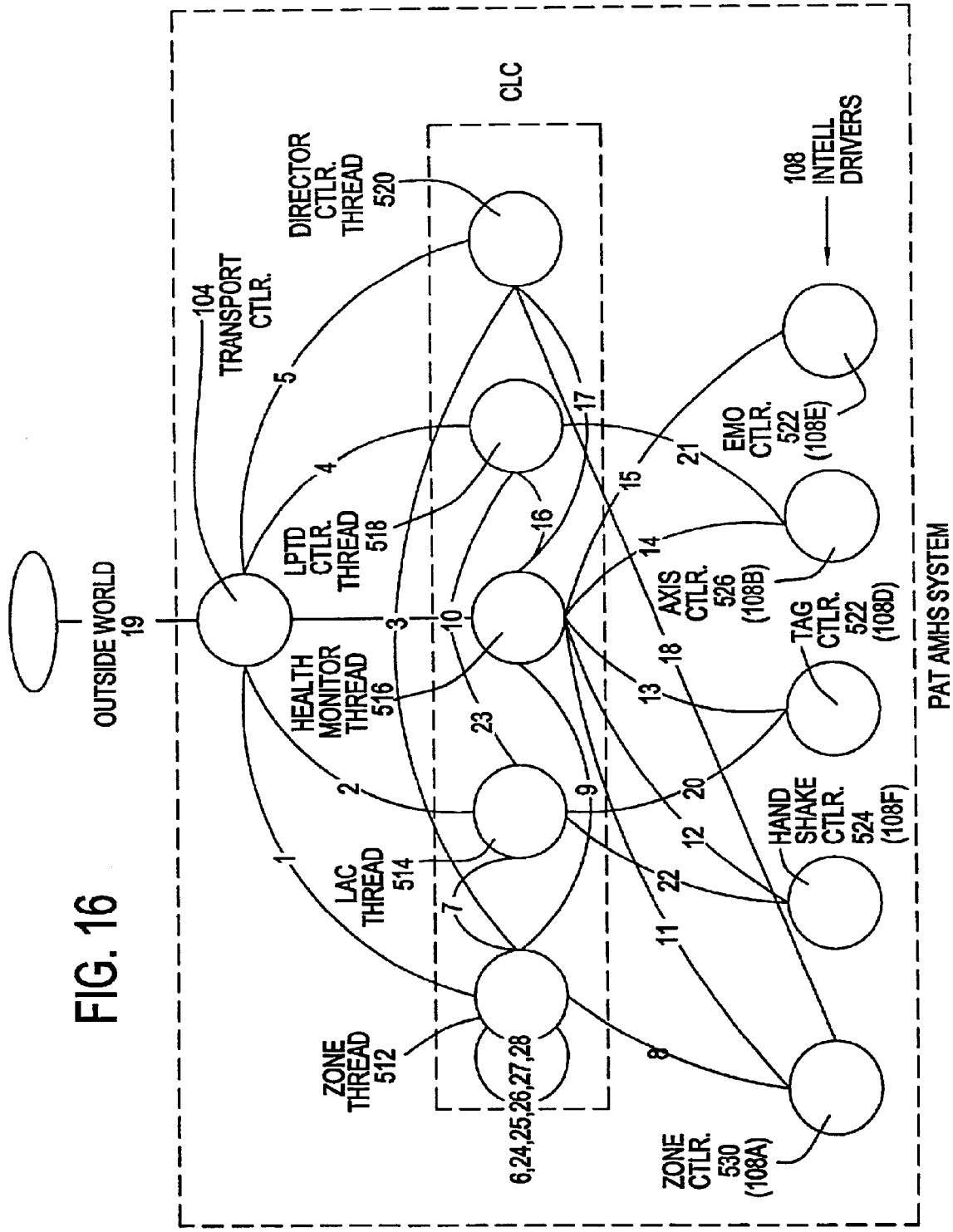
FIG. 16 is a diagram of the communication paths between principal software components of the automated control system of the present invention.

Each of the connections shown in FIGS. 14 and 15 represents a communication path between system objects. Another view of these communication paths is shown in FIG. 16, which represents key CLC software components and intelligent drivers with a circle and each inter-object communication path with a numbered arc connecting the circles. The TC components (e.g., the move object and transport dispatch controller of FIG. 14) are collectively represented with a single circle labeled "Transport Ctlr". Each number on an arc represents one communication path. An arc with multiple references indicates that there are multiple connections between respective instances of an object type. For example, assuming a neighborhood of seven zones, a zone thread 512 has separate communications paths 6, 25, 26, 27, 28, 29 with each of the other zone threads 512 in its neighborhood.

Referring again to FIG. 15, when it receives a command to move a pod the LAC thread 514 initiates the move command by sending out pod movement sub-commands to the zone threads that compose its load area. Those zone threads then issue sub-commands to their intelligent drivers 108 and other CLC threads (e.g, director control threads 520 and other zone threads 512) in their neighborhood to implement the requested operation in accordance with the threads' capabilities, described in reference to FIGS. 9A–9H. Specific command sequences of inter-object communications and activities used to implement a transfer command 115 and set of atomic operations, or movement commands 391, are now described in reference to FIGS. 17–30.

D. Principles of System Operation

FIGS. 17–30 are sequence diagrams that illustrate communications and operations of the TC and CLC software components and the intelligent drivers. Sequence diagrams are well-known and are therefore described herein only briefly. Across the top of each sequence diagram is a listing of a software component that is involved in the associated command sequence. The communications/commands flowing between the various software components are shown as directed lines from the software component issuing the command to the receiver; most of the lines are labeled with an associated command or message name. The commands are listed from the top to the bottom of the sequence diagram in the order they are issued. Key operations performed by a software component are shown as a labeled box positioned directly beneath the component. The operations are typically performed by a particular component in response to an incoming command and result in the particular component sending a return command. Before describing the command sequences associated with the transfer command 115 and some of the atomic operations three different methods of initiating the movement commands are described.

The atomic operations can be initiated by either a computer integrated manufacturing (CIM) system (corresponding to the Manufacturing Execution System 112, FIG. 4) of, or by a automated material handling system (AMHS) (corresponding to the Material Control System 114, FIG. 4) with or without involvement of the CIM. The one difference between the AMHS-initated command scenarios and the CIM-initiated command scenarios is that the AMHS scenarios are "bottom-up", meaning that they can be used to initiate pod movement in the absence of commands from the CIM system. This bottom-up capability could be used when:

a) the CIM system is down or off-line,
b) the AMHS system is not connected to a CIM system, or
c) the CIM system supports a bottom up mechanism.

The three methods of movement initialization are now described.

1. CIM System Movement initialization

When a CIM system initiates a movement it is the responsibility of the CIM to communicate with the tools so that it is notified when a tool requires service. The flow of events in this case is as follows:

(1) The MCS receives notification from a tool that it requires service. The MCS generates a Host Command to the Transport Controller's dispatcher in response. In the illustrated embodiment the command sent must be TRANSFER (summarized in Table 1, above).

(2) The TC dispatcher creates a new TC move object and sends it the host command.

(3) The TC move object communicates with the appropriate Load Area Controller(s) in the CLC(s) to effect the command. Once complete, the move object sends a Host Command Complete message back to the MCS.

2. AMHS Movement Initiation with CIM Participation

In this scenario, the MCS 112 also participates in the movement, which is initiated by the AMHS tool. The flow of events is as follows:

(1) The LAC receives an unload request from a load port via an E23 interface, and sends a MOVEMENT$_{13}$ REQUEST to the Transport Controller's movement dispatcher.

(2) The movement dispatcher forwards the movement request to the MCS.

(3) The MCS responds by generating a Host Command back to the Transport Controller's dispatcher containing the destination.

(4) The dispatcher creates a new move object and instructs it to carry out the specified TRANSFER command.

(5) The newly created move object sends a series of commands to the source and destination Load Area Controllers in the CLC to effect the move.

(6) Once the operation has completed, the move sends a Host Command Complete back to the MCS.

3. AMHS Movement Initiation without CIM participation

In this scenario, the MCS does not participate in the movement. The flow of events is as follows:

(1) The LAC receives an unload request from a load port via E23, and sends a MOVEMENT_REQUEST to the Transport Controller's movement dispatcher.

(2) The movement dispatcher creates a new move object and instructs it to carry out a TRANSFER operation. The dispatcher obtains the destination by consulting a default destination table. The table contains a default destination for each source.

(3) The newly created move object sends a series of commands to the source and destination Load Area Controllers in the CLC to effect the move.

There is also a fourth method of movement initialization where a TC 104 has a user interface (UI) from which an operator identifies a source and destination and tells the TC 104 to move whatever material is at the source to the destination. From the UI the operator can issue transfer, acquire, move or deposit commands.

4. System Operations

Having described the four methods of movement initialization, exemplary command sequences associated with the transfer and atomic operations are now described. These descriptions will refer to various messages, commands and events that are transmitted between the system elements that carry out these command sequences. In most cases, these messages, commands and events are not described in depth. Detailed information on at least some of these commands and events is provided in Appendices A, B and C, which respectively describe External events (i.e., events reported between the CIM and the Transport Controller TC), intra-CLC events (i.e., events reported by one CLC object to another CLC object) and CAN Bus messages (i.e., messages issued to/by the intelligent drivers by/to CLC objects or the intelligent drivers). The system operations are now described in the following order:

a. Transfer Material;

b. Acquire Material;

c. Move Material;

d. Deposit Material;

a. Transfer Operation

In one embodiment the CIM system 110 (FIG. 4) initiates via a single CIM system command 115(TRANSFER) a transfer operation that results in a point to point material move. The Transport Controller 104 (FIG. 4) breaks the transfer command down into individual acquire, move and deposit operations and executes each of these commands sequentially. This embodiment keeps the CIM system software relatively simple by shifting responsibility for material movement operations onto the Transport Controller.

In another embodiment, the CIM system 110 can direct point to point material movement by issuing a number of atomic commands, such as acquire, move and deposit, to the TC 104, which implements the commands accordingly. This embodiment requires the CIM system 110 to oversee the execution of each atomic command and correspondingly simplifies operation of the TC 104.

Figure 17:
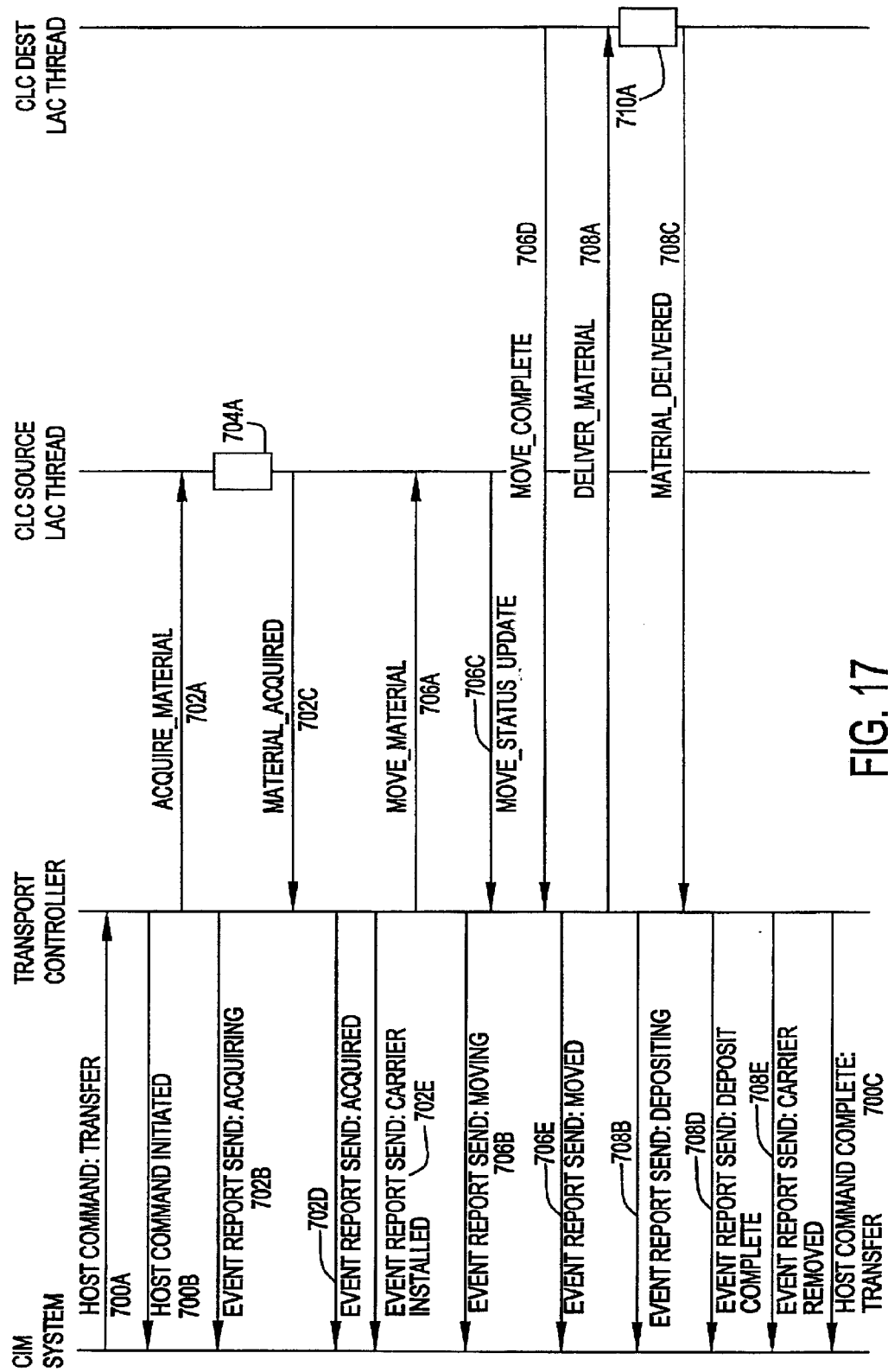
FIG. 17 is an event diagram of a transfer atomic operation shown from a high-level point of view.

Referring to FIG. 17, there is shown a sequence diagram of the commands exchanged between the CIM system 110 and the TC 104 as the TC executes a TRANSFER host command 700a. After initiating the TRANSFER command the TC returns a "Host Command Initiated" message 700b. As the TC sequences the atomic commands necessary to perform the TRANSFER it returns status commands indicating progress of the atomic operations composing the TRANSFER command. When the TRANSFER operation is completed the TC returns a "Host Command Completed" message 700c. The various atomic operations and status commands shown in FIG. 17 are described below.

b. Acquire Atomic Operation

The Acquire operation causes the Transport System to acquire material from a Load Port or an Overhead Hoist Transport (OHT) system. From the perspective of the Transport Controller, the Acquire operation for both of these scenarios is the same. However, the CLC treats each scenario differently in accordance with the different interface requirements of the source systems.

In the first scenario the transport system acquires material from the load port of a tool or stocker using a Load Port Transfer Device. In this case, the load port, which is passive, simply signals its desire to be unloaded. In response, the LPTD, which is active, performs the material transfer under control of the CLC. In the second scenario the transport system acquires material from an Overhead Hoist Transport (OHT) system, which deposits the material onto a pod lifter. In this case, the pod lifter is the passive device that signals its desire to be loaded and the OHT is the active device that effects the transfer.

FIG. 17 shows a high-level view of the command sequence of the Acquire operation. As already mentioned, this sequence is the same no matter how the material is acquired (i.e., from an OHT or from a LPTD). This sequence involves the following steps:

(1) the TC initiates an ACQUIRE operation;

(2) the TC issues an ACQUIRE_MATERIAL command (702a) to the CLC LAC thread;

(3) the TC returns an Event Report Send message (702b) indicating the status of the operation is "Acquiring";

(4) the CLC LAC performs the ACQUIRE_MATERIAL command by moving the material from the load port onto the rail (704a) and then returns to the TC a MATERIAL_ACQUIRED message (702c);

(5) the TC returns a Event Report Send messages (702d, 702e) indicating that the material has been "Acquired" and the carrier (pod) installed on the track.

Figure 18:
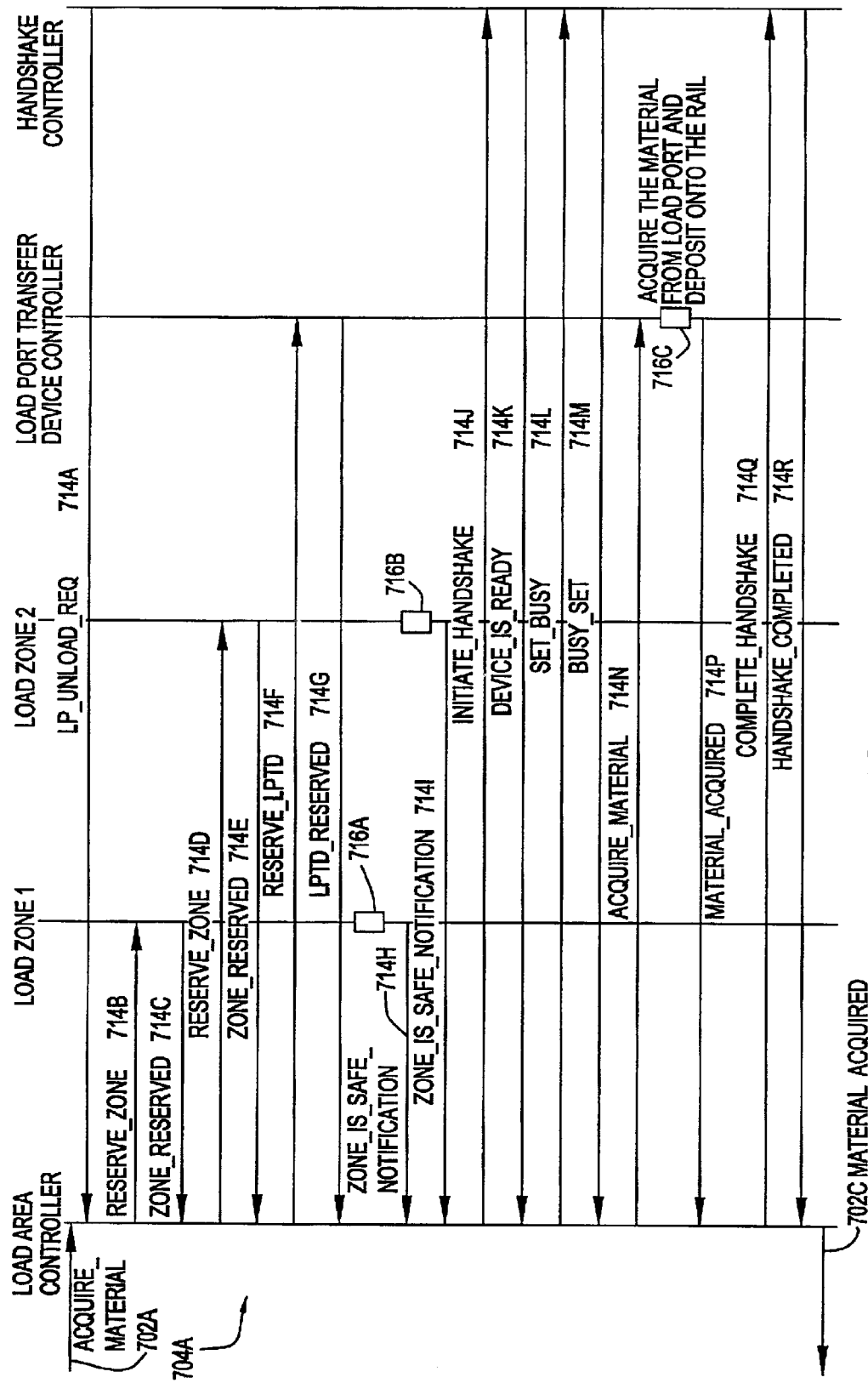
FIGS. 18–19 are event diagrams of an acquire atomic operation shown from viewpoints of different control system components (FIG. 19 is for a specific transfer device embodiment and would be different for other electromechanical systems)

FIG. 18 shows from the viewpoint of the CLC the command sequence of the Acquire operation performed using a LPTD. A different command sequence would be required for an OHT (Overhead Hoist Transport), but this sequence is so similar to the present description that it is not described herein. This command sequence presumes that the LPTD from which the pod is to be acquired has a load area with two load zones (Load Zones 1 and 2). Note that at the time the material is acquired from the load port that the CLC does not know what direction the material will move in, so it is unknown which of the two load zones is upstream or downstream.

This sequence involves the following steps:

(1) the CLC LAC receives the ACQUIRE_MATERIAL command (702a) from TC (see FIG. 17);

(2) the LAC receives an unload request message (LP_UNLOAD_REQ) (714a) from the Handshake Controller, which indicates that the stocker or tool is ready to be unloaded by the LPTD—this message is the passive message referred to above in which the load port simply signals its desire to be unloaded;

(3) the LAC sends a RESERVE_ZONE message to the zone thread associated with zone 1 to reserve that zone for the ACQUIRE operation (714b) (i.e., ensure that any incoming material stops prior to the zone);

(4) the zone thread associated with zone 1 confirms with a ZONE_RESERVED message that zone 1 has been reserved (714c);

(5) the LAC sends a RESERVE_ZONE message to the zone thread associated with zone 2 to reserve that zone for the the ACQUIRE operation (714d);

(6) the zone thread associated with zone 2 confirms with a ZONE_RESERVED message that zone 1 has been reserved (714e);

(7) the LAC sends a RESERVE_LPTD message to the LPTD controller to reserve the LPTD for the the ACQUIRE operation (714f) (to ensure that another LAC does not attempt to use the LPTD);

(8) the LPTD controller confirms with a LPTD_RESERVED message that the LPTD has been reserved (714g);

(9) the zone 1 thread waits until either the neighborhood is empty or the nearest pod has stopped (716a) and then returns a ZONE_IS_SAFE_NOTIFICATION indicating that zone 1 is available for the ACQUIRE operation (714h);

(10) the zone 2 thread waits until either the neighborhood is empty or the nearest pod has stopped (716b) and then returns a ZONE_IS_SAFE_NOTIFICATION indicating that zone 1 is available for the ACQUIRE operation (714i);

(11) once it has verified that the zones and LPTD are safe it the LAC controller issues an INITIATE_HANDSHAKE message (714j) to the Handshake Controller, which, if the associated load port is ready, returns a DEVICE_IS_READY message (714k).

(12) the LAC controller then sends a SET_BUSY message (714l) to the Handshake Controller, which sets the BUSY bit on its interface with the load port (LP) and, when the LP responds, sends a BUSY_SET message, (714m);

(13) the LAC controller then issues an ACQUIRE_MATERIAL message (714n) to the LPTD controller, which acquires the material from the load port and deposits it onto the rail (716c) and then returns a MATERIAL_ACQUIRED message (714o) to the LAC thread;

(14) the LAC thread and the the handshake controller exchange COMPLETE_HANDSHAKE AND HANDSHAKE_COMPLETED messages (714q, 714r) to terminate the interaction with the load port and the LAC thread returns MATERIAL_ACQUIRED to the TC (702c) (FIG. 17).

Figure 19:
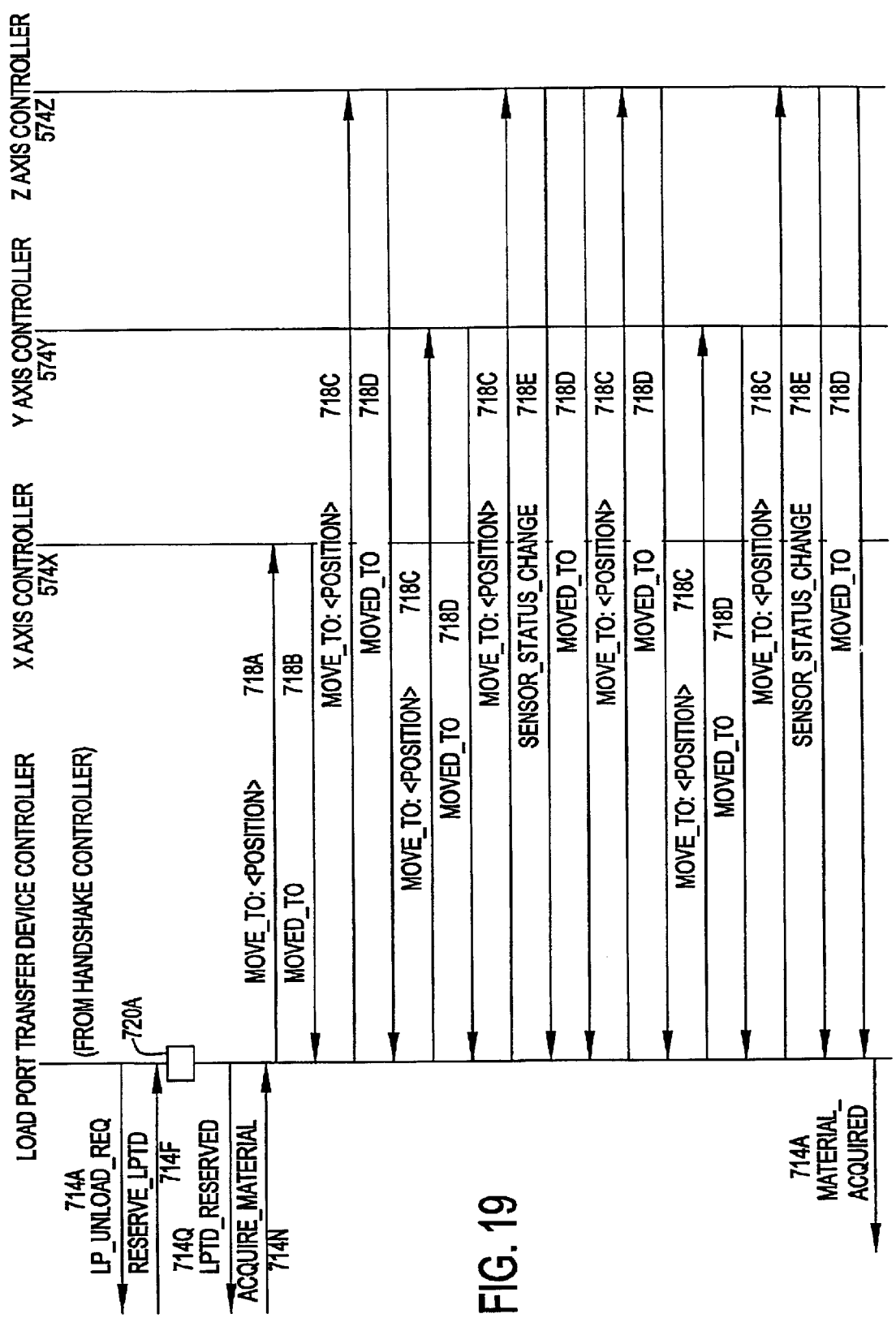

FIG. 19 shows from the viewpoint of the LPTD controller the command sequence of the Acquire operation performed using a specific type of LPTD. Different command sequences are required for different LPTDs, but these sequences are similar to present description and are not described herein. The illustrated sequence assumes the LPTD controller includes independent controllers for the X, Y and Z axes 574x, 574y, 574z. It is presumed that the X axis is in the direction of the track, the Y axis perpendicular to and in the plane of the track and the Z axis perpendicular to the plane of the track.

This sequence involves the following steps:

(1) after receiving the RESERVE_LPTD command (714f) the LPTD controller verifies that it is not servicing another loadport through a different LAC, then responds to the reservation request (720a);

(2) the LPTD controller then returns the LPTD_RESERVED message (714g) and waits for the ACQUIRE_MATERIAL message (714n) from the LAC;

(3) after receiving ACQUIRE_MATERIAL the LPTD controller issues a series of MOVE_TO <position> messages 714c to the X, Y and Z axis controllers to cause each axis controller to move the pod along their respective axis to the specified position;

(4) the X and Y axis controllers respond to the MOVE_TO command 714c by executing the move and returning a MOVED_TO message 714d that indicates the post-movement position of the pod;

(5) the Z axis controller responds to the MOVE_TO command 714c by moving to the material pickup location. Upon detecting that the material has been picked up, the axis controller (AC) sends a SENSOR_STATUS_CHANGE message for the pod detect sensor and then returns a MOVED_TO message 714d that indicates the post-movement position of the pod.

(6) once it has verified that the pod has been picked up the LPTD sends additional commands to the axis controllers such that the pod is placed on the track. When the pod is no longer held by the LPTD the material detection sensor will change state, resulting in a SENSOR_STATUS_CHANGE. Once all movements are complete the LPTD sends "MATERIAL_ACQUIRED" 714o.

c. Move Atomic Operation

The Move atomic operation moves a pod that is at the source load point to the pre-load zone of the destination. The command sequences associated with the Move atomic operation are shown in FIGS. 17 and 20–22 from the respective perspectives of the TC, CLC, and Zone thread (for both vehicle acceleration and deceleration).

FIG. 17 shows a high-level view of the command sequence of the Move operation.

This sequence involves the following steps:

(1) the TC issues a MOVE_MATERIAL command to the LAC thread associated with the material source (706a);

(2) the TC returns a EventReportSend message indicating that the material is Moving (706b);

(3) the LAC thread associated with the material source sends a MOVE_STATUS_UPDATE message (706c) when the MOVE is underway;

(3) the LAC thread associated with the material destination sends a MOVE_COMPLETE message (706d) to the TC when the move is complete;

(4) the TC returns an EventReportSend message indicating (706e) that the material has been moved.

Figure 20:
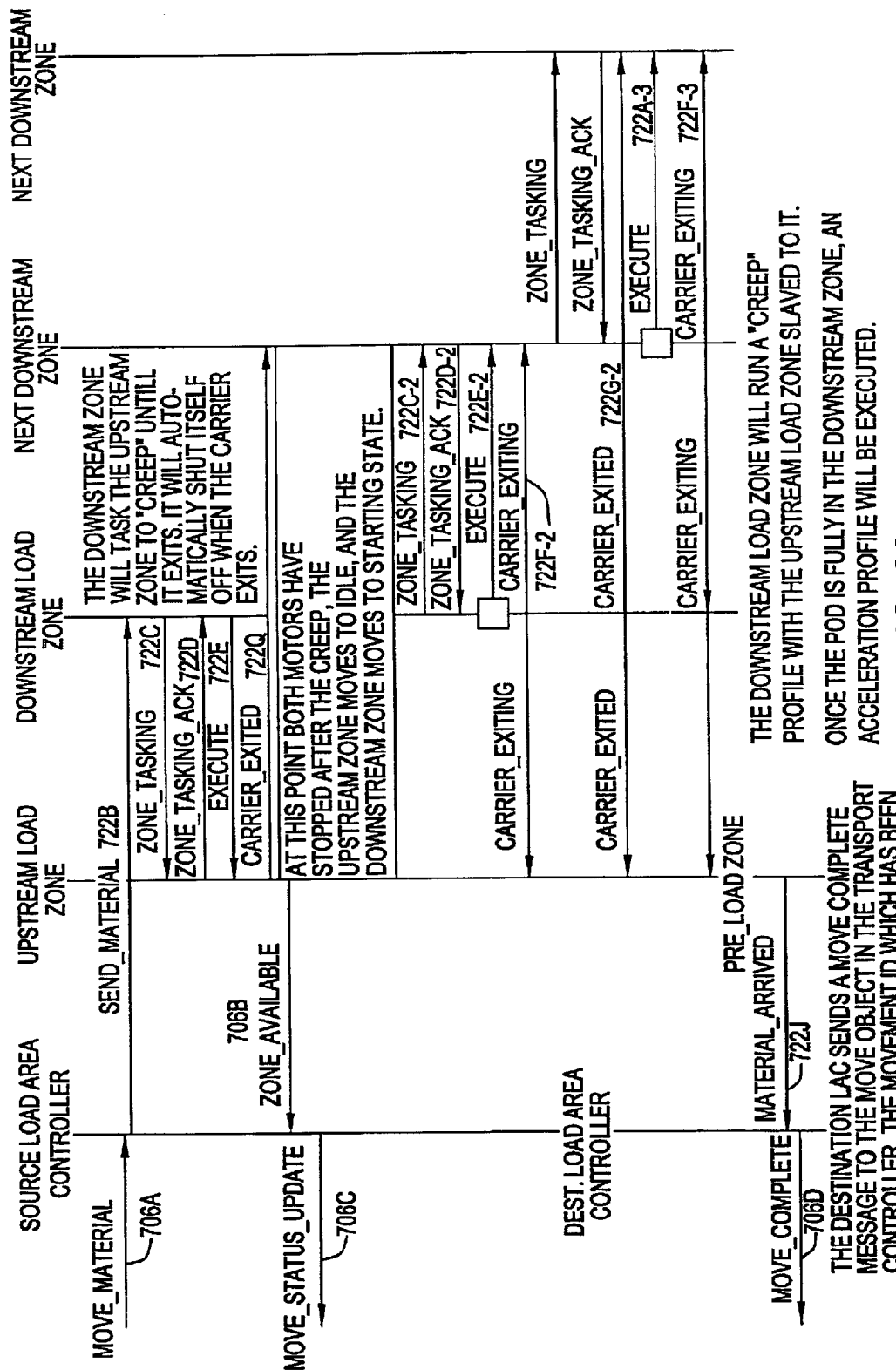
FIGS. 20–22 are event diagrams of a move atomic operation shown from viewpoints of different control system components.

FIG. 20 shows from the viewpoint of the CLC subsystems the command sequence of the Move operation. This sequence involves the following steps:

(1) after receiving the MOVE_MATERIAL command (706a) the source load area controller issues a SEND_MATERIAL command 722b to the downstream load zone thread (2) the downstream load zone prepares to run a creep profile with the upstream load zone slaved to it (a creep profile causes the vehicle to move fully within the downstream load zone)—this involves the downstream load sending a ZONE_TASKING command 722c to the upstream load zone, which synchs up and returns a ZONE_TASKING_ACK message 722d;

(3) once both zones are prepared, the downstream zone sends an EXECUTE command 722e to begin both zones moving;

(4) once the pod leaves the upstream load zone that zone sends a CARRIER_EXITED command 722f to its neighborhood and a ZONE_AVAILABLE message 722k to the LAC, (5) the source load area controller then returns the MOVE_STATUS_UPDATE message 706c to the move object managing the move to indicate the current status of the move;

(6) after the MOVE is initiated the zone threads and director control threads respectively associated with zones and directors between the source load and the destination load area handle the material move operation with little interference from the move object;

(7) when the pod arrives at the destination the pre-load zone at the destination returns a MATERIAL_ARRIVED message 722j to the destination LAC, which then returns the MOVE_COMPLETE message 706d, which is handled as described in reference to FIG. 17.

Figure 21A:
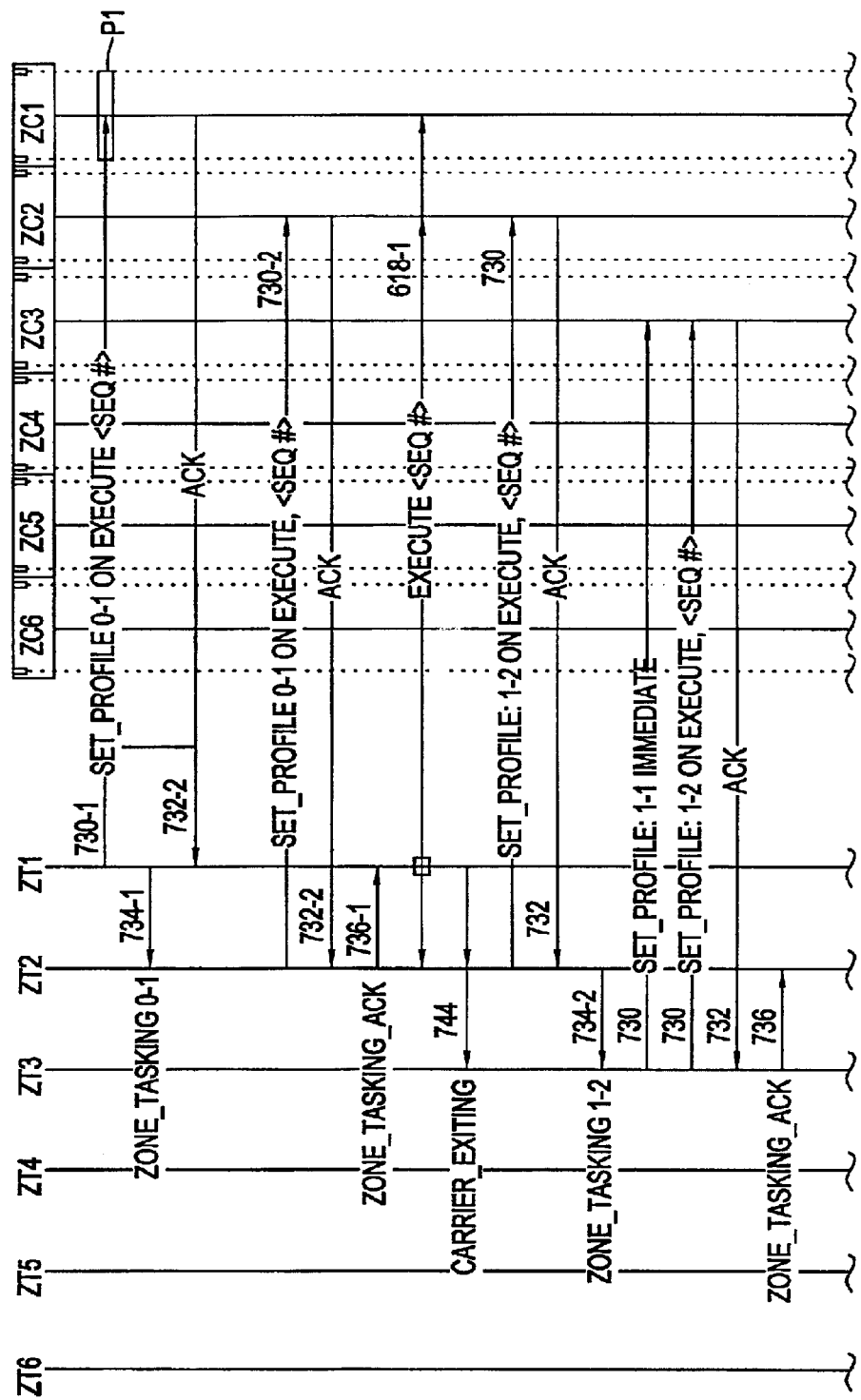
Figure 21B:
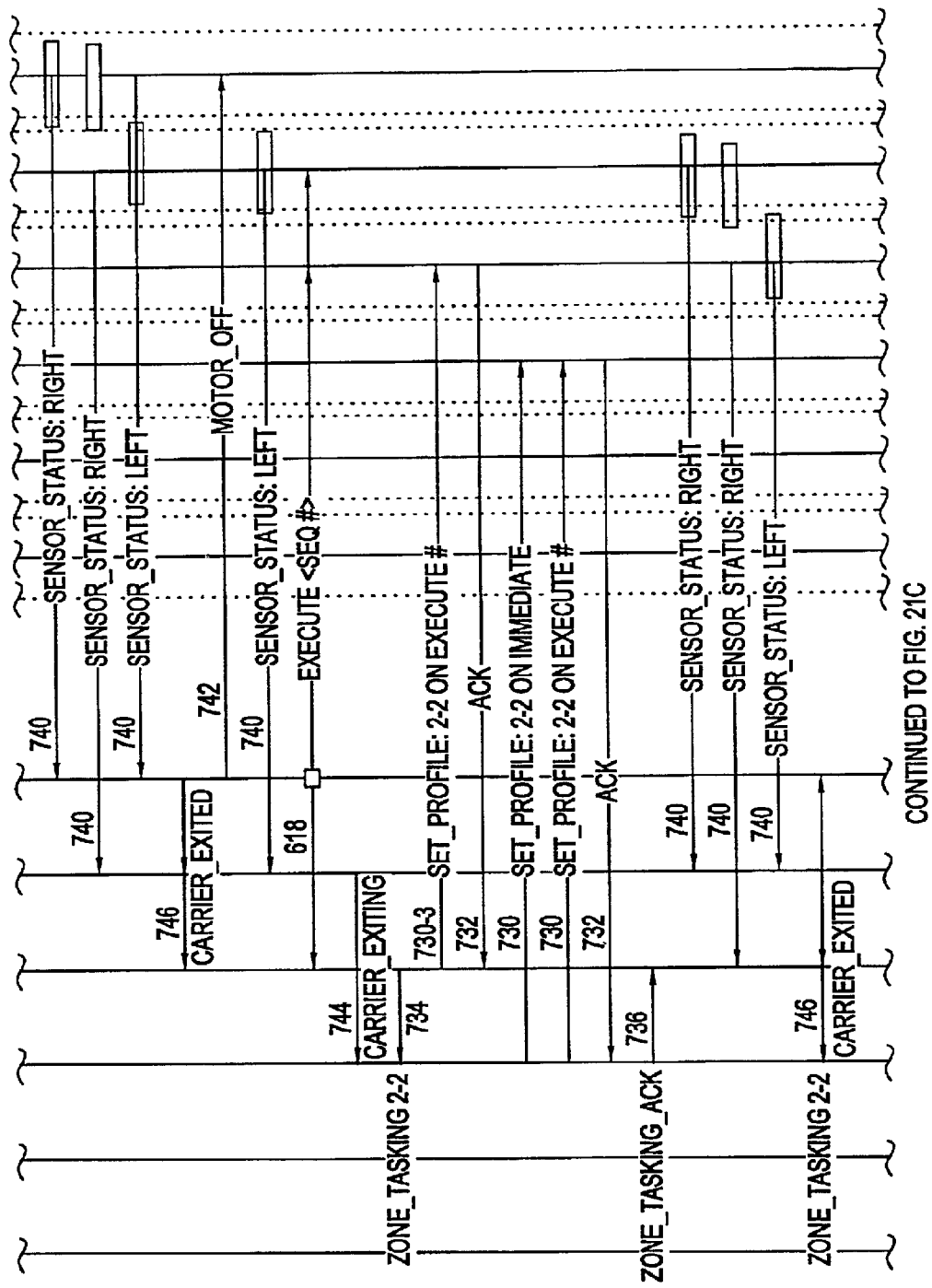
Figure 21C:
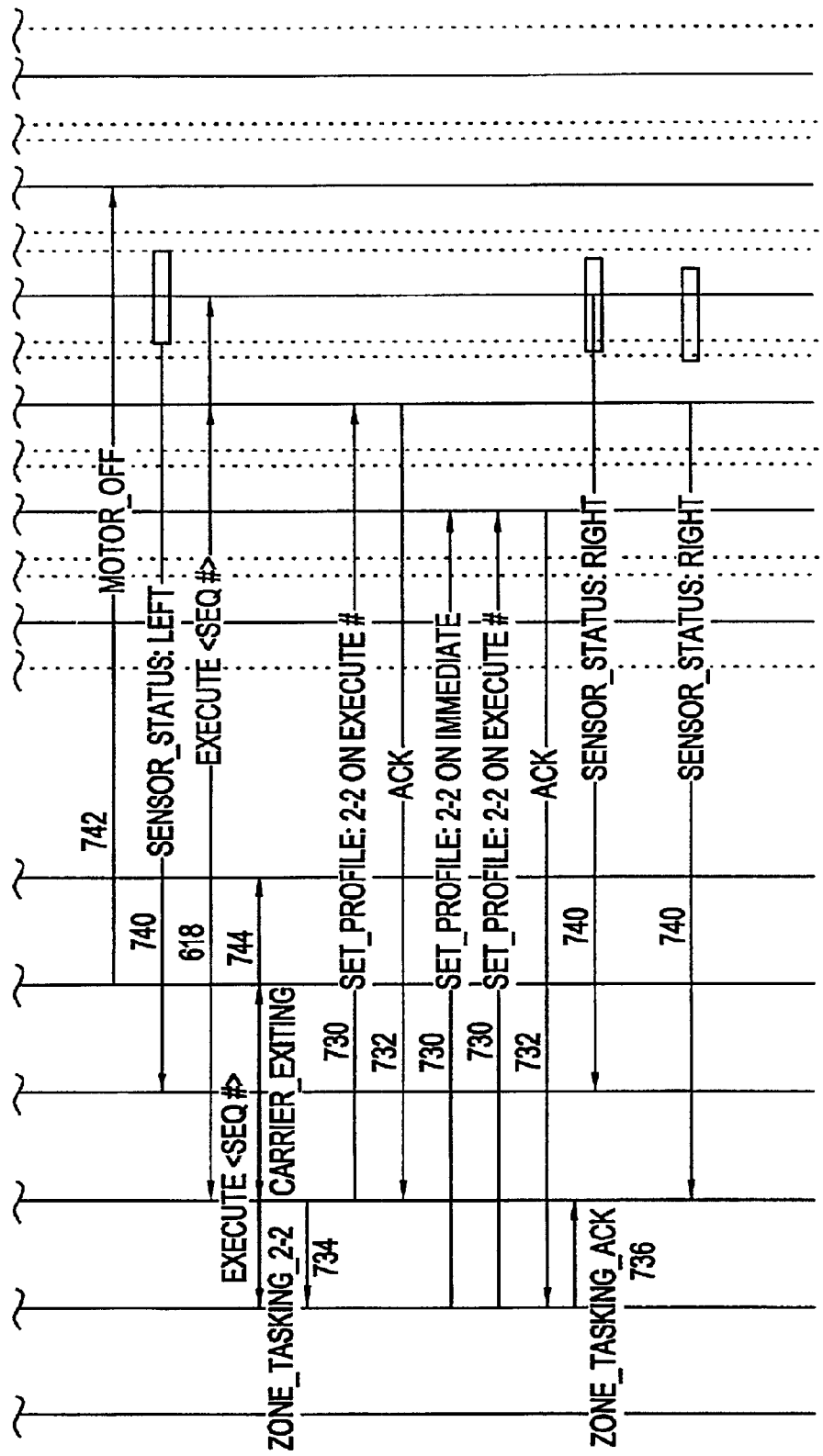
Figure 22A:
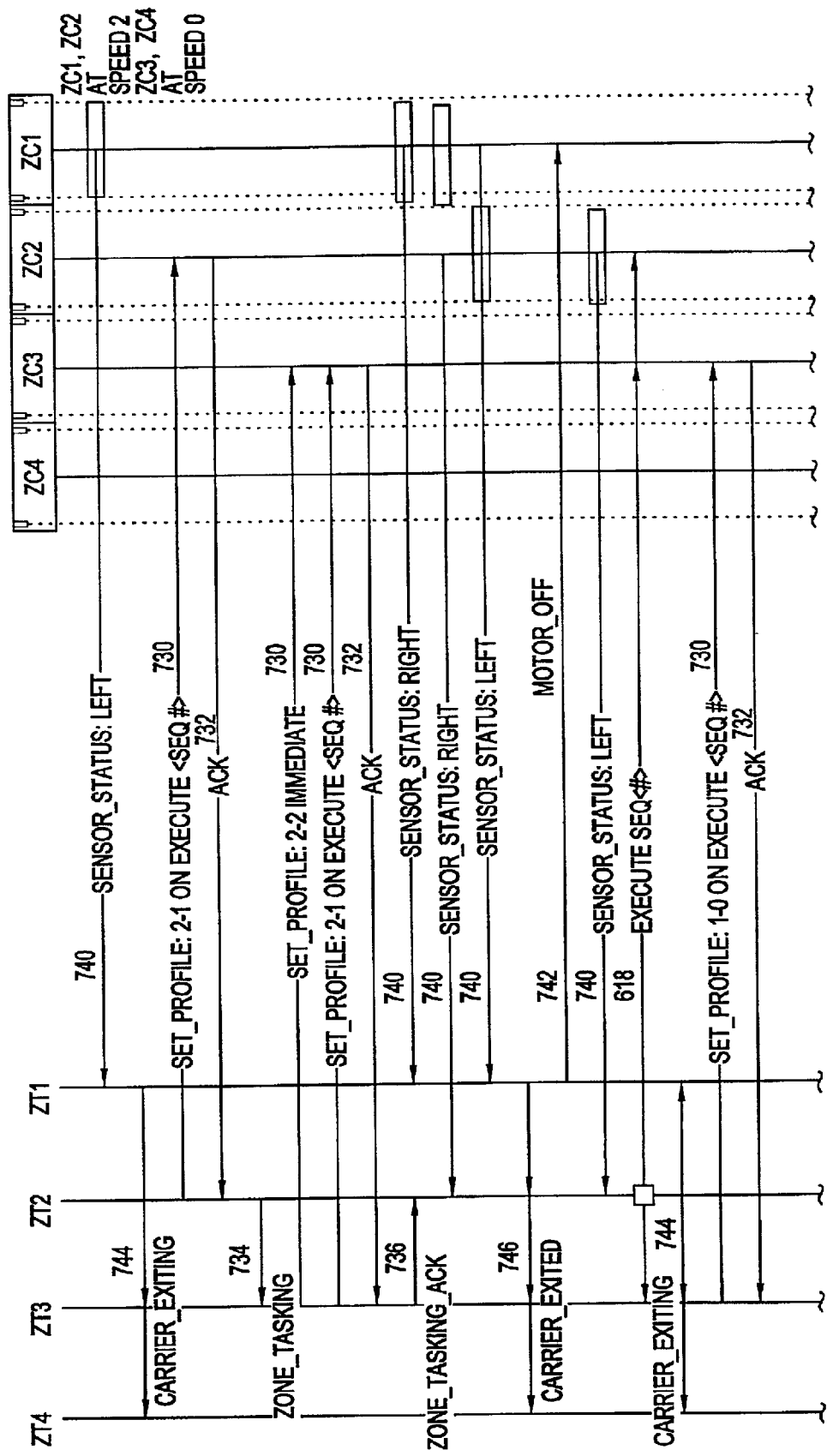
Figure 22B:
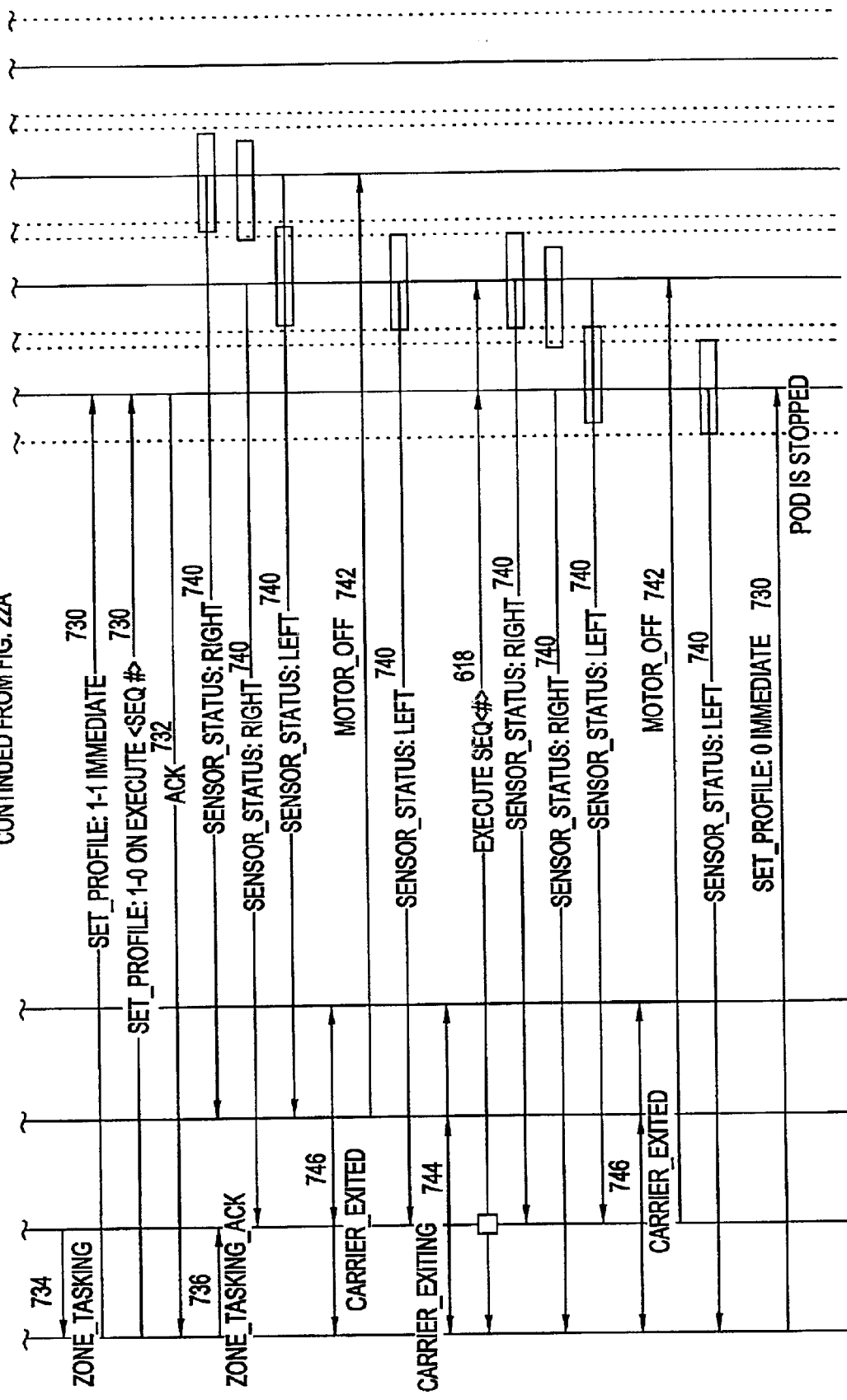

High level operations of the TC and CLC sub-systems have been described in reference to FIGS. 17 and 20. FIGS. 21 and 22 show how the zone controllers in a neighborhood interact to accelerate and decelerate the pod to accomplish the specified MOVE operation.

Referring to FIG. 21, there is shown a command sequence that sets out the interactions between zone threads ZT (on the left side of the figure) and their respective zone controllers ZC (on the right side) and among zone threads in the same neighborhood through which a pod is accelerated leftward across multiple zones. In particular, the leftward acceleration occurs from a zone Z1 controlled by a zone controller ZC1 and zone thread ZT1 to a zone Z4 controlled by a zone controller ZC4 and zone thread ZT4. The neighborhood affected by the illustrated MOVE operation includes 6 zones, Z1 to Z6. As already described, each zone has two sensors S1 and S2 and one motor that accelerates the pod when in that zone, all of which are controlled by a zone controller ZC. The several steps of the MOVE operation are shown in time-order, from the top to the bottom of the figure. The current position of the pod is shown by the shaded rectangle P1.

This command sequence uses a few basic low level control commands repeatedly:

SET_PROFILE profile (on event, <seq#>) 730
Issued by a zone thread ZTi to its associated zone controller ZCi to set the acceleration or deceleration profile to be effected by the zone controller ZCi. In the illustrated embodiment the profile is defined as sequence of fixed speeds. E.g., in the illustrated embodiment the profile is specified as the range "0–1" (indicating that the pod is to accelerate from speed zero to speed 1, where the speed number is interpreted by the zone controller as a corresponding motor velocity). In alternative embodiments, the zone thread ZT can instruct its zone controller ZC in any manner how to accelerate or decelerate the pod in its respective zone (e.g., the zone thread ZT can send actual target motor velocity values). A given profile can be executed over one or multiple threads.

An optional part of the SET_PROFILE command (shown in parentheses) is the "on event" condition, which allows the zone thread to indicate some future event upon whose occurrence the profile is to be executed. In the illustrated embodiment the future event is identified by a sequence number <seq#>. The "on event" condition enables multiple commands to be setup for future execution so they can be executed serially by different zone controllers ZC within time intervals far too short to allow each of the commands to be individually sent at the appropriate execution time. E.g., in the illustrated embodiment the event is "on execute, <seq#>", indicating that the profile is to be executed when the sub-command identified by <seq#> is executed. The seq# and the profile are generated by the zone thread ZT1. The execute command, which has the same sequence number, is then broadcast simultaneously to all devices. Those devices which have that sequence number begin concurrent execution.

ACK 732
Issued by a zone controller ZCi to acknowledge a corresponding profile command ZTi.

ZONE_TASKING profile: <seq#> 736
Issued by a zone thread ZTi to neighboring zone threads ZTj to place those threads in synch with the movement profile specified in the preceding SET_PROFILE command (i.e., to smoothly and cooperatively execute the profile). In the illustrated embodiment the profile is defined as an index, but, as above, the profile can be specified in many different ways. This command can also include a sequence number <seq#> that associates this command with a set of commands having the same sequence number.

ZONE TASKING_ACK 736
Issued by a zone controller ZTj to acknowledge a corresponding profile command ZTi.

EXECUTE <seq#> 738

Issued by a zone thread ZTi to multiple zone controllers ZCj simultaneously to initiate execution of the profile associated with the sequence identifier seq#.

The right pointing arrows marked with "?" above and to the right of the EXECUTE command indicate the message is to be sent to multiple recipients via a broadcast.

SENSOR_STATUS right/left 740

Issued by a zone controller to report status of its right or left sensor. The status indicates whether the pod is clear or coincident with the right or left sensor. In the illustrated example sensor transitions are indicated by small up and down arrows to the right of the command. For example, the message 624-1 from the zone controller ZC1 indicates that the pod just moved away from the right sensor S2 of the zone Z1, the message 624-2 from the zone controller ZC2 indicates the pod just crossed the right sensor S2 of the zone Z2, and the message 624-3 from the zone controller ZC1 indicates that the pod just moved away from the left sensor S1 of the zone Z1.

MOTOR_OFF 742

Issued by a zone thread ZTi to its controller ZCi to cause that controller to turn off its motor. The zone thread ZTi issues this command for a leftward motion when the SENSOR_STATUS: left message from the zone controller ZCi indicates that the pod has just passed to the left of its left sensor S1 and for a rightward motion when the SENSOR_STATUS: right message from the zone controller ZCi indicates that the pod has just passed to the right of its right sensor S2.

CARRIER_EXITING 744

Issued by a zone thread ZTi to its neighboring zone threads to indicate that the pod is exiting the respective zone Zi.

CARRIER_EXITED 746

Issued by a zone thread ZTi to its neighboring zone threads to indicate that the pod has exited the respective zone Zi.

Thus, referring to FIG. 21, the first action of the zone thread ZT1 is to set the acceleration profile "0–1" (610-1), which is acknowledged by the zone controller ZC1 (612–1). This acceleration profile is to be executed cooperatively over the two zones Z1–Z2 (i.e., the pod is to be accelerated to its target velocity in the space of the zones Z1–Z2). Thus, the zone thread ZT1 synchronizes the zone thread ZT2 by sending it the tasking command for profile "0–1" (614-1). The zone thread ZT2 responds by issuing a SET_PROFILE command to its respective zone controllers ZC2 (730-2), which responds with an acknowledgment (732-2). After receiving the acknowledgment 732-2), the zone thread ZT2 returns a tasking acknowledgement (736-1) to the zone thread ZT1. The zone thread ZT1 then sends the EXECUTE command 738-1 to the zone controller ZC1, ZC2, causing the profile previously set up in the commands 730-1, 730-2 to be cooperatively executed by the zone controllers. As the command is executed the zone controllers return SENSOR_STATUS messages 740 to indicate the progress of the pod. After the pod is accelerated to its target velocity, the subsequent profiles set by downstream zone threads maintain the pod at a fixed velocity (e.g., SET_PROFILE "2-2" 730-3). A zone thread ZTi informs neighboring zone threads ZTj of the progress of a move using CARRIER_EXITING and CARRIER_EXITED messages 744, 746. A zone thread ZTi sends a MOTOR_OFF message 742 to its respective controller ZCi each time the pod has left the corresponding zone Zi (indicated by a CARRIER_EXITED message 746).

Referring to FIG. 22, there is shown a command sequence that sets out the interactions between zone threads ZT (on the left side of the figure) and their respective zone controllers ZC (on the right side) and among zone threads in the same neighborhood through which a pod is decelarated (e.g., from speed 2 to 0) across multiple zones Z1–Z4 as it approaches its destination (in this example, the zone Z4). The thread ZT1 starts the deceleration based on information in its speed table 670 (FIG. 13) that indicates the pod is to be decelarated to speed 0 by the time it reaches the zone Z4. This deceleration is done using the same basic commands described above. FIG. 22 shows a sequence of commands by which a pod moving from right to left at speed 2 in zone Z1 is decelerated to speed 0 in zone Z4. This deceleration is performed cooperatively by the zone threads ZT2, ZT3, ZT4 and their respective zone controllers ZC2, ZC3, ZC4. FIG. 22 is not described further as such description would be redundant in view of the description of FIG. 21.

d. Deposit Atomic Operation

The Deposit operation causes a pod residing on the pre-load zone of a destination to be moved to the load point and then off-loaded to either a load port or an OHT. The high-level view of the deposit operation is now described in reference to FIG. 17.

FIG. 17 shows a high-level view of the command sequence of the Deposit operation, in which material is delivered to a load port. The move object responsible for the TRANSFER sends a DELIVER_MATERIAL message 708a to the LAC and then returns an EventReportSend message 708b indicating that the status of the material is "Depositing." In response, the LAC thread coordinates the movement of the material from the rail onto the load port 710a using a series of commands specific to the particular LPTD that will effect the transfer.

The LAC controller thread returns to the TC a MATERIAL_DELIVERED message 708c when the Deliver operation is completed. Subsequently, the TC returns to the CIM system messages indicating that the DEPOSIT operation is complete (708d), and the carrier (i.e., pod) has been removed from the track (708e ).

Figure 23A:
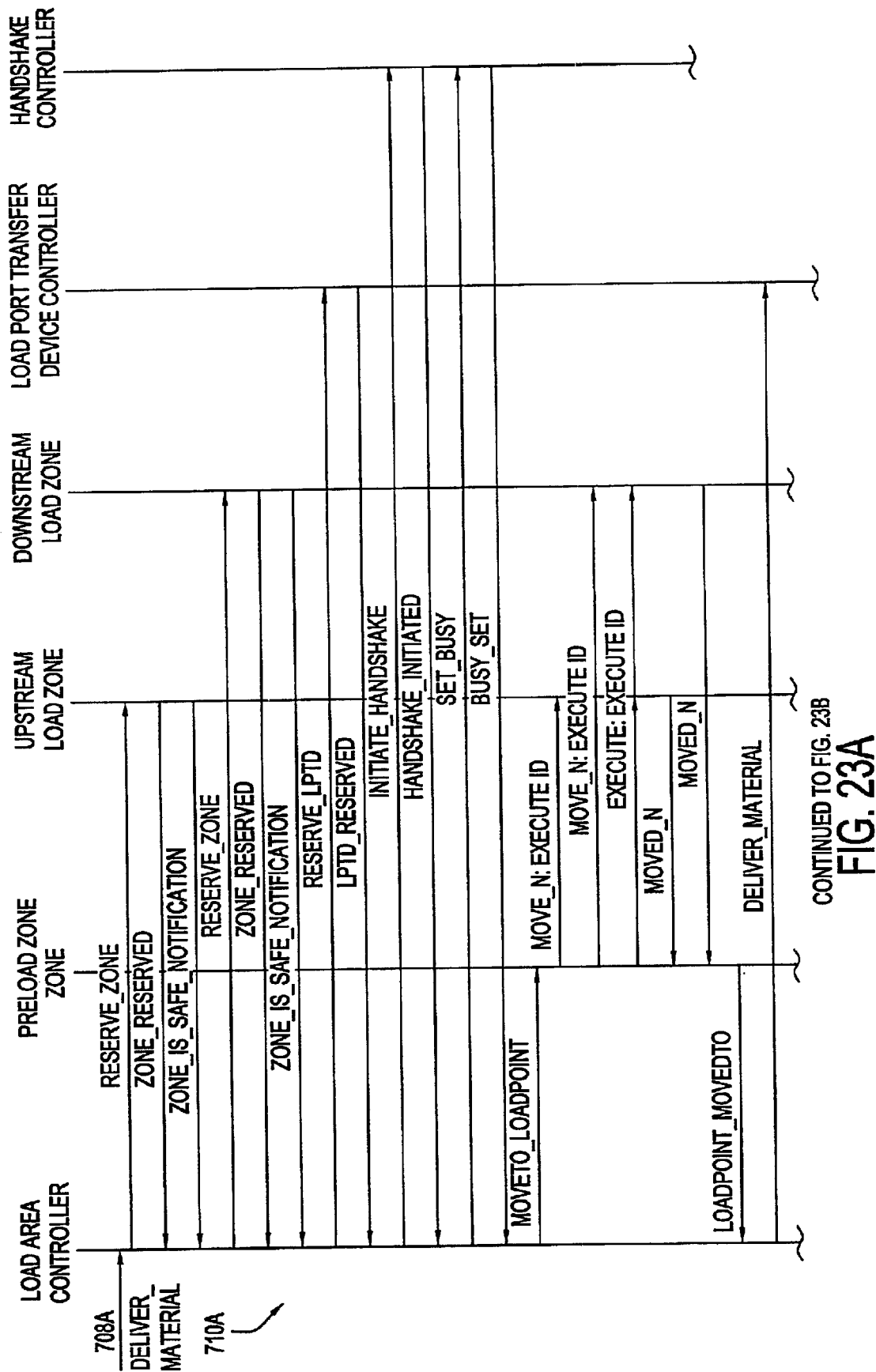
FIGS. 23, 24A, 24B are event diagrams of a deposit atomic operation shown from viewpoints of different control system components.
Figure 23B:
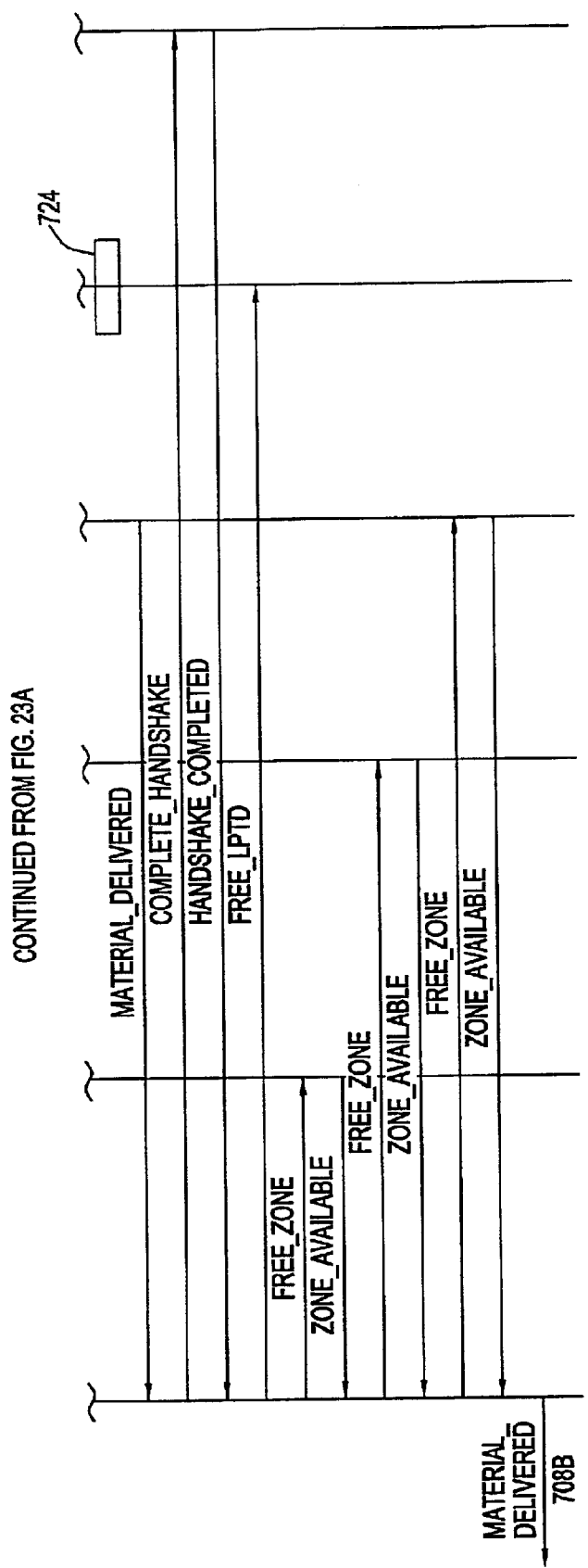

One example of the commands used to deposit materials using a FastLoad LPTD, which is a specific Palo Alto Technologies product, is shown in FIGS. 23 and 24.

FIG. 23 shows the process from the viewpoint of the CLC. FIG. 24 refines this view to that of the LPTD control thread. The LAC first reserves the zones that compose the load point. Reserving the zones ensures that no other moving pods (from another direction) will attempt to enter the zones. Reservation is accomplished by sending a RESERVE_ZONE_request. The zone responds with ZONE_RESERVED. Once it has determined that any incoming pods have stopped prior to it, a ZONE_IS_SAFE_NOTIFICATION is sent. At this point, the LAC knows it has exclusive control of, and access to, the zone. In the same manner as for the ACQUIRE operation, described in reference to FIGS. 18–19, after it reserves the load area zones the LAC reserves the LPTD. Once the LPTD is reserved the LAC moves the pod into position to be acquired by the LPTD using a series of MOVE commands effected by the pre-load and upstream and downstream load zones. Once the pod is in position the LAC initiates an E23 handshake with the load port. Once the load port inidicates it is ready to receive, the LAC issues the LPTD controller a DELIVER_MATERIAL command, causing the LPTD controller to move of the pod off the track and to the destination tool or OHT (724). The LPTD issues a series of movement commands to its axis controllers, which effect the delivery. The LPTD controller returns to the LAC a MATERIAL_DELIVERED command after the LPTD completes the delivery. In response the LAC issues the handshake controller a COMPLETE_HANDSHAKE message to cause the tool or OHT to complete the handshake. Once the DEPOSIT operation has been completed the LAC controller frees the LPTD and the load area zones. Additional details of the DEPOSIT operation from the point of view of a FastLoad LPTD controller are now described in reference to FIG. 24.

Figure 24A:
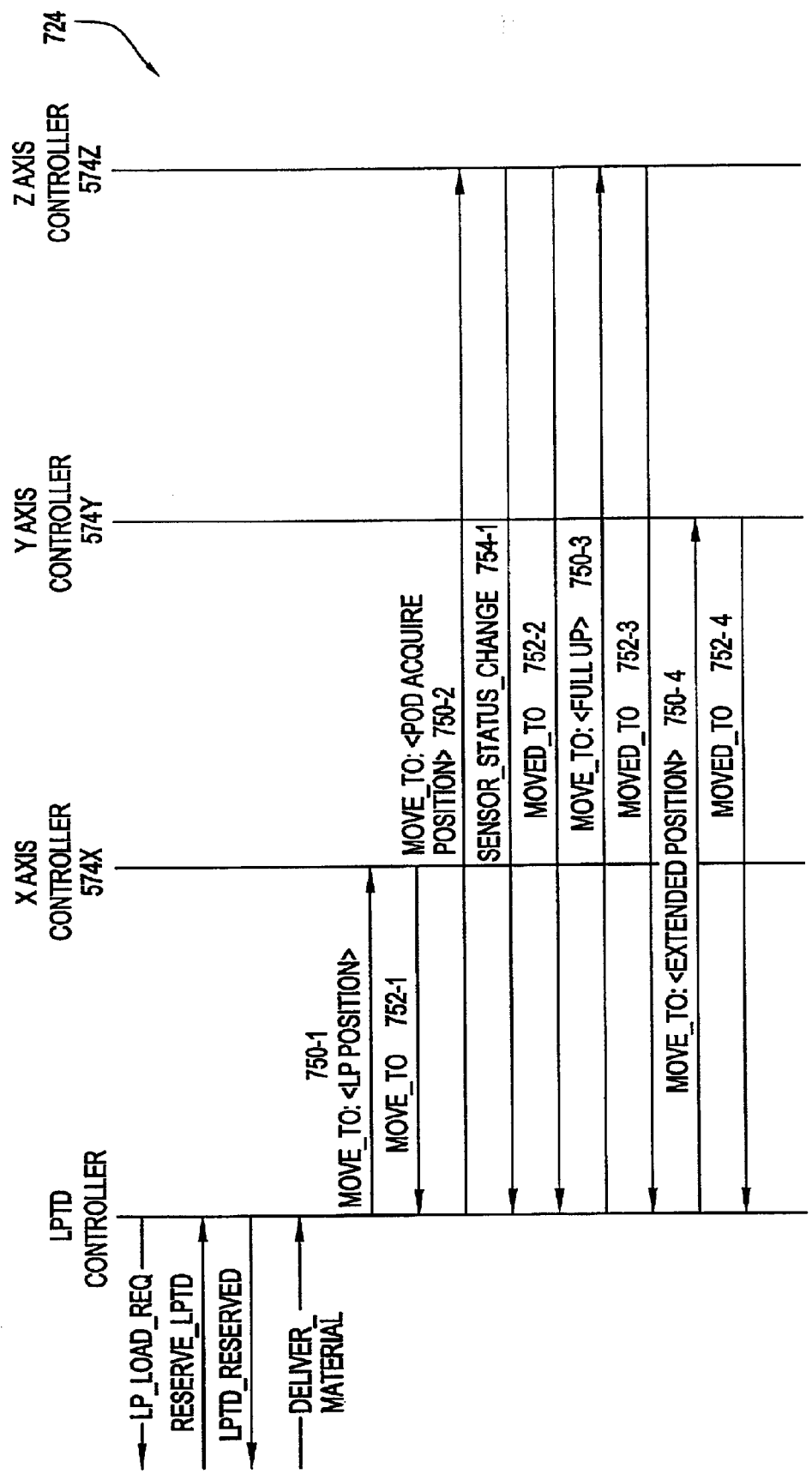
Figure 24B:
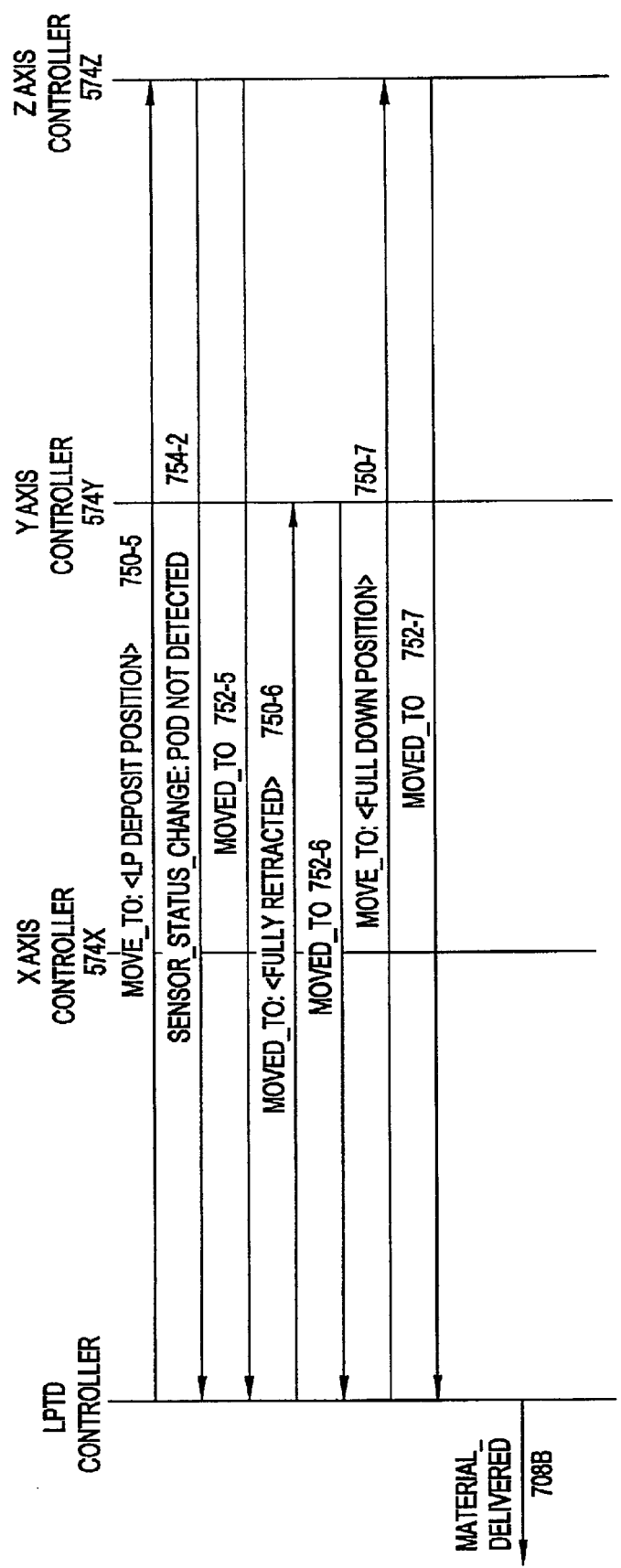

Referring to FIGS. 24A and 24B, the LPTD control thread performs the following operations to complete the DELIVER operation 724. In this description, the LPTD comprises X, Y and Z axis controllers 574$x$, 574$y$, 574$z$ operating as described in reference to FIG. 19 (Acquire operation).

Optionally move to the tag read point (if the read point is the rail, no motion may be required);

Optionally read the identification data (if ID readers exist);

Optionally verify the identity with the Transport Controller (if ID readers exist);

Move to the load port by issuing a MOVE_TO <lp position> command 750-1 directing the X-axis controller 574$x$ to move to the load port position for acquiring the pod—the X axis controller responds on completion with a MOVED_TO message 752-1;

Acquire the material from the vehicle/rail by issuing a MOVE_TO <pod acquire position> command 750-2 directing the Z-axis controller 574$z$ to acquire the pod from the rail—the Z axis controller responds by issuing a SENSOR_STATUS_CHANGE message 754-1 indicating that it is acquiring the pod and, on completion of the Acquire, issuing a MOVED_TO message 752-2;

Deposit the material by (1) issuing a MOVE_TO <full up> command 750-3 directing the Z-axis controller 574$z$ to move to the full up position, corresponding to the load height of the tool to be loaded—the Z-axis controller responds on completion with a MOVED_TO message 752-3; and (2) issuing a MOVE_TO <extended position> command 750-4 directing the Y-axis controller $^{574}y$ to move to the extended position to load the pod into the tool—the Y axis controller responds on completion with a MOVED_TO message 752-4; and (3) issuing a MOVE_TO <lp deposit position> command 750-5 directing the Z-axis controller 574$z$ to deposit the material—the Z-axis controller responds with a SENSOR_STATUS_CHANGE: pod not detected message 754-2 indicating that the material has been deposited and a MOVED_TO message 752-5;

Reset the LPTD to its full retracted and full down position by issuing respective MOVE_TO <fully retracted> and MOVE_TO <full down position> messages to the Y and Z axis controllers 574$y$, 574$z$, which respectively respond with MOVED_TO messages 752-6, 752-7; and Notify other systems of the move completion using the MATERIAL_DELIVERED message 708$b$.

Note that the steps shown in FIG. 24 presume that there are no ID readers.

5. Track Arrival Scenario

So far, discussion has been provided for scenarios where a pod is moved to a destination (e.g., a LPTD). In other situations, such as when a pod needs to wait at a certain track position, the end point of a move command can be a track zone instead of a a load area. This scenario is referred to as a track arrival scenario.

In this scenario, the TC moves the pod to the target track zone. Once at the target track zone the pod is not removed from the track, but remains there until another move is issued for the pod. Normally, the TC executes a transferoperation via an LAC associated with the load area of the destination. However, in this scenario, there is no intent to move the pod to a destination. Consequently, even when the track zone is in a load area, the TC interacts directly with the zone thread of the target track zone instead of the associated LAC thread. The command sequence associated with the track arrival scenario is now described in reference to FIG. 25.

Figure 25:
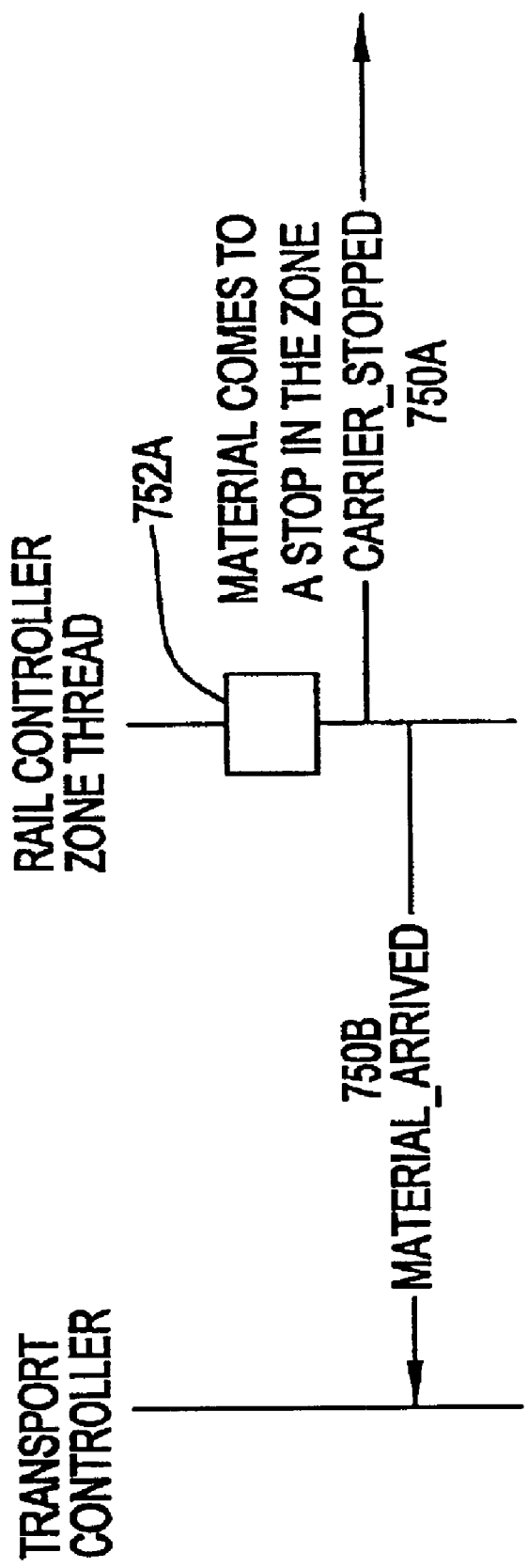
FIG. 25 is a UML sequence diagram for messages issued when a material arrives at a track zone that is not a load area (the track zone could be a temporary stopping point)

FIG. 25 shows the command sequences associated with a track arrival scenario. In this scenario the zone thread of a zone that is the end point of a move slows and stops the pod 752$a$ in that zone. The same zone thread then issues a CARRIER_STOPPED message (750$a$) to its neighboring zone threads and a MATERIAL_ARRIVED message to the TC (750$b$).

Having described the command sequences associated with a few atomic operations that can be implemented by various embodiments, additional details are now provided of how the zone threads cooperate to move one or more vehicles in a desired direction. An important factor in assisting the zone threads to coordinate their movement operations are the sensor signals provided by the sensors in each zone. These sensor signals are now described in reference to FIG. 26.

Figure 26:
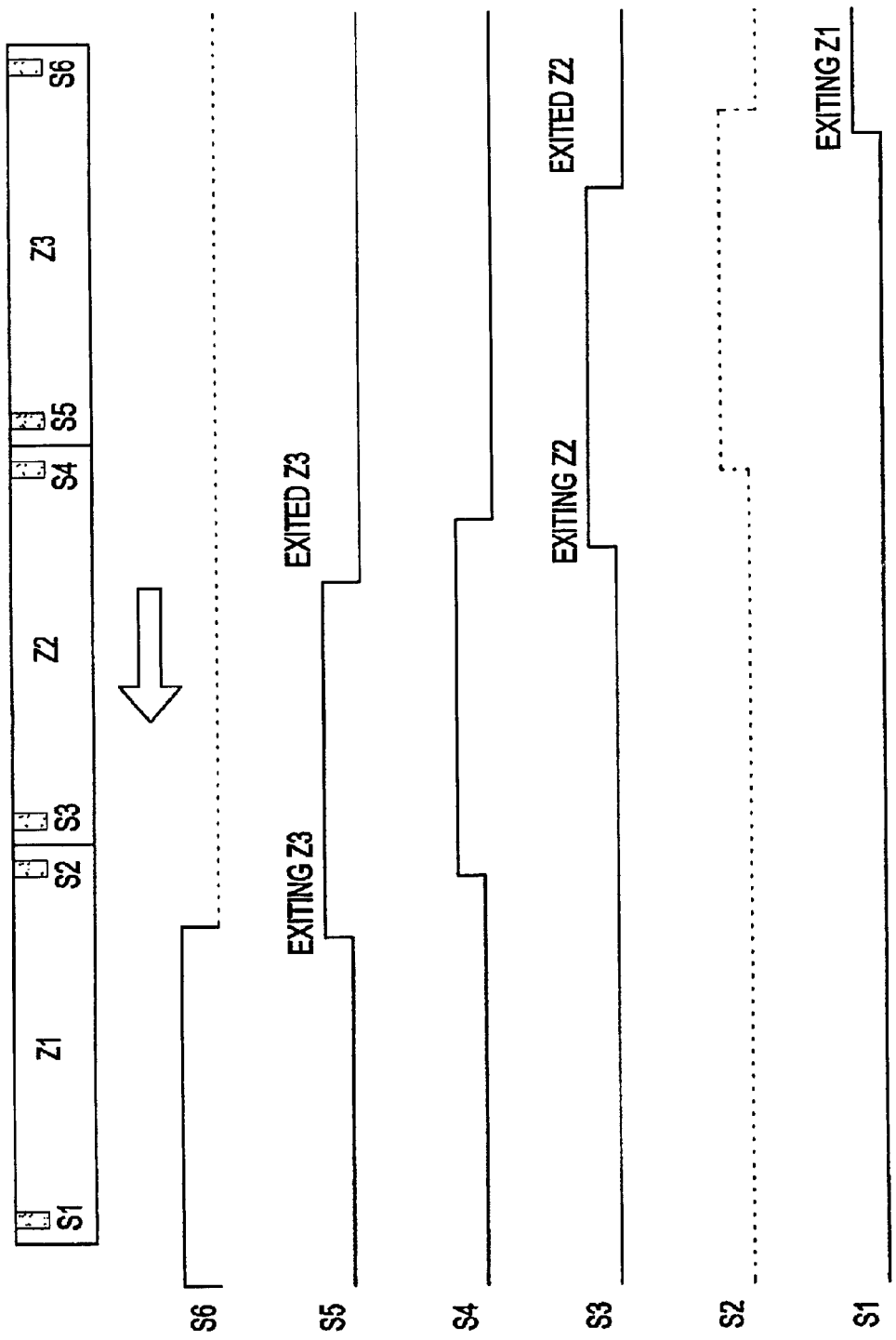
FIG. 26 is a timing diagram showing the timing of sensor signal transitions for leftward rail movement for a 300 mm wafer pod in the vicinity of a zone Z2 (transitions for a 200 mm wafer pod would be different)

FIG. 26 is a timing diagram that shows signals generated by six sensors S1–S6 associated with three zones Z1–Z3 from the point of view of the Zone Z2's control thread (ZT2, not shown). The signals shown are generated by the sensors for a pod of 300 mm wafers travelling from the zone Z3 to the zone Z1 (the timing for a pod of 200 mm wafers would be different). The signals shown in light dotted lines are not relevant to ZT2's movement control methods. The signals shown in boldface are available to the thread ZT2 either directly or via the EXITED AND EXITING (means CARRIER_EXITED, CARRIER_EXITING) messages shown. In general, the signals available to any thread are those signals that relate to its own sensors and the exit sensors of adjacent zones. Thus, in the case of the zone Z2 the information needed by the thread ZT2 include the signals from the sensor Z5 (via EXITING message), its own sensors Z4 and Z3, and the sensor S1 (via EXITING message). In the embodiment shown each sensor signal is asserted when the pod is transiting that sensor. Thus, the rising edge of the left sensor signal indicates to the receiving zone thread ZTi that the pod is beginning to exit the associated zone and a falling edge that the pod has left that zone.

E. Speed Control by Zone Threads

Figure 27:
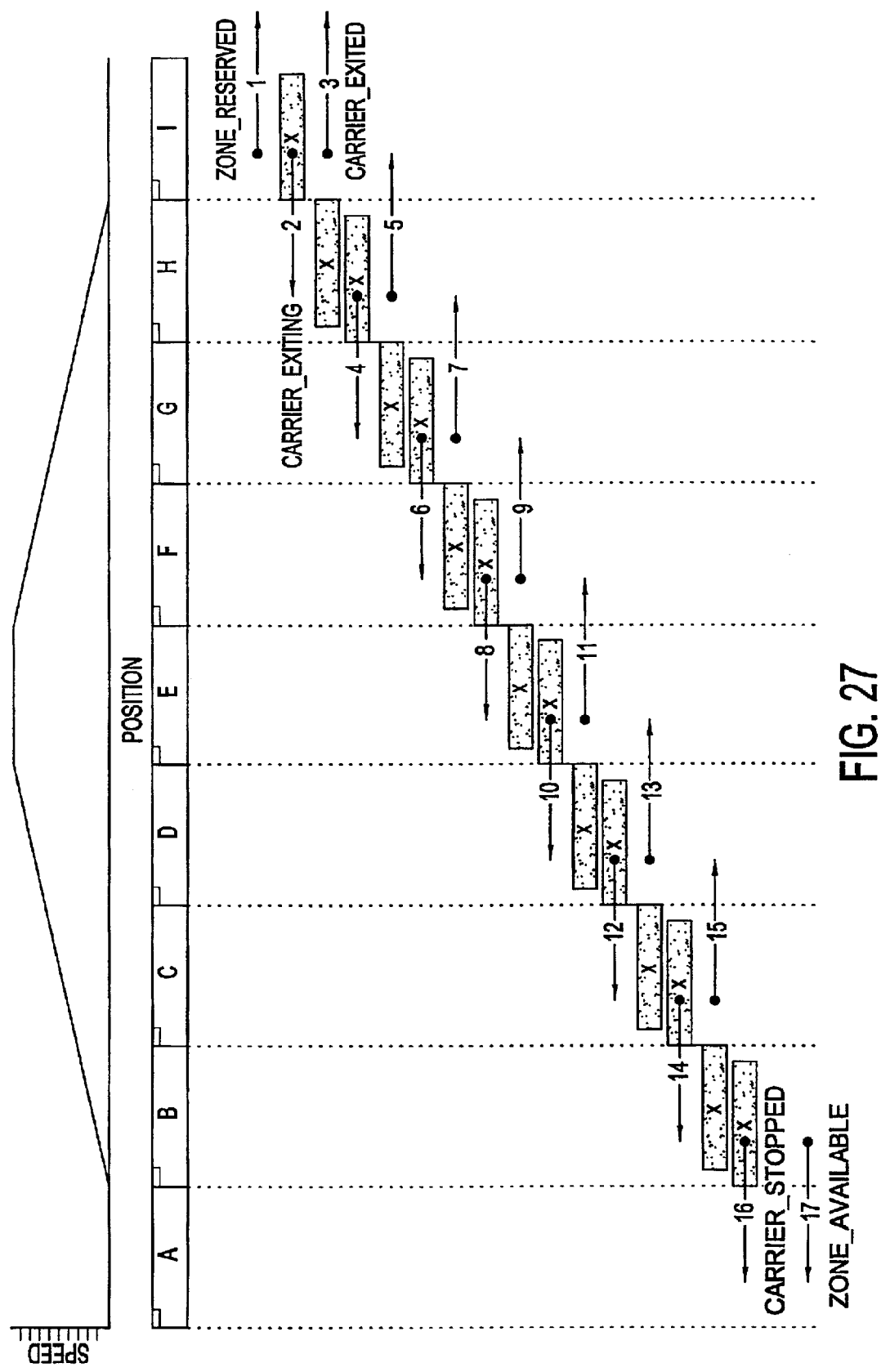
FIG. 27 is a timing diagram showing messages sent between zones and container speed profile for the situation where a single container X is moved leftward from zone ZI to zone ZA.
Figure 28:
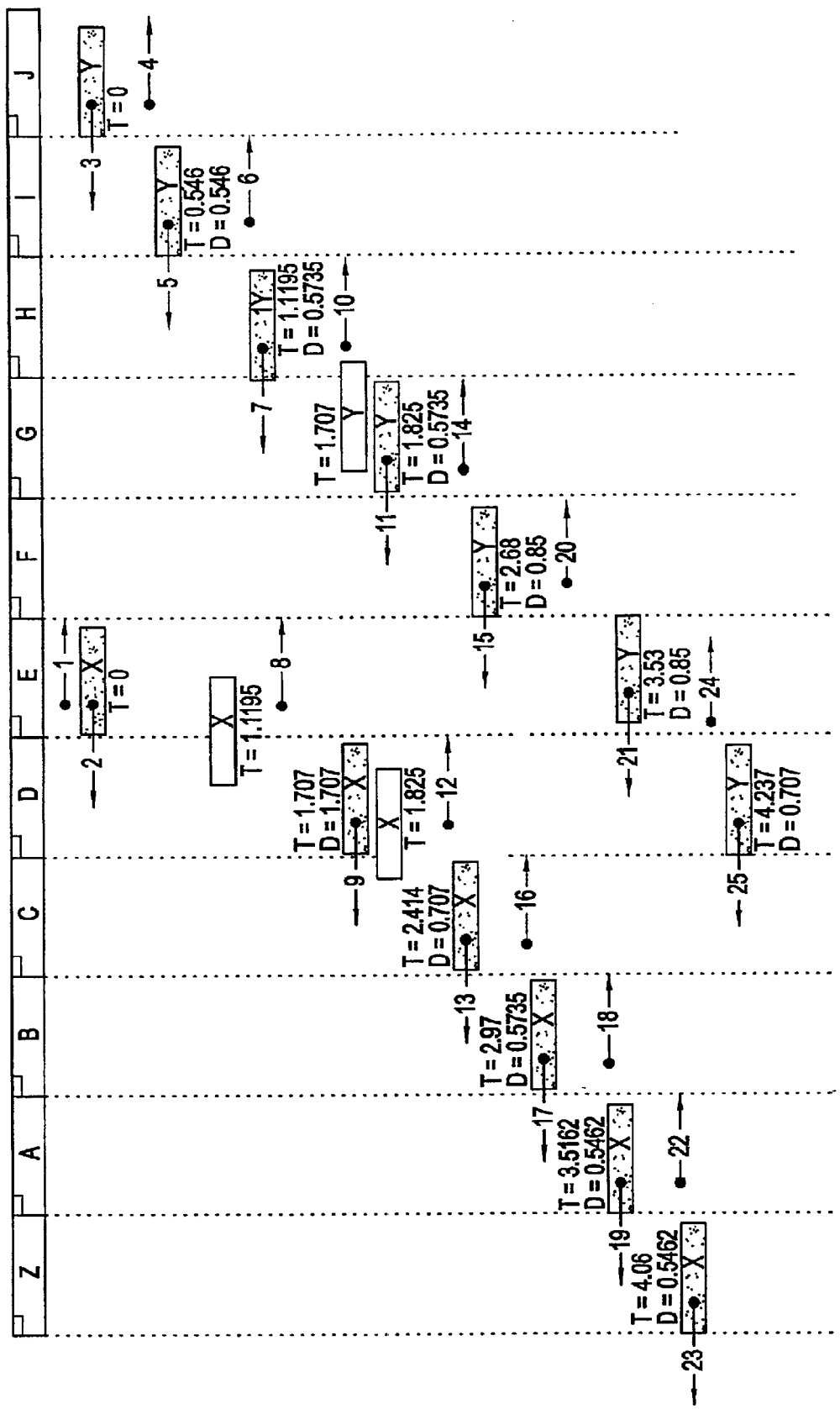
FIG. 28 is a timing diagram showing messages sent between zones for the situation where two containers X and Y occupying the same neighborhoods are moved leftward from zones ZE and ZJ to zones ZZ and ZD, respectively.
Figure 29:
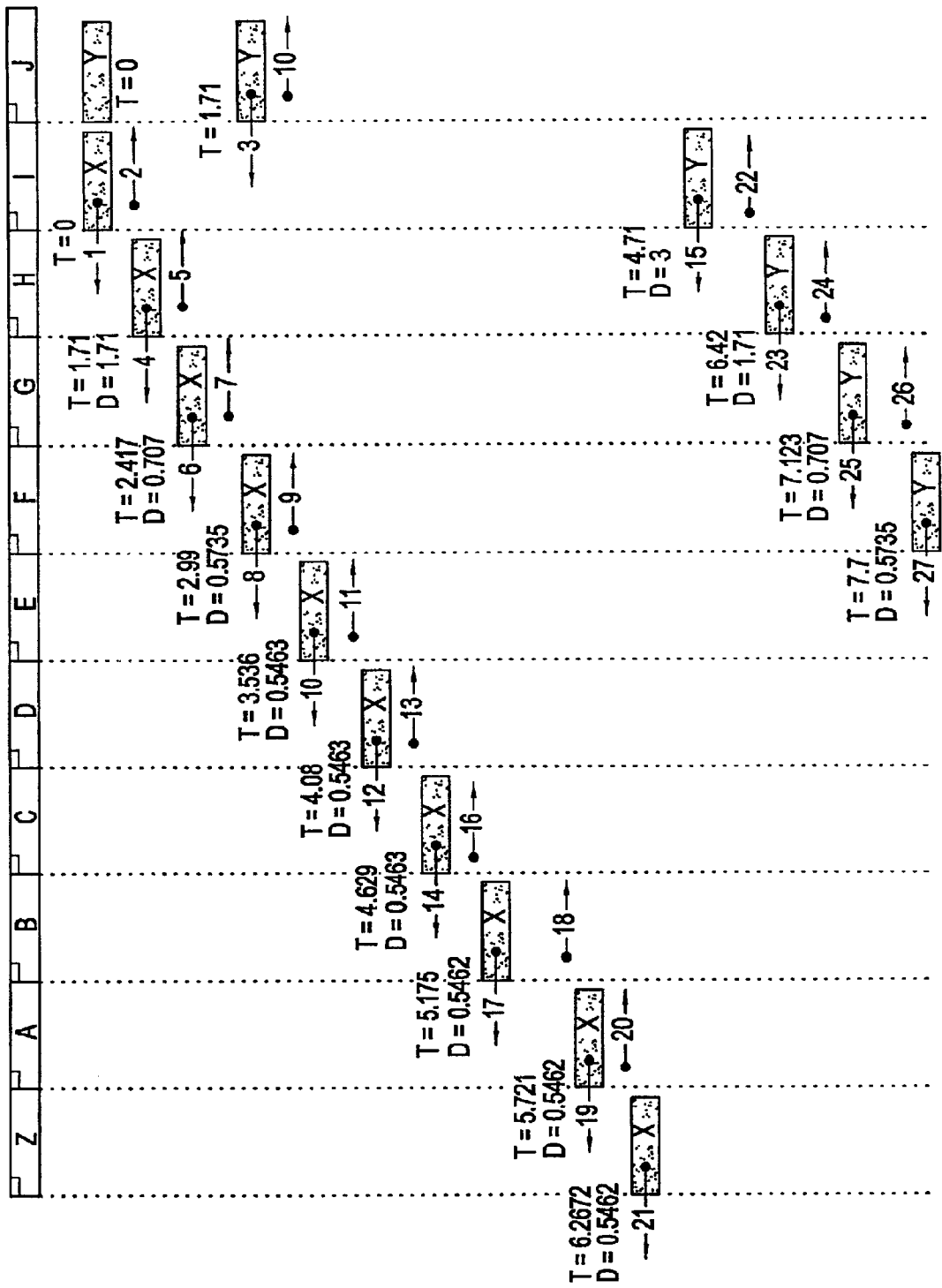
FIG. 29 is a timing diagram showing messages sent between zones for the situation where two adjacent containers X and Y occupying the same neighborhoods are moved leftward from zones ZI and ZJ to zones ZZ and ZF, respectively.

Having described the cooperative, distributed execution of various command sequences by the software objects and hardware controllers of one embodiment, more details are provided in reference to FIGS. 27–29 regarding the methods by which the zone threads cooperatively determine and manage the movement of one or more material units (e.g., pods of wafers) through a conveyor system. The zone threads' role in three types of movements are described herein:

leftward movement of a single container;

leftward movement of two containers occupying the same neighborhoods;

leftward movement of two adjacent containers occupying the same neighborhoods.

The illustrated scenarios are exemplary of a wide range of interactions that are possible between the zone threads and are not intended to limit the scope of the present invention.

In general, the zone threads 512 follow a well-defined set of speed control rules 676 (FIG. 13) when determining how to accelerate or decelerate the material. The performance/speed control rules 676 are described below based on some performance assumptions made to permit exact, representative examples to be given. These assumptions include:

1. It takes 3 full zones to accelerate from a stop to stop speed.
2. It takes 3 full zones to decelerate from full speed to a stop.

These assumptions are implementation-specific and could be different for different embodiments of the present invention and for different materials.

The zone threads 512 perform the speed control methods cooperatively, using messages exchanged by zones threads 512 in the same neighborhood indicating the movement status of the material being moved. These movement messages are exchanged according to the following zone movement messaging rules, which are embodied in the zone state machine 620 (FIG. 13) that is part of each zone thread 512 (NOTE: the following discussions sometimes refer to a "zone thread" using the shorthand "zone"—this shorthand blurs the software/hardware distinction between zones and zone threads that is a characteristic of one, but not all, embodiments of the present invention):

1. When a zone begins moving a container out of the zone (as detected by the rising edge of the downstream zone sensor), the zone shall send a CARRIER_EXITING message. Downstream zones will use this information to learn of incoming containers.
2. When the zone completes the movement of a carrier out of the zone (as detected by the falling edge of the downstream zone sensor), the zone shall send a CARRIER_EXITED message. Upstream zones will use this information to determine the container has continued moving and can be removed from the zone's database.
3. If the zone decelerates the carrier to a stop within the zone, the zone shall send a CARRIER_STOPPED message.
4. After a container has arrived at its destination and been removed, a CARRIER_REMOVED or ZONE_AVAILABLE message shall be sent.

Given the above-described performance assumptions and the zone movement messaging rules, the zone to zone speed control rules, which are embodied in the zone thread methods 622 and the speed table rules 676, are as follows (all references are to FIG. 13 unless stated otherwise):

1. A zone must accept a container at whatever speed profile is defined by the upstream node.
2. Each zone thread 512 maintains a queue 642 of the containers within its neighborhood. Each zone 512 has a pointer 648 to the nearest container.
3. Each zone thread 512 maintains a table 670 of exiting speeds for its downstream zones. The speed values used in one embodiment are as shown below (note that the actual number of speeds (1 . . . n) is dependent upon the number of zones required to accelerate material from stopped to top speed and to decelerate material from top speed to stopped):
   3 2 1 0-1 (indicates the zone is unavailable)-4 (indicates the zone is reserved).
4. The current zone thread 512 uses the max. speed 630 of its immediate downstream neighbor, along with the container's speed upon entry to the current zone, to define the speed profile to be followed. Determination of the profile is done when the zone detects that the container is exiting the upstream zone (as detected by the rising edge of the downstream zone sensor of the upstream zone).
5. The exiting speed of the current zone can be lower than the maximum allowed entry speed 630 of the downstream zone (e.g. if the container is in the destination's neighborhood and is coming to a stop.)
6. When a CARRIER_EXITING message for a zone is received, the receiving zone thread 512 will set the speed table 670 entry for the sending zone's downstream neighbor to speed −1 (indicating its unavailability).
7. When a zone thread 512 receives a CARRIER_EXITED message, it will set the speed table 670 entry for the sending zone to speed 0 (from −1 or −4). All nearer zones will have their speed incremented by one. I.e., the next zone upstream from the sending zone will have entry speed 2, then next 3, and any subsequent upstream zones will also be 3. Incrementing will be done sequentially, from furthest to nearest. If a −1 or −4 speed is encountered, it will not be incremented, and incrementing will end.
8. When a zone thread 512 receives a RESERVE_ZONE message, if that zone is not already reserved, it will mark itself as reserved and send a ZONE_RESERVED multi-cast message to its neighbors. If it is already marked as reserved, or is faulted, it will send a ZONE_NOT_RESERVED point-cast message to the initiator.
9. When a zone thread 512 receives a ZONE_RESERVED message, it will set the speed table 670 entry for the sending zone to −4. The speed table 670 entries for upstream zone speeds will be modified to 0, 1, and 2, respectively. The receiving zones will make a backup copy of the previous speed data.
10. When a zone thread 512 receives a CARRIER_STOPPED message, it will set the speed table 670 entry for the sending zone to −1. The upstream zone speeds in the same speed table 670 will be modified to 0, 1, and 2.
11. When a zone thread 512 receives a ZONE_AVAILABLE message, it will set the speed table 670 entry for the sending zone 3. The speed table 670 entries for the upstream zones will also be modified to 3. The record of the pod which was on the zone will be deleted.
12. When a zone thread 512 receives a CARRIER_REMOVED message, the record of the specified pod will be removed from the containers queue 642. The speed control table 670 will not be updated, so the zone from which the container was removed will remain unavailable.
13. If, when a zone thread 512 is calculating the profile to use into the next zone, the zone determines it cannot perform the profile (e.g. executing the profile 3-0 in one zone), the zone will scan through the table looking for a −4 speed, indicating that there is a reserved zone ahead. If a downstream zone reservation is found, the current zone knows that it must move the container through that zone as there is not sufficient space to stop in the current zone. The current zone will then use the backed up copy of the previous speed data to proceed.
14. When in the neighborhood of a destination, a zone thread 512 is to set the speed profile of a pod in accordance with information in the following table (TABLE 3), which shows the allowable maximum velocity profiles. The information in this table is embodied in the speed table rules 676. For example, TABLE 3 indicates that, for a zone that is two zones from a container destination, given a current upstream exit sensor speed number of "2", the appropriate speed profile is "2→1" (indicating that the speed of the container is to be reduced by "1"). However, if the exit sensor speed number for the same sensor were "3", there is no applicable profile ("N/A") as any profile would require the containter to be decelerated by more than "1" speed number per zone.

TABLE 3

| Current Speed at Exit Sensor ▲ | Distance from Dest (Zones) | | | |
|---|---|---|---|---|
| | 1 | 2 | 3 | 4 |
| 0 | 0→0 (creep) | 0→1 | 0→1 | 0→1 |
| 1 | 1→0 | 1→1 | 1→2 | 1→2 |
| 2 | N/A | 2→1 | 2→2 | 2→3 |
| 3 | N/A | N/A | 3→2 | 3→3 |

Each of the FIGS. 27–29 is a command sequence timing diagram showing speed control and other messages sent by the zones effecting material movement operations (the lower part of the figure) and the resulting material speed profile (the upper part of the figure). As in the timing diagrams described above each depicted sequence progresses from the top to the bottom of the figures. Each message is associated with an arrow labeled with a reference number indicating the message's order in the command sequence and is described following a general description of a particular movement operation. Some of the message discussions refer to a speed table, which is a table stored by each zone thread that indicates at what speeds a zone is permitted to accelerate material for entry into a neighboring zone (see FIG. 13 for a description of the speed table). The position of the material as the movement operation progresses is shown as the shaded rectangle. The three command sequences are now described in reference to FIGS. 27–29.

FIG. 27 is a timing diagram showing messages sent between zones and a container speed profile for the situation where material X is deposited on zone ZI for movement to zone ZA. It is assumed that acceleration to full speed requires three additional zones (H, G, and F), so that when the forward edge of the container reaches the forward edge of zone F, it has reached maximum speed. The motors in zones I, H, G and F are synchronized so that the transition from zone to zone is smooth. Some or all of these zones may be controlled by a single micro-controller, but it is likely that the zones will be controlled by two nodes, and the node boundary may be at any of the zone boundaries. Motor synchronization occurs in two phases. First, a zone which is two zones downstream of the current zone will hear the CARRIER_EXITING message from the current zone. It will use the end speed of the profile in the message to start its motor running at that constant speed. In the second phase, the zone immediately downstream from the current zone will hear the CARRIER_EXITING message and will alter its current speed to match the profile in the message. The message sequence is as follows:

(1) Zone I sends out message 1 (ZONE_RESERVED) to acquire the load for the loading of new material. Upstream zones will adjust their entry speed tables to insure that incoming containers which are not already in the neighborhood are stopped prior to the zone.

(2) Once zone I determines the neighborhood is safe, (i.e. no containers are inbound), the zone continue the load process, resulting container X being deposited. The zone will begin movement of the container based upon the speed table. The zone knows that downstream zone H may be entered at any speed up to 3. The zone also knows that given the pod is stopped, the only speed profile available is 0–1. The zone will generate a CARRIER_EXITING message containing the identifier for a 0-1 profile. The downstream zones will receive this information and sync to the profile. Zone I will update the entry speed for zone H.

(3) Once the container has exited the zone, as indicated by the trailing edge of the sensor, zone I will send a CARRIER_EXITED message. Upstream nodes will modify their entry speed values for zone I.

(4) Zone H detects that the carrier is leaving by the rising edge of the sensor. At this time, the pod has reached speed 1. By examining its entry speed table, it determines that the current speed is less than the maximum allowed entry speed to G, and so uses a 1-2 profile. It sets the speed entry for zone G to −1.

(5) Upon seeing the trailing edge of the sensor, zone H sends an exited message out. Zone I receives the message and modifies its speed entry for zone H. I needs to perform no further processing as H is its immediate neighbor.

(6) Zone G detects that the carrier is leaving by the rising edge of the sensor. At this time the pod has reached speed 2. By examining its entry speed table, it determines that the current speed is less than the max. allowed entry speed to F, and so uses a 2-3 profile. It sets the speed entry for zone F to −1. Zones H and I also update their speed entry for F.

(7) Upon seeing the trailing edge of the sensor, zone G sends an exited message out. Zones H and I receives the message and modifies its speed entry for zone G. H needs to perform no further processing as G is its immediate neighbor. I does need to perform additional processing to update the speed value for zone H based on the change to G.

(8) Zone F detects that the carrier is leaving by the rising edge of the sensor. At this time the pod is moving at speed 3. By examining its entry speed table, it determines that the current speed is equal than the max. allowed entry speed to E and announces a change to a 3-3 profile. It sets the speed entry for zone E to −1. Zones G, H and I also update their speed entry for F.

(9) Upon seeing the trailing edge of the sensor, zone F sends an exited message out. Zones G, H and I receives the message and modifies its speed entry for zone F. G needs to perform no further processing as F is its immediate neighbor. H and I do need to perform additional processing to update the speed values for the zones upstream from F.

(10) Zone E detects that the carrier is leaving by the rising edge of the sensor. The pod is moving at speed 3. By examining its entry speed table, it determines that the current speed is equal than the max. allowed entry speed to D, and so continues the current profile. It then determines that the destination specified is 3 zones away and must therefore begin decerating the pod. It sends an exiting message with profile 3-2 and sets the speed entry for zone D to −1. Zones F, G, H and I also update their speed entry for E.

(11) Upon seeing the trailing edge of the sensor, zone E sends an exited message out. Zones F, G, H and I receives the message and modifies its speed entry for zone E. F needs to perform no further processing as E is its immediate neighbor. G, H and I do need to perform additional processing to update the speed values for the zones upstream from E.

(12) Zone D detects that the carrier is leaving by the rising edge of the sensor. The pod is now moving at speed 2. D knows that the destination zone B is two zones away. Based on the current speed and position of B, D determines that it needs to switch to a deceleration profile of 2-1, which it announces in its exiting message. It sets the speed entry for zone C to −1. Zones D, E, F, and G also update their speed entry for C.

(13) Upon seeing the trailing edge of the sensor, zone D sends an exited message out. Zones E, F, G and H receives the message and modifies its speed entry for zone D. E needs to perform no further processing as D is its immediate neighbor. F, G, and H do need to perform additional processing to update the speed values for the zones upstream from D.

(14) Zone C detects that the carrier is leaving by the rising edge of the sensor. It is now at speed 1. C knows that the destination zone B is one zone away. Based on this, it sets the profile to 1-0 and sets the speed entry for zone B to −1. Zones C, D, E, and F also update their speed entry for B.

(15) Upon seeing the trailing edge of the sensor, zone C sends an exited message out. Zones D, E, F and G receives the message and modifies its speed entry for zone C. D needs to perform no further processing as C is its immediate neighbor. E, F and G do need to perform additional processing to update the speed values for the zones upstream from C.

(16) Zone B detects the end of the deceleration profile and the leading edge of the zone sensor. Knowing that it is the destination, the zone sends out a CARRIER_ARRIVED message. Zones, C, D, E, and F set their zone B entry speed to −1 and update the speeds for their zones upstream from B. Zone B notifies the higher level controls of the arrival of the container and waits for it to be removed.

(17) Once zone B has detected that the container has been removed, it sends out a ZONE_AVAILABLE message. Zones C, D, E, and F change their zone B entry speed from −1 to −3, and update their zones upstream from B to speed 3.

The speed of the material in the zones for each of the 17 steps described above are shown below in TABLE 4. This information given for each zone is equivalent to the information that would be included in the speed table 670 of the respective zone threads ZT-B through ZT-I.

TABLE 4

| Zone/ | N-hood | init | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| I | H | 3 | 3 | 2 | -1 | -1 | 0 | 0 | 1 | 1 | 2 | 2 | 3 | 3 | 3 | 3 | 3 | 3 | 3 |
|   | G | 3 | 3 | 3 | 3 | 2 | -1 | -1 | 0 | 0 | 1 | 1 | 2 | 2 | 2 | 2 | 2 | 2 | 2 |
|   | F | 3 | 3 | 3 | 3 | 3 | 3 | 2 | -1 | -1 | 0 | 0 | 0 | 0 | 0 | 0 | 0 | 0 | 0 |
|   | E | 3 | 3 | 3 | 3 | 3 | 3 | 3 | -1 | 2 | -1 | 0 | 0 | 0 | 0 | 0 | 0 | 0 | 0 |
| H | G | 3 | 3 | 3 | 3 | 2 | -1 | -1 | 0 | 0 | 1 | 1 | 2 | 2 | 3 | 3 | 3 | 3 | 3 |
|   | F | 3 | 3 | 3 | 3 | 3 | 3 | 2 | -1 | -1 | 0 | 0 | 1 | 1 | 2 | 2 | 2 | 2 | 2 |
|   | E | 3 | 3 | 3 | 3 | 3 | 3 | 3 | 3 | 2 | -1 | -1 | 0 | 1 | 1 | 1 | 1 | 1 | 1 |
|   | D | 3 | 3 | 3 | 3 | 3 | 3 | 3 | 3 | 3 | 3 | 2 | -1 | -1 | 0 | 0 | 0 | 0 | 0 |
| G | F | 3 | 3 | 3 | 3 | 3 | 3 | 2 | -1 | -1 | 0 | 0 | 1 | 1 | 2 | 2 | 3 | 3 | 3 |
|   | E | 3 | 3 | 3 | 3 | 3 | 3 | 3 | 3 | 2 | -1 | -1 | 0 | 1 | 1 | 2 | 2 | 2 | 2 |
|   | D | 3 | 3 | 3 | 3 | 3 | 3 | 3 | 3 | 3 | 3 | 2 | -1 | -1 | 0 | 1 | 1 | 1 | 1 |
|   | C | 3 | 3 | 3 | 3 | 3 | 3 | 3 | 3 | 3 | 3 | 3 | 3 | 2 | -1 | -1 | 0 | 0 | 0 |
| F | E | 3 | 3 | 3 | 3 | 3 | 3 | 3 | 3 | 2 | -1 | -1 | 0 | 1 | 1 | 2 | 2 | 3 |
|   | D | 3 | 3 | 3 | 3 | 3 | 3 | 3 | 3 | 3 | 3 | 2 | -1 | -1 | 0 | 0 | 1 | 3 |
|   | C | 3 | 3 | 3 | 3 | 3 | 3 | 3 | 3 | 3 | 3 | 3 | 3 | 2 | -1 | -1 | 0 | 0 | 3 |
|   | B | 3 | 3 | 3 | 3 | 3 | 3 | 3 | 3 | 3 | 3 | 3 | 3 | 3 | 3 | 2 | -1 | -1 | 3 |
| E | D | 3 | 3 | 3 | 3 | 3 | 3 | 3 | 3 | 3 | 3 | 2 | -1 | -1 | 0 | 0 | 1 | 3 | |
|   | C | 3 | 3 | 3 | 3 | 3 | 3 | 3 | 3 | 3 | 3 | 3 | 3 | 2 | -1 | -1 | 0 | 0 | 3 |
|   | B | 3 | 3 | 3 | 3 | 3 | 3 | 3 | 3 | 3 | 3 | 3 | 3 | 3 | 3 | 2 | -1 | -1 | 3 |
|   | A | 3 | 3 | 3 | 3 | 3 | 3 | 3 | 3 | 3 | 3 | 3 | 3 | 3 | 3 | 3 | 3 | 3 | 3 |
| D | C | 3 | 3 | 3 | 3 | 3 | 3 | 3 | 3 | 3 | 3 | 3 | 2 | -1 | -1 | 0 | 0 | 3 | |
|   | B | 3 | 3 | 3 | 3 | 3 | 3 | 3 | 3 | 3 | 3 | 3 | 3 | 3 | 3 | 2 | -1 | -1 | 3 |
|   | A | 3 | 3 | 3 | 3 | 3 | 3 | 3 | 3 | 3 | 3 | 3 | 3 | 3 | 3 | 3 | 3 | 3 | 3 |
|   | Z | 3 | 3 | 3 | 3 | 3 | 3 | 3 | 3 | 3 | 3 | 3 | 3 | 3 | 0 | 0 | 0 | 0 | 0 |
| C | B | 3 | 3 | 3 | 3 | 3 | 3 | 3 | 3 | 3 | 3 | 3 | 3 | 3 | 3 | 2 | -1 | -1 | 3 |
|   | A | 3 | 3 | 3 | 3 | 3 | 3 | 3 | 3 | 3 | 3 | 3 | 3 | 3 | 3 | 3 | 3 | 3 | 3 |
|   | Z | 3 | 3 | 3 | 3 | 3 | 3 | 3 | 3 | 3 | 3 | 3 | 3 | 3 | 3 | 3 | 3 | 3 | 3 |
|   | Y | 3 | 3 | 3 | 3 | 3 | 3 | 3 | 3 | 3 | 3 | 3 | 3 | 3 | 3 | 3 | 3 | 3 | 3 |
| B | A | 3 | 3 | 3 | 3 | 3 | 3 | 3 | 3 | 3 | 3 | 3 | 3 | 3 | 3 | 3 | 3 | 3 | 3 |
|   | Z | 3 | 3 | 3 | 3 | 3 | 3 | 3 | 3 | 3 | 3 | 3 | 3 | 3 | 3 | 3 | 3 | 3 | 3 |
|   | Y | 3 | 3 | 3 | 3 | 3 | 3 | 3 | 3 | 3 | 3 | 3 | 3 | 3 | 3 | 3 | 3 | 3 | 3 |
|   | X | 3 | 3 | 3 | 3 | 3 | 3 | 3 | 3 | 3 | 3 | 3 | 3 | 3 | 3 | 3 | 3 | 3 | 3 |

FIG. 28 is a timing diagram showing messages sent between zones for the situation where a load zone D is reserved for acceptance of new material (X) from a device while container Y is incoming. If a container is moving at full speed, it must begin decelerating in zone H so that is comes to a halt in zone E. The zone must insure that all incoming pods have either stopped or passed by before allowing a new pod to be deposited on the track. Notes that in this situation the incoming container must be slowed down so that it does not overtake the accelerating container. However, based on calculations, the incoming container does not need to be brought to a stop. If it is, the resultant spacing between the two carriers will be +−6 six zones, which does not provide good utilization. If the container is decelerated to speed 1, and then ramped back up to 3, then the final spacing is slightly more than three zones. The zone threads can embody this or similar considerations to promote optimal utilization of the track. The message sequence is as follows:

(1) Zone E sends out a ZONE_RESERVED multi-cast message. All zone's in E's neighborhood will hear the message and update their speed table with a −4 for zone E. The upstream zones are updated to 0, 1, and 2.

(2) Once E has determined that there are no pods inbound which cannot stop, it allows pod X to be placed on the track. As downstream zone D has a 3 in its speed table entry, E is free to accelerate the pod. As the pod is stopped, the only available profile is 0-1. An exiting message is sent out with this profile.

(3) Almost immediately after, pod Y, moving at constant speed 3, trips the downstream sensor in zone J. J examines its speed table and, finding it may enter I at speed 3, sends an exiting message with profile 3-3. All neighbor zones know that I is downstream of J, and mark I as unavailable (−1).

(4) Pod Y exits zone J and sends an exited message out. Zones upstream of J will update their speed tables.

(5) Pod Y, moving at speed 3, trips the downstream sensor in zone I. I examines its speed table and finds that the speed for H is 2. I switches to profile 3-2 and sends an exiting message. Downstream zones know H is downstream of I, and mark H as unavailable.

(6) Pod Y exits zone I and sends an exited message. Upstream zones change their entry for zone I from −1 to zero.

(7) Pod Y, now moving at speed 2, trips the downstream sensor of zone H. H examines its speed table and sees the speed for G is 1. H changes to profile 2-1 and sends this in an exiting message. The zones know G is downstream of H, and mark it unavailable. Note that at this time X is about half way into D.

(8) Pod X completes its transit of zone E and sends an exited message. All zones which had E marked as reserved (−4) update the field to zero, and increment each of the upstream zones.

(9) Pod X, now moving at speed 1, crosses the downstream sensor of zone D. D examines is speed table entry for C, and sees it can use any speed up to 3. As its current speed is 1, the only accel profile available is 1-2, which it announces in an exiting message. The neighbor zones know that the zone downstream of D is C, and they mark C as unavailable.

(10) Pod Y, now moving at speed 1, completes its transit of H and sends an exited message. Neighboring zones change the −1 for H to a zero, and increment the upstream zones to a maximum of 3.

(11) Pod Y, moving at speed 1, hits the downstream sensor of G and examines entry for F in the speed table. The table indicates a speed of one, so the zone changes to profile 1-1 and announces this in an exiting message. All neighboring zones set their entry for F to −1.

(12) Pod X moving at speed 2, exits zone D and sends an exited message. Upstream zones change their entry for D from −1 to zero, and increment the value for the zones upstream of D.

(13) Pod X crosses the downstream sensor of C at speed 2, and examines its speed table entry for zone B. As the value is 3, the zone changes to a profile of 2-3 and sends this out in an exiting message. Neighboring zones set their speed table entries for B to −1.

(14) Pod Y, moving at speed 1, completes its transit of zone G and sends an exited message. Neighbor zones change their entry for G from −1 to zero, and increment the entries for upstream zones.

(15) Pod Y, moving at speed 1, trips the downstream sensor of zone F. The zone examines its speed table entry for zone E and finds a speed setting of 1. The zone sends an exiting message with profile 1-1. Upstream zones change their speed entries for zone E to −1.

(16) Pod X completes its transit of zone C and sends an exited message. Upstream zones change C's speed table entry from −1 to 0, and increment the speed for the zones upstream of C.

(17) Pod X, not moving at speed 3, trips the downstream sensor of zone B and examines its speed table entry for A. As the entry is 3 and the pod is moving at 3, it switches to a constant 3-3 profile and announces this in an exiting message. Upstream zones know A is downstream of B and set A's speed value to −1.

(18) Pod X completes its transit of zone B and sends and exited message. Upstream zones set B's speed to 0 and increment the upstream zones.

(19) Pod X trips the downstream sensor of A, examines its speed table, and sends an exiting message for profile 3-3. Upstream zones mark Z as unavailable.

(20) Pod Y completes its transit of zone F and sends an exited message. Upstream zones change F's speed from −1 to 0, and increment the zones upstream of it.

(21) Pod Y, traveling at speed 1, strips the downstream sensor of zone E. E examines its speed table for D and finds a 2. E sends an exiting message with profile 1-2. Upstream zones set zone D to −1.

(22) Pod X completes its transit of zone A and send an exited message. Upstream zones mark A with speed 0 and increment the zones upstream of it.

(23) Pod Y, moving at speed 3, trips the downstream sensor on zone Z. Z sends an exiting message with profile 3-3.

(24) Pod Y, traveling at speed ~2, completes its transit of E and sends an exited message. Upstream zones mark E as available at speed 0, and increment the zones upstream of it.

(25) Pod Y, traveling at speed 2, trips the downstream sensor of D. Zone D's speed table is examined, a value of 2 is found, and Y announces a profile of 2-2 in its exiting message.

Note that in this example, the difference between speed 2 and 3 is sufficiently small that it takes a large number of zones for Y to come back up to full speed. (the spacing between X and Y decreases very slowly).

The speed of the material in the zones for each of the 25 steps described above are shown below in TABLE 5. This information given for each zone is equivalent to the information that would be included in the speed table 670 of the respective zone threads ZT-A through ZT-J.

TABLE 5

| Zone | N-hood | init | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| J | I | 3 | 3 | 3 | 3 | -1 | -1 | 0 | 0 | 0 | 0 | 1 | 1 | 3 | 3 | 3 | 3 | 3 | 3 | 2 | 2 | 3 | 3 | 3 | 3 | 3 | |
|   | H | 3 | 3 | 3 | 3 | 3 | 3 | -1 | -1 | -1 | -1 | 0 | 0 | 0 | 0 | 1 | 1 | 1 | 1 | 1 | 1 | 2 | 2 | 2 | 2 | 2 | |
|   | G | 3 | 3 | 3 | 3 | 3 | 3 | 3 | 3 | -1 | -1 | -1 | -1 | -1 | -1 | 0 | 0 | 0 | 0 | 0 | 0 | 1 | 1 | 1 | 1 | 1 | |
|   | F | 3 | 3 | 3 | 3 | 3 | 3 | 3 | 3 | 3 | 3 | 3 | -1 | -1 | -1 | -1 | -1 | -1 | -1 | -1 | -1 | 0 | 0 | 0 | 0 | 0 | |
| I | H | 3 | 3 | 2 | 2 | 2 | 3 | -1 | -1 | -1 | -1 | 0 | 0 | 0 | 0 | 1 | 1 | 1 | 1 | 1 | 1 | 2 | 2 | 2 | 2 | 3 | |
|   | G | 3 | 1 | 1 | 1 | 1 | 1 | 1 | 3 | -1 | -1 | -1 | -1 | -1 | -1 | 0 | 0 | 0 | 0 | 0 | 0 | 1 | 1 | 1 | 1 | 2 | |
|   | F | 3 | 0 | 0 | 0 | 0 | 0 | 0 | 0 | 1 | 1 | 1 | -1 | -1 | -1 | -1 | -1 | -1 | -1 | -1 | -1 | 0 | 0 | 0 | 0 | 1 | |
|   | E | 3 | | -4 | -4 | -4 | -4 | -4 | -4 | 0 | 0 | 0 | 0 | 0 | 0 | 0 | 1 | -1 | -1 | -1 | -1 | -1 | -1 | -1 | -1 | 0 | |
| H | G | 3 | 1 | 1 | 1 | 1 | 1 | 1 | 3 | -1 | -1 | -1 | -1 | -1 | -1 | 0 | 0 | 0 | 0 | 0 | 0 | 1 | 1 | 1 | 1 | 2 | |
|   | F | 3 | 0 | 0 | 0 | 0 | 0 | 0 | 0 | 1 | 1 | 1 | -1 | -1 | -1 | -1 | -1 | -1 | -1 | -1 | -1 | 0 | 0 | 0 | 0 | 1 | |
|   | E | 3 | -4 | -4 | -4 | -4 | -4 | -4 | -4 | 0 | 0 | 0 | 1 | 1 | 1 | 1 | -1 | -1 | -1 | -1 | -1 | -1 | -1 | -1 | -1 | 0 | |
|   | D | 3 | 3 | 3 | -1 | -1 | -1 | -1 | -1 | -1 | -1 | -1 | -1 | 0 | 0 | 0 | 0 | 0 | 0 | 0 | 0 | 0 | 3 | -1 | -1 | -1 | - |
| G | F | 3 | 0 | 0 | 0 | 0 | 0 | 0 | 0 | 1 | 1 | 1 | -1 | -1 | -1 | -1 | -1 | -1 | -1 | -1 | -1 | 0 | 0 | 0 | 0 | 1 | |
|   | E | 3 | -4 | -4 | -4 | -4 | -4 | -4 | -4 | 0 | 0 | 0 | 0 | 1 | 1 | 1 | 1 | -1 | -1 | -1 | -1 | -1 | -1 | -1 | -1 | 0 | |
|   | D | 3 | 3 | 3 | -1 | -1 | -1 | -1 | -1 | -1 | -1 | -1 | -1 | 0 | 0 | 0 | 3 | 1 | 1 | 1 | 1 | 3 | -1 | -1 | -1 | - | |
|   | C | 3 | 3 | 3 | 3 | 3 | 3 | 3 | 3 | 3 | 3 | -1 | -1 | -1 | -1 | -1 | -1 | 0 | 0 | 0 | 0 | 0 | 0 | 0 | 0 | 0 | |
| F | E | 3 | -4 | -4 | -4 | -4 | -4 | -4 | -4 | 0 | 0 | 0 | 1 | 1 | 1 | 1 | -1 | -1 | -1 | -1 | -1 | -1 | -1 | -1 | -1 | 0 | |
|   | D | 3 | 3 | 3 | -1 | -1 | -1 | -1 | -1 | -1 | -1 | -1 | -1 | 0 | 0 | 1 | 1 | 1 | 2 | 2 | 2 | 3 | -1 | -1 | -1 | - | |
|   | C | 3 | 3 | 3 | 3 | 3 | 3 | 3 | 3 | 3 | -1 | -1 | -1 | -1 | -1 | 0 | 0 | 0 | 1 | 1 | 1 | 1 | 1 | 1 | 1 | 1 | |
|   | B | 3 | 3 | 3 | 3 | 3 | 3 | 3 | 3 | 3 | 3 | 3 | 3 | 3 | -1 | -1 | -1 | -1 | 0 | 0 | 0 | 0 | 0 | 0 | 0 | 0 | |
| E | D | 3 | 3 | 3 | -1 | -1 | -1 | -1 | -1 | -1 | -1 | -1 | -1 | -1 | 0 | 0 | 0 | 1 | 2 | 2 | 2 | 3 | -1 | -1 | -1 | - | |
|   | C | 3 | 3 | 3 | 3 | 3 | 3 | 3 | 3 | 3 | 3 | -1 | -1 | -1 | -1 | -1 | -1 | 0 | 0 | 1 | 1 | 1 | 1 | 2 | 2 | 2 | |
|   | B | 3 | 3 | 3 | 3 | 3 | 3 | 3 | 3 | 3 | 3 | 3 | 3 | 3 | -1 | -1 | -1 | -1 | 0 | 0 | 0 | 0 | 3 | 1 | 1 | 1 | |
|   | A | 3 | 3 | 3 | 3 | 3 | 3 | 3 | 3 | 3 | 3 | 3 | 3 | 3 | 3 | 3 | 3 | -1 | -1 | -1 | -1 | -1 | 0 | 0 | 0 | 0 | |
| D | C | 3 | 3 | 3 | 3 | 3 | 3 | 3 | 3 | 3 | -1 | -1 | -1 | -1 | -1 | -1 | 0 | 0 | 1 | 1 | 1 | 1 | 3 | 2 | 2 | 3 | |
|   | B | 3 | 3 | 3 | 3 | 3 | 3 | 3 | 3 | 3 | 3 | 3 | 3 | -1 | -1 | -1 | -1 | 0 | 0 | 0 | 0 | 3 | 1 | 1 | 1 | 1 | |
|   | A | 3 | 3 | 3 | 3 | 3 | 3 | 3 | 3 | 3 | 3 | 3 | 3 | 3 | 3 | 3 | 3 | -1 | -1 | -1 | -1 | 0 | 0 | 0 | 0 | 0 | |
|   | Z | 3 | 3 | 3 | 3 | 3 | 3 | 3 | 3 | 3 | 3 | 3 | 3 | 3 | 3 | 3 | 3 | 3 | -1 | -1 | -1 | -1 | -1 | - | | | |
| C | B | 3 | 3 | 3 | 3 | 3 | 3 | 3 | 3 | 3 | 3 | 3 | 3 | -1 | -1 | -1 | -1 | 0 | 0 | 0 | 0 | 1 | 1 | 1 | | | |
|   | A | 3 | 3 | 3 | 3 | 3 | 3 | 3 | 3 | 3 | 3 | 3 | 3 | 3 | 3 | 3 | 3 | -1 | -1 | -1 | -1 | 0 | 0 | 0 | 0 | | |
|   | Z | 3 | 3 | 3 | 3 | 3 | 3 | 3 | 3 | 3 | 3 | 3 | 3 | 3 | 3 | 3 | 3 | 3 | -1 | -1 | -1 | -1 | -1 | - | | | |
|   | Y | 3 | 3 | 3 | 3 | 3 | 3 | 3 | 3 | 3 | 3 | 3 | 3 | 3 | 3 | 3 | 3 | 3 | 3 | 3 | 3 | 3 | 3 | -1 | - | | |
| B | A | 3 | 3 | 3 | 3 | 3 | 3 | 3 | 3 | 3 | 3 | 3 | 3 | 3 | 3 | 3 | -1 | -1 | -1 | -1 | 0 | 0 | 0 | | | | |
|   | Z | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | | | |
|   | Y | 3 | 3 | 3 | 3 | 3 | 3 | 3 | 3 | 3 | 3 | 3 | 3 | 3 | 3 | 3 | 3 | 3 | 3 | 3 | 3 | 3 | 3 | -1 | - | | |
|   | X | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | | |
| A | Z | 3 | 3 | 3 | 3 | 3 | 3 | 3 | 3 | 3 | 3 | 3 | 3 | 3 | 3 | 3 | 3 | -1 | -1 | -1 | -1 | -1 | - | | | | |
|   | Y | 3 | 3 | 3 | 3 | 3 | 3 | 3 | 3 | 3 | 3 | 3 | 3 | 3 | 3 | 3 | 3 | 3 | 3 | 3 | 3 | 3 | 3 | -1 | - | | |
|   | W | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | | |
|   | X | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | | |

FIG. 29 is a timing diagram showing messages sent between zones for the situation where two adjacent containers X and Y both begin moving and the resultant container spacing. The initial conditions for this situation are that pod Y has been stopped on zone 3 so that pod X may be deposited onto zone I. Once X has been deposited, it will begin moving to its destination. This triggers the movement of pod Y. The message sequence is as follows:

(1) Zone I examines its speed table and finds it may enter zone H at any speed to the maximum. As the pod is stopped, it must use the 0-1 profile, and announces this with an exiting message. Neighboring zones receive the message and mark zone H as unavailable (−1).

(2) Once X has exited zone I, I will send an exited message. Upstream neighbor zones will mark I as available in their speed tables.

(3) After updating its speed table Zone J will determine it may begin moving pod Y. Based upon the pod being stopped, and I's speed table entry being 0, J may move the pod at profile 0-0 (creep speed).

(4) Zone H detects the pod via the downstream sensor. Pod X is now moving at speed 1. H consults its speed table for zone G. H decides to use a profile of 1-2 and announces this in an exiting message. Upstream neighbor zones adjust their speed table entry for G.

(5) H detects that X has completed transiting its zone and sends an exited message. Upstream neighbors mark H as available and update their entries for the zones upstream of H.

(6) Zone G detects X exiting at speed 2. After consulting its speed table, G switches to a 2-3 profile and sends an exiting message. Upstream zones mark F as unavailable.

(7) X clears zone G. Zone G sends an exited message. Upstream neighbors mark G as available and update speed entries for the zones upstream of G.

(8) Zone F detects X exiting at speed 3. F consults its speed table and finds E may be entered at 3, and so switches to a 3-3 profile and announces this in an exiting message. Upstream neighbor zones adjust their speed table entries accordingly.

(9) Zone F sees the falling edge of the exit sensor and sends an exited message. Upstream neighbors adjust their speed tables to make F available.

(10) Zone E sees the rising edge of the exiting sensor and consults its speed table. E determines it must follow the 3-3 profile and sends an exiting message. Upstream neighbors mark zone D as unavailable.

(11) Zone E sees the falling edge of the exit sensor and sends an exited message. Upstream neighbors adjust their speed tables to make E available.

(12) Zone D sees the rising edge of the exiting sensor and consults its speed table. D determines it must follow the 3-3 profile and sends an exiting message. Upstream neighbors mark zone C as unavailable.

(13) Zone D sees the falling edge of the exit sensor and sends an exited message. Upstream neighbors adjust their speed tables to make D available.

(14) Zone C sees the rising edge of the exiting sensor and consults its speed table. C determines it must follow the 3-3 profile and sends an exiting message. Upstream neighbors mark zone B as unavailable.

(15) Zone I detects that pod Y has tripped the exit sensor at creep speed. I consults its speed table and finds it may enter at speed 3. However, as the pod is only moving at speed 0-0, it must use a profile of 0-1. I sends an exiting message with the profile. Upstream neighbors mark H as unavailable.

(16) C detects that pod X has left the zone and sends an exited message. Upstream neighbors mark C as available and update speeds to C's upstream neighbors.

(17) Zone B sees the rising edge of the exiting sensor and consults its speed table. B determines it must follow the 3-3 profile and sends an exiting message. Upstream neighbors mark zone A as unavailable.

(18) Zone B sees the falling edge of the exit sensor and sends an exited message. Upstream neighbors adjust their speed tables to make B available.

(19) Zone A sees the rising edge of the exiting sensor and consults its speed table. A determines it must follow the 3-3 profile and sends an exiting message. Upstream neighbors mark zone Z as unavailable.

(20) Zone A sees the falling edge of the exit sensor and sends an exited message. Upstream neighbors adjust their speed tables to make A available.

(21) Zone Z sees the rising edge of the exiting sensor and consults its speed table. Z determines it must follow the 3-3 profile and sends an exiting message. Upstream neighbors mark zone Y as unavailable.

(22) Zone I sees the falling edge of the exit sensor and determines Y has left the zone. I sends an exited message. Upstream neighbors mark Y as available and update speed entries for Y's upstream neighbors.

(23) Zone H sees the rising edge of the exit sensor. Pod Y is now moving at speed 1. H consults its speed table and decides to switch to profile 1-2. H sends this out in an exiting message. Upstream neighbors mark G as unavailable.

(24) Zone H sees the falling edge of the exit sensor and sends an exited message. Upstream neighbors adjust their speed tables to make H available.

(25) Zone G sees the rising edge of its exit sensor. Y is now moving at speed 2. G determines it may switch to a 2-3 profile and announces this in an exiting message. Upstream zones mark F as unavailable.

(26) Zone G sees the falling edge of the exit sensor and determines Y has left the zone. G sends an exited message.

(27) Zone F sees the rising edge of the exit sensor. Y is now moving at speed 3. F consults its speed table and decides to use a 3-3 profile. F sends this information out in an exiting message.

The speed of the material in the zones for each of 27 steps described above are shown below in TABLE 6. This information given for each zone is equivalent to the information that would be included in the speed table 670 of the respective zone threads ZT-A through ZT-J.

TABLE 6

| Zone/N-hood | | init | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|---|
| J | I | -1 | -1 | 0 | 1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 2 | 2 |
|  | H | 3 | 1 | -1 | -1 | -1 | 0 | 0 | 1 | 1 | 2 | 2 | 2 | 2 | 2 | 2 | 1 | -1 | -1 | -1 | -1 | -1 | -1 | -1 | -1 | 0 | 0 | 1 | 1 |
|  | G | 3 | 3 | 3 | 3 | 1 | -1 | -1 | 0 | 0 | 1 | 1 | 1 | 1 | 1 | 1 | 1 | 1 | 1 | 1 | 1 | 1 | 1 | -1 | -1 | -1 | 0 | 0 | 0 |
|  | F | 3 | 3 | 3 | 3 | 3 | 3 | 1 | -1 | -1 | 0 | 0 | 0 | 0 | 0 | 0 | 0 | 0 | 0 | 0 | 0 | 0 | 0 | 0 | 0 | 0 | 1 | -1 | -1 |
| I | H | 3 | 1 | -1 | -1 | -1 | 0 | 0 | 1 | 1 | 2 | 2 | 3 | 3 | 3 | 3 | 1 | -1 | -1 | -1 | -1 | -1 | -1 | -1 | -1 | 0 | 0 | 1 | 1 |
|  | G | 3 | 3 | 3 | 3 | 1 | -1 | -1 | 0 | 0 | 1 | 1 | 2 | 2 | 2 | 2 | 2 | 2 | 2 | 2 | 2 | 2 | 2 | 1 | -1 | -1 | 0 | 0 | 0 |
|  | F | 3 | 3 | 3 | 3 | 3 | 3 | 1 | -1 | -1 | 0 | 0 | 1 | 1 | 1 | 1 | 1 | 1 | 1 | 1 | 1 | 1 | 1 | 1 | 1 | 1 | 1 | -1 | -1 |
|  | E | 3 | 3 | 3 | 3 | 3 | 3 | 3 | 3 | 1 | -1 | -1 | 0 | 0 | 0 | 0 | 0 | 0 | 0 | 0 | 0 | 0 | 0 | 0 | 0 | 0 | 0 | 0 | 1 |
| H | G | 3 | 3 | 3 | 3 | 1 | -1 | -1 | 0 | 0 | 1 | 1 | 2 | 2 | 3 | 3 | 3 | 3 | 3 | 3 | 3 | 3 | 1 | -1 | -1 | 0 | 0 | 0 | 0 |
|  | F | 3 | 3 | 3 | 3 | 3 | 3 | 1 | -1 | -1 | 0 | 0 | 1 | 1 | 2 | 2 | 2 | 2 | 2 | 2 | 2 | 2 | 2 | 2 | 1 | -1 | -1 | -1 | -1 |
|  | E | 3 | 3 | 3 | 3 | 3 | 3 | 3 | 3 | 1 | -1 | -1 | 0 | 0 | 1 | 1 | 1 | 1 | 1 | 1 | 1 | 1 | 1 | 1 | 1 | 1 | 1 | 1 | 1 |
|  | D | 3 | 3 | 3 | 3 | 3 | 3 | 3 | 3 | 3 | 3 | -1 | -1 | -1 | 1 | 0 | 0 | 0 | 0 | 0 | 0 | 0 | 0 | 0 | 0 | 0 | 0 | 0 | 0 |
| G | F | 3 | 3 | 3 | 3 | 3 | 3 | 1 | -1 | -1 | 0 | 0 | 1 | 1 | 2 | 2 | 1 | 3 | 3 | 3 | 3 | 3 | 3 | 3 | 1 | -1 | -1 | -1 | -1 |
|  | E | 3 | 3 | 3 | 3 | 3 | 3 | 3 | 3 | 1 | -1 | -1 | 0 | 0 | 1 | 1 | 1 | 2 | 2 | 2 | 2 | 2 | 2 | 2 | 2 | 2 | 2 | 2 | 1 |
|  | D | 3 | 3 | 3 | 3 | 3 | 3 | 3 | 3 | 3 | 3 | 1 | -1 | -1 | 0 | 0 | 1 | 1 | 1 | 1 | 1 | 1 | 1 | 1 | 1 | 1 | 1 | 1 | 1 |
|  | C | 3 | 3 | 3 | 3 | 3 | 3 | 3 | 3 | 3 | 3 | 3 | -1 | -1 | -1 | -1 | 1 | 0 | 0 | 0 | 0 | 0 | 0 | 0 | 0 | 0 | 0 | 0 | 0 |
| F | E | 3 | 3 | 3 | 3 | 3 | 3 | 3 | 3 | 1 | -1 | -1 | 0 | 0 | 1 | 1 | 1 | 2 | 3 | 3 | 3 | 3 | 3 | 3 | 3 | 3 | 3 | 3 | 1 |
|  | D | 3 | 3 | 3 | 3 | 3 | 3 | 3 | 3 | 3 | 3 | 1 | -1 | -1 | 0 | 0 | 1 | 1 | 2 | 2 | 2 | 2 | 2 | 2 | 2 | 2 | 2 | 2 | 2 |
|  | C | 3 | 3 | 3 | 3 | 3 | 3 | 3 | 3 | 3 | 3 | 3 | 3 | 1 | -1 | -1 | 1 | 0 | 1 | 1 | 1 | 1 | 1 | 1 | 1 | 1 | 1 | 1 | 1 |
|  | B | 3 | 3 | 3 | 3 | 3 | 3 | 3 | 3 | 3 | 3 | 3 | 3 | 3 | 3 | -1 | -1 | -1 | 0 | 0 | 0 | 0 | 0 | 0 | 0 | 0 | 0 | 0 | 0 |
| E | D | 3 | 3 | 3 | 3 | 3 | 3 | 3 | 3 | 3 | 3 | 1 | -1 | -1 | 0 | 0 | 1 | 1 | 2 | 2 | 3 | 3 | 3 | 3 | 3 | 3 | 3 | 3 | 3 |
|  | C | 3 | 3 | 3 | 3 | 3 | 3 | 3 | 3 | 3 | 3 | 3 | 3 | 1 | -1 | -1 | 1 | 0 | 1 | 1 | 2 | 2 | 2 | 2 | 2 | 2 | 2 | 2 | 2 |
|  | B | 3 | 3 | 3 | 3 | 3 | 3 | 3 | 3 | 3 | 3 | 3 | 3 | 3 | 3 | 1 | -1 | -1 | 0 | 0 | 1 | 1 | 1 | 1 | 1 | 1 | 1 | 1 | 1 |
|  | A | 3 | 3 | 3 | 3 | 3 | 3 | 3 | 3 | 3 | 3 | 3 | 3 | 3 | 3 | 3 | 3 | 1 | -1 | -1 | 0 | 0 | 0 | 0 | 0 | 0 | 0 | 0 | 0 |
| D | C | 3 | 3 | 3 | 3 | 3 | 3 | 3 | 3 | 3 | 3 | 3 | 1 | -1 | -1 | 0 | 0 | 1 | 1 | 2 | 2 | 2 | 2 | 2 | 2 | 2 | 2 | 2 | 2 |
|  | B | 3 | 3 | 3 | 3 | 3 | 3 | 3 | 3 | 3 | 3 | 3 | 3 | 3 | 1 | -1 | -1 | 0 | 0 | 1 | 1 | 1 | 1 | 1 | 1 | 1 | 1 | 1 | 1 |
|  | A | 3 | 3 | 3 | 3 | 3 | 3 | 3 | 3 | 3 | 3 | 3 | 3 | 3 | 3 | 3 | 1 | -1 | -1 | 0 | 0 | 0 | 0 | 0 | 0 | 0 | 0 | 0 | 0 |
|  | Z | 3 | 3 | 3 | 3 | 3 | 3 | 3 | 3 | 3 | 3 | 3 | 3 | 3 | 3 | 3 | 3 | 3 | 3 | -1 | -1 | -1 | -1 | -1 | -1 | -1 | -1 | -1 | -1 |
| C | B | 3 | 3 | 3 | 3 | 3 | 3 | 3 | 3 | 3 | 3 | 3 | 3 | 1 | -1 | -1 | -1 | 0 | 0 | 1 | 1 | 1 | 1 | 1 | 1 | 1 | 1 | 1 | 1 |
|  | A | 3 | 3 | 3 | 3 | 3 | 3 | 3 | 3 | 3 | 3 | 3 | 3 | 3 | 3 | 3 | 1 | -1 | -1 | 0 | 0 | 0 | 0 | 0 | 0 | 0 | 0 | 0 | 0 |
|  | Z | 3 | 3 | 3 | 3 | 3 | 3 | 3 | 3 | 3 | 3 | 3 | 3 | 3 | 3 | 3 | 3 | 3 | 3 | -1 | -1 | -1 | -1 | -1 | -1 | -1 | -1 | -1 | -1 |
|  | Y | 3 | 3 | 3 | 3 | 3 | 3 | 3 | 3 | 3 | 3 | 3 | 3 | 3 | 3 | 3 | 3 | 3 | 3 | 3 | -1 | -1 | -1 | -1 | -1 | -1 | -1 | -1 | -1 |
| B | A | 3 | 3 | 3 | 3 | 3 | 3 | 3 | 3 | 3 | 3 | 3 | 3 | 3 | 3 | 3 | 1 | -1 | -1 | 0 | 0 | 0 | 0 | 0 | 0 | 0 | 0 | 0 | 0 |
|  | Z | 3 | 3 | 3 | 3 | 3 | 3 | 3 | 3 | 3 | 3 | 3 | 3 | 3 | 3 | 3 | 3 | 1 | -1 | -1 | -1 | -1 | -1 | -1 | -1 | -1 | -1 | -1 | -1 |
|  | Y | 3 | 3 | 3 | 3 | 3 | 3 | 3 | 3 | 3 | 3 | 3 | 3 | 3 | 3 | 3 | 3 | 3 | 3 | -1 | -1 | -1 | -1 | -1 | -1 | -1 | -1 | -1 | -1 |
|  | X | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| A | Z | 3 | 3 | 3 | 3 | 3 | 3 | 3 | 3 | 3 | 3 | 3 | 3 | 3 | 3 | 3 | 3 | 1 | -1 | -1 | -1 | -1 | -1 | -1 | -1 | -1 | -1 | -1 | -1 |
|  | Y | 3 | 3 | 3 | 3 | 3 | 3 | 3 | 3 | 3 | 3 | 3 | 3 | 3 | 3 | 3 | 3 | 3 | 3 | -1 | -1 | -1 | -1 | -1 | -1 | -1 | -1 | -1 | -1 |
|  | W | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
|  | X | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |

In an alternate embodiment, the speed table 670 indicates only whether or not a zone is occupied or reserved (i.e., speed data is not included in the table 670). A zone thread 512 (FIG. 13) uses the occupied and reserved status of its downstream zones and the entry speed of a container to calculate the exit/final speed number of the container in accordance with a simpler embodiment of the speed table rules 676. In this embodiment, the zone thread 512 sets the final speed to a speed number selected from 0, 1, 2, or 3. In particular, when one or more of its downstream zones are occupied the zone thread 512 sets the container final speed number as described above for the situation where the corresponding speed table values are set to −1. When one or more of its downstream zones are reserved the zone thread 512 sets the container final speed number as described above for the situation where the corresponding speed table values are set to −4. When none of its downstream zones are occupied or reserved, the the zone thread 512 can freely set the container final speed to any speed number, subjet to constraints on container movement. For example, when its downstream zones are neither occupied nor reserved, if its immediate downstream zone were a destination, the zone thread 512 would be constrained to set the container's exit/final speed to 0.

F. Zone Thread Dynamic Models

Each zone thread implements a state machine 620 (FIG. 13) based on dynamic models of the possible zone operations/states. At the top level, these states include:

Starting when a zone is starting material,

Stopping when a zone is stopping material,

Transiting when a zone is moving material along its current path,

Blocked when a zone is preventing movement of material,
Idle when a zone is not participating in material movement (zone-tasking),
Ready Zone is in a ready state when:
1. material has come to a stop in the zone (transition from STOPPING);
2. material has been placed in the zone and is waiting to begin movement.

Figure 30:
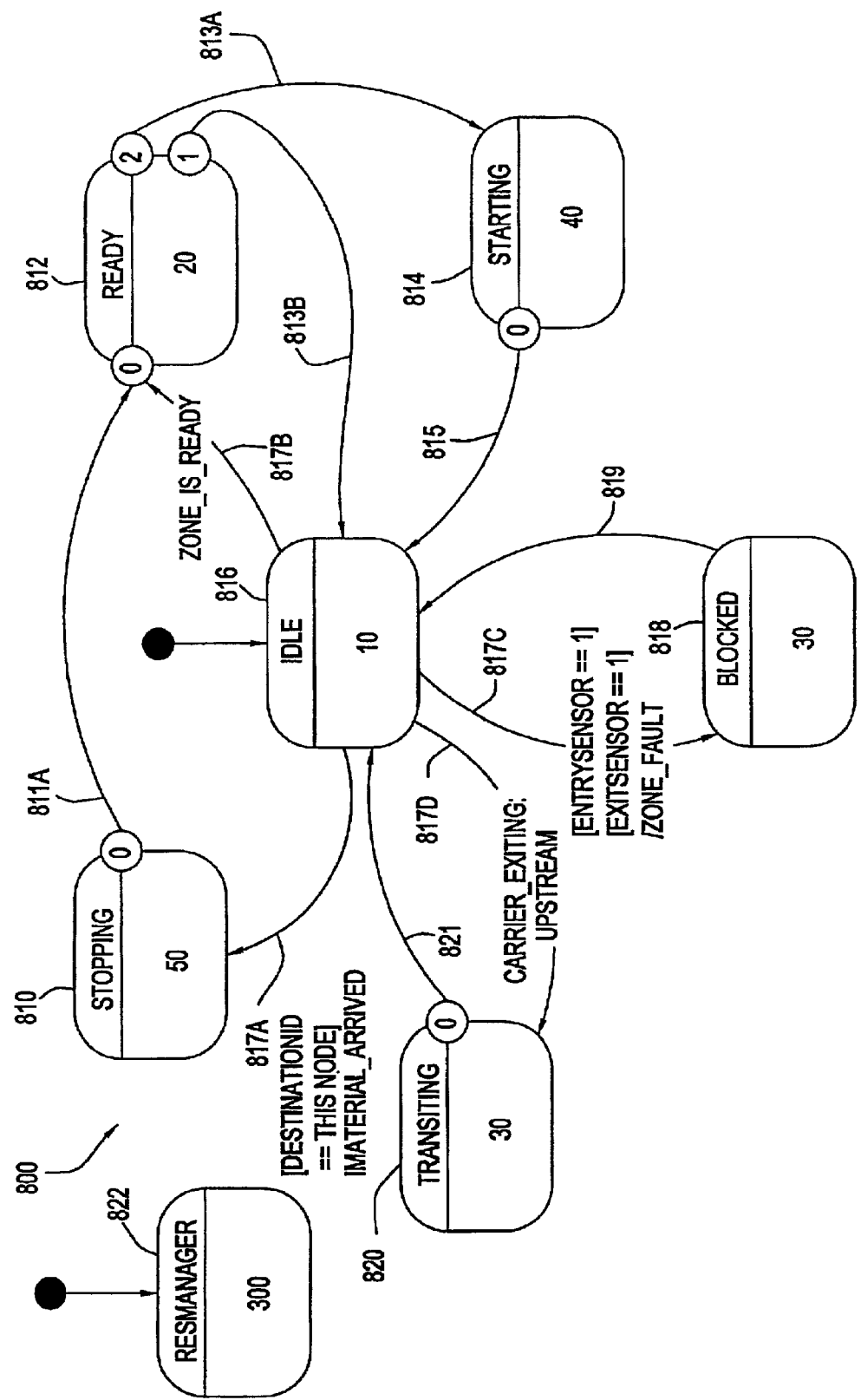
FIG. 30 is a state diagram depicting the zone dynamic model/state machine embodied in the zone thread.

This dynamic model is now described in reference to FIG. 30.

FIG. 30 illustrates using state diagram notation consistent with the UML (Unified Modeling Language) the dynamic model of one embodiment of the present invention. In particular, each zone thread state and its sub-states, or operations, are depicted as a labeled box; e.g., the box labeled "Stopping" in FIG. 30 represents a stopping state of a zone thread and contains the operations, or sub-states, associated with a zone thread whose corresponding zone is occupied by a pod that is stopping at that zone. Each of the states and sub-states corresponds to a series of instructions that carries out the state or sub-state's associated activities. For more information on the UML, refer to: Martin Fowler with Kendall Scott, *UML Distilled*, (1997), which is incorporated herein by reference.

In accordance with the UML, each message/event is shown as a label on an arrow that indicates a transition triggered by the message/event. For example, referring to FIG. 30, the event, "CARRIER_EXITING: Upstream" ("Upstream" being data contained in the message representing an upstream node) causes a transition from the Idle state to the Transiting state. The various events and messages referred to in these figures are described in the Appendices A–C. Internal messages (i.e., messages within a state object, such as the Ready object 812) are those message contained within the boundaries of the object's box.

External messages are coupled out from an object via a port on the periphery of an object's box. For example, the CARRIER_EXITING: Upstream event 817*d* issued by the Idle state/object 816 causes a transition to the Transiting state/object. At least some of these messages have also been described in reference to the command sequences illustrated in FIGS. 17–25. Tests associated with events that could cause transitions are indicated using C language syntax; e.g., the expression "DestinationID==thisNode" 817*a* tests whether the DestinationID of a move equals the ID of the current zone (thisNode).

FIG. 30 is a state diagram depicting the zone dynamic model/state machine embodied in the zone thread. This diagram shows the interactions between superstates with information of each superstate's substates hidden. The states shown include: Stopping 810, Ready 812, Starting 814, Idle 816, Transiting 820 and Blocked 818, which are described above. The ResManager state 822 (short for Reservation Manger) reserves the associated zone for a pod that needs to be transferred from a load port or stocker, via a LPTD, onto the track. The ResManager 822 ensures that there are no pods attempting to transit through the zones where the LPTD will place the material. The zone thread transition 811*a* from the Stopping to the Ready state occurs when the pod has come to a stop fully within the zone. The zone thread transition 813*a* from the Ready state to the Starting state 814 occurs when a pod in that zone begins moving as a result of either a new movement command or a downstream blockage being removed. The zone thread transition 813*b* from the Ready state to the Idle state 814 occurs when the pod is removed from the zone by a LPTD. The zone thread transition 815 from the Starting state to the Idle state 814 occurs when a pod which had been at rest begins moving and exits the zone. The zone thread transition 819 from the Blocked state 818 to the Idle state 814 occurs when a blockage is removed from that zone. The zone thread transition 817*a* from the Idle state 816 to the Stopping state 810 occurs when the material arrives at the zone that is its move destination (DestinationID); a MATERIAL_ARRIVED message accompanies this transition. The zone thread transition 817*b* from the Idle state 816 to the Ready state 812 occurs when an event designated by a ZONE_IS_READY message occurs indicating the zone is reserved. The zone thread transition 817*c* from the Idle state 816 to the Blocked state 818 occurs when either the zone's entry or exit sensor sends a 1, indicating a zone fault; a ZONE_FAULT accompanies this transition. The zone thread transition 817*d* from the Idle state 816 to the Transiting state 820 occurs when a CARRIER_EXITING: Upstream message is received, indicating that the carrier is exiting the zone's immediate upstream zone.

G. Director Operation

The directors determine the route taken by the material in the course of a move that involves a track corner or junction. In contrast, a move object that coordinates a move merely determines whether there is some route between the material source and destination before initiating the move, while each zone thread that effects the move merely accelerates or decelerates the material along a straight line in the material's current direction of travel. In addition to providing important material routing capabilities, a director is also able to dynamically reroute materials based on the failure of zones or load ports in its vicinity.

In one embodiment each director includes a routing table that indicates valid routes and angles of rotation through the director. The routing table is established upon system initialization and is modified by the director upon discovering that some of the initial routes are unavailable due to failure of electromechanical conveyor components or the intelligent drivers that control those components. Descriptions of the routing table and its generation are described below in reference to FIGS. 34 and 35. For the purposes of this discussion it suffices to say that each director, using the routing table, dynamically determines a valid route for each material unit passing through it.

Figure 31:
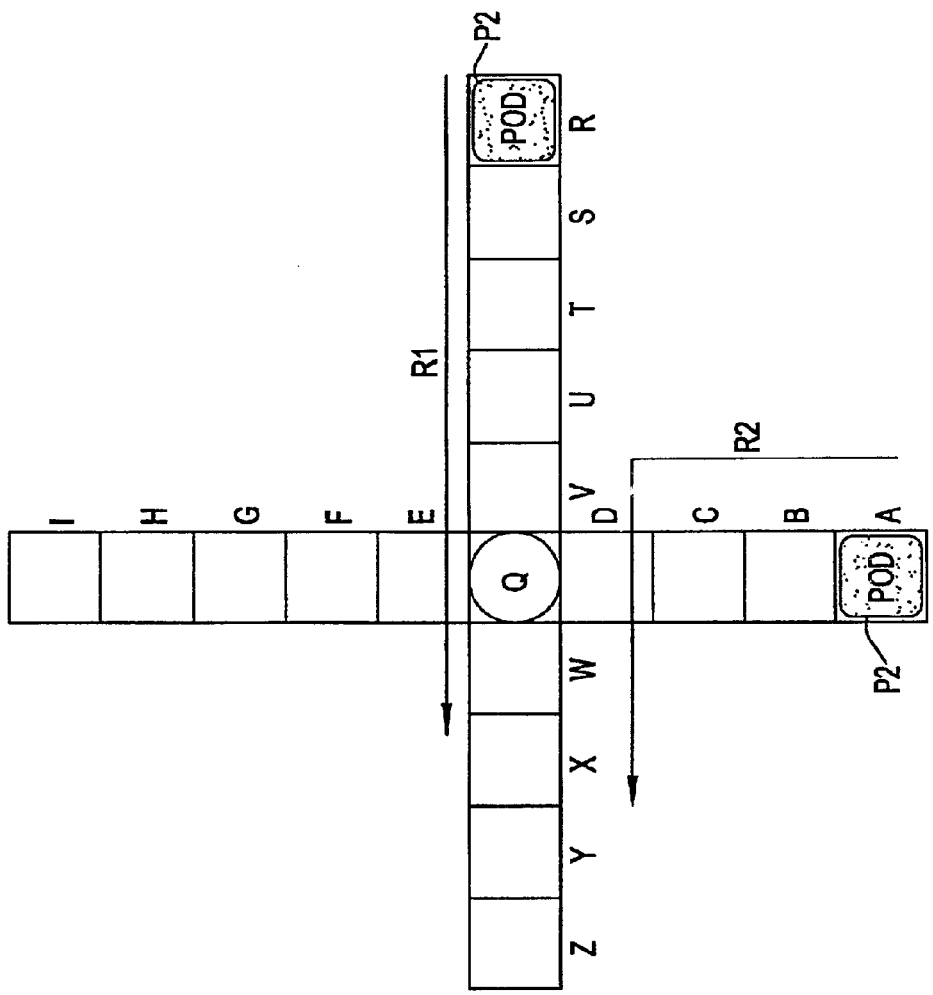
FIG. 31 is a schematic of a region of a transport system including a director Q, two intersecting rails and two material units P1 and P2 that both need to move through the director in the directions R1 and R2, respectively.
Figure 32A:
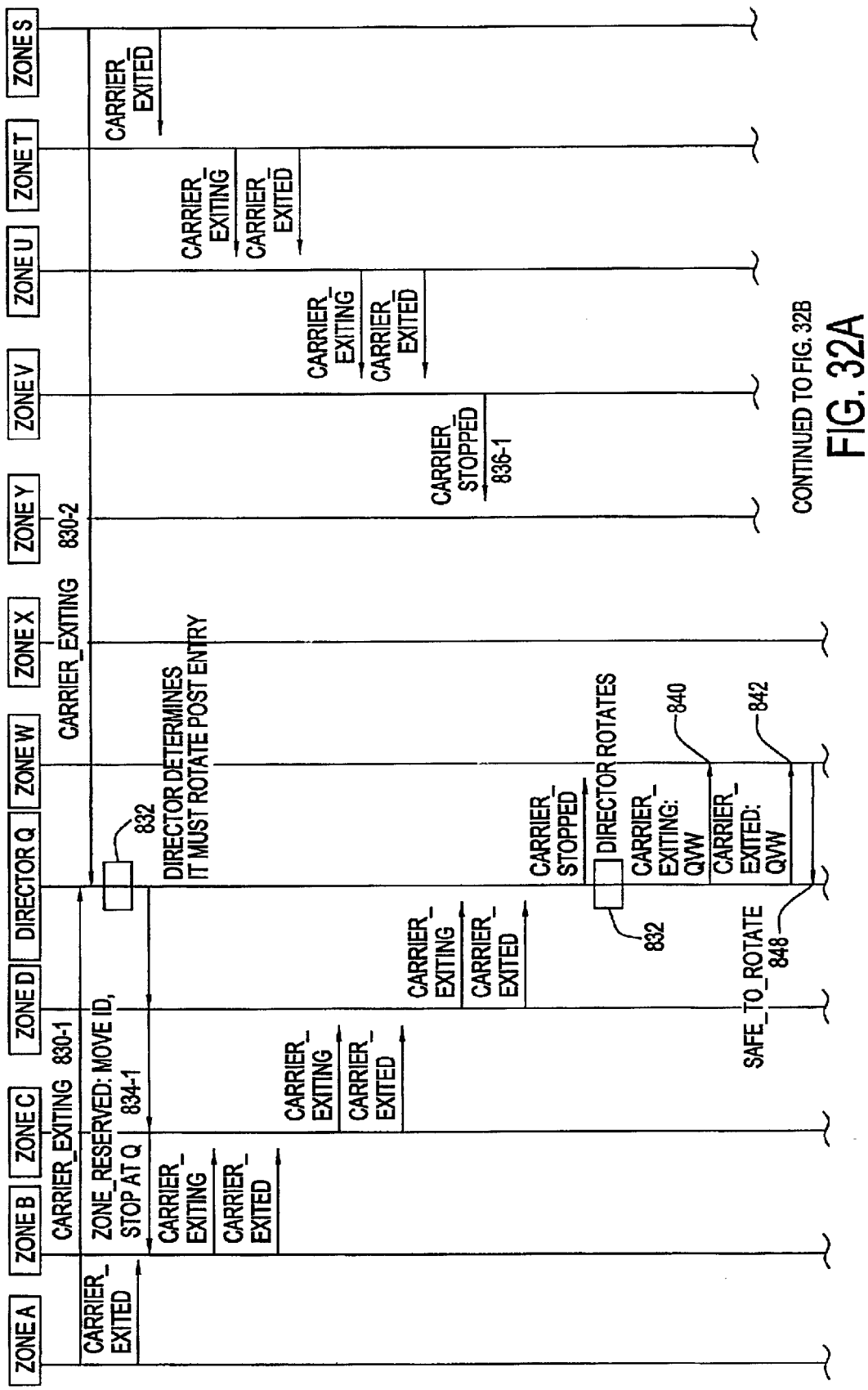
FIG. 32 is a timing diagram showing messages sent between zones and the director for the situation shown in FIG. 31.
Figure 32B:
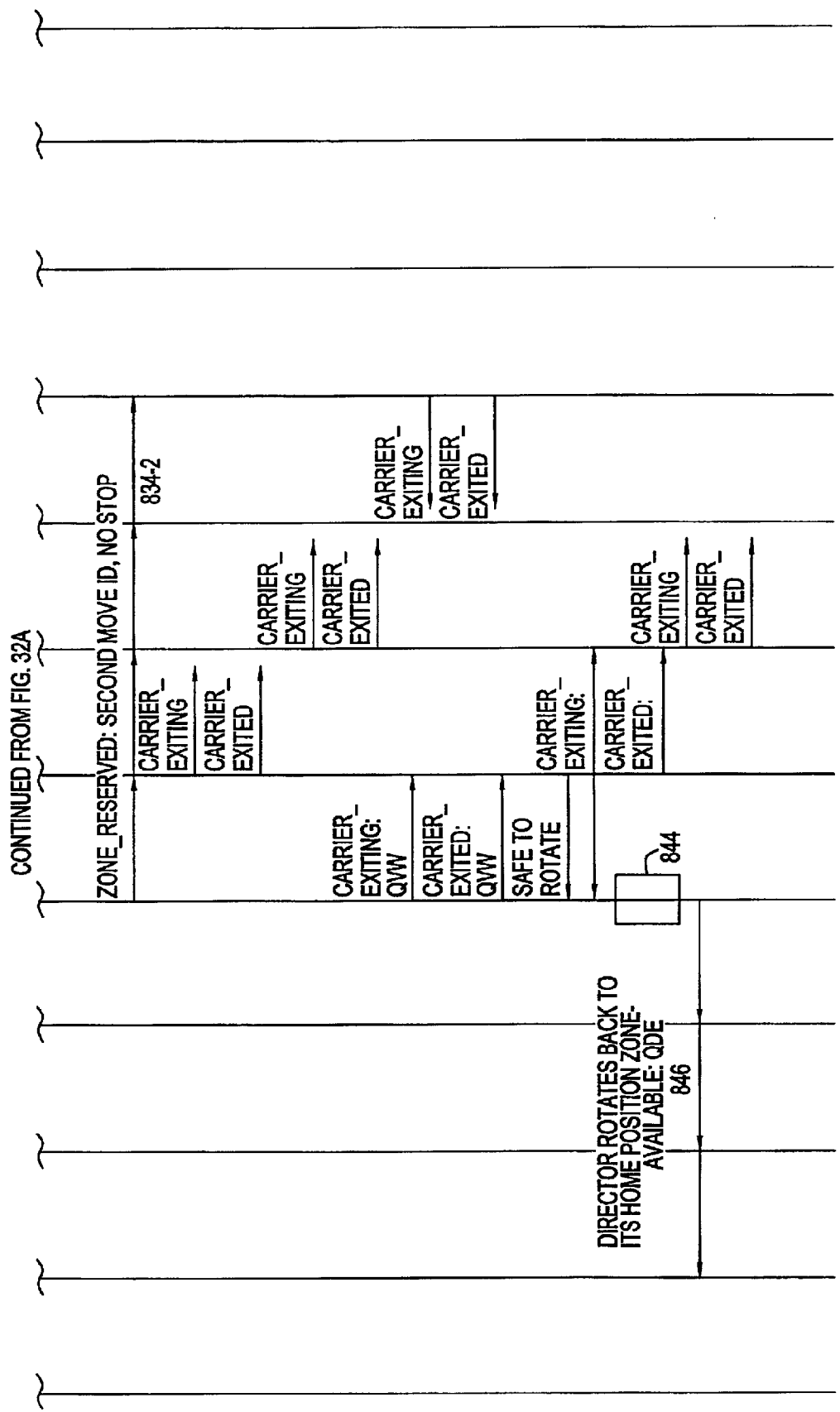

A scenario illustrating the operation of a director is now described in reference to FIGS. 31 and 32. This scenario involves the simultaneous arrival in a director's neighborhood of two material units to be routed through the director. In the illustrated embodiments a director has a larger neighborhood size than a regular zone (e.g., 4 as opposed to 3 zones on either side of the director). The additional zone or zones in the neighborhood allow the director to detect an incoming material unit and decelerate it to zero on the director's upstream zone should the director not be available (assuming that it takes three zones for a material unit to decelerate from top speed to 0). Note that this scenario is merely exemplary and is not to be construed to limit the scope of the present invention.

FIG. 31 shows a schematic of a region of a transport system including a director Q, two intersecting rails, and two material units P1 and P2, both of which need to move in the directions indicated R1, R2. The director has two neighborhoods, Z,Y,X,W,V,U,T,S and A,B,C,D,E,F,G,H. The director sends messages to only one neighborhood at a time. This is indicated on the sequence diagram of FIG. 32 by adding the letters for the neighboring zones on either side of the director to the message name (e.g. CARRIER_EXITED Qvw) indicates the message is sent to the neighborhood Z,Y,X,W,V,U,T,S.

In this case, the material P1 enters the director's sphere of control prior to the material P2. P1 must make a left turn while P2 needs to follow a straight line. The sequence of events, which is shown in FIG. 32, is as follows:

Zone A generates a CARRIER_EXITING message 830-1 for P1. The director receives this message, and determines it must rotate after P1 enters 832.

Zone S generates a CARRIER_EXITING message 830-2 for P2. The director receives this message and places P2 on its service queue 832.

The director sends a ZONE_RESERVED message 834-1 to zones B, C and D to indicate that the pod needs to be decelerated to stop on Q. This message causes the upstream zones B, C, and D to begin decelerating P1.

P1 is decelerated to a stop on the director. Meanwhile, P2 decelerates to a stop on zone V (see CARRIER_STOPPED message 836-1). (This occurs as the director had, as part of initialization, indicated that Qvw was unavailable. This causes any material incoming along R,S,T,U,V to stop prior to the director.)

When the director determines P1 has stopped, it rotates into position to allow P1 to exit onto zone W 838.

When P1 exits the director, a CARRIER_EXITING Qvw message 840 is sent out. Once P1 clears the director, a CARRIER_EXITED Qvw message 842 is sent out. The CARRIER_EXITED message 842 makes the director available for movement from V to W.

Once P1 has exited the director, the director sends a ZONE_RESERVED message 834-2 to zones V, Y and X indicating that the incoming pod P2, and only P2, can pass through the director without stopping (because the route through the director is straight). Zone W sends a SAFE_TO_ROTATE message 848 once the pod has entered zone W.

Once zone V determines that P2 may begin moving (based on the movement rules previously described), P2 will begin accelerating back to full speed, passing from V to Q to W, etc. Once the pod P2 exits the director, the CARRIER_EXITING: Qvw and CARRIER_EXITED: Qvw messages are sent by the director to zone W.

The director receives a SAFE_TO_ROTATE message from the downstream zone indicating the pod has fully exited the director. The director examines its service queue, finds no other material, and rotates back into the home position.

Once the rotation is complete, a ZONE_AVAILABLE message 846 is sent to neighborhood A,B,C,D,E,F,G,H, which signals any incoming material that it may pass from D through Q and onto E.

In addition to the above-described director scenarios, other director scenarios are also possible.

2. Director Clusters

In some cases, multiple directors may be connected directly together, forming a cluster. Director clusters require additional communications to insure that a container can pass through all of the needed directors without creating a deadlock situation. FIGS. 33A–33B show possible director cluster configurations and FIGS. 33C–33D show potential deadlock situations. In FIGS. 33A–33B the directors are labelled A, B, C and D, the allowed entry and exit directions through each director are shown with shaded arrows and some possible paths of material through the cluster are shown with thin, solid arrows.

Note that in this type of director cluster when a material unit needs to make a U-turn the turn involves four directors instead of two. If only two directors were needed for a U-turn it would be possible to create a deadlock with only two material units. By requiring the use of all four directors, deadlocks can only occur when material is present on all four directors. FIGS. 33C–33D show the potential deadlock conditions.

The deadlock in FIG. 33C is caused when material arrives from opposite directions simultaneously and each material unit needs to use more than one director to continue motion (e.g., both material units want to follow a straight path). In FIG. 33D the deadlock would occur if two containers moving south enter the director cluster, where the first is headed west. While these conditions should be rare, the director controller is configured to ensure that these conditions do not occur. One method employed by the director controller to prevent these deadlocks is as follows:

(1) When a director detects an approaching container, it will determine the output direction to be taken.

(2) If that output direction is connected to another director, the first director must send a message to the second director requesting exclusive access.

(3) If the second director cannot immediately grant exclusive access, the first director will not allow the container to enter.

(4) If the second director also determines that the output direction for the container is into another director, it will request exclusive access from the third director before replying to the first director.

(5) The third director may need to request exclusive access to the fourth director as well.

(6) Once the first director receives an access grant from the second, it is guaranteed that any additional directors beyond the second have also granted access.

F. Carrier Routing

The director supports the routing of carriers along multiple, potential paths. The routing mechanisms described below are designed to meet the following goals:

(1) Allow zones to be arbitrarily labeled. The Asyst Automation conveyer system required an addressing scheme which was both complex and difficult to maintain. That addressing scheme mirrored the physical layout and required updates as the conveyer configuration changed. The mechanisms below eliminate these limitations.

(2) Provide for automatic discovery of routes to destinations. The route to any destination in the Asyst Automation conveyer system was implicit by the destination address. Decision points only had to perform a simple numeric comparison to select the direction to route a carrier. However, this required a database within the control system be updated by hand whenever destinations were added. The algorithms below allow the system to update their database automatically.

(3) Provide mechanisms so that when new destination zones or directors are installed, they will automatically integrate themselves with the rest of the system.

Establishing Path Length

The directors in the system which perform routing functions may have more than one path to a destination. In the case of multiple exit directions, the director must have some metric by which the optimal route may be chosen.

To obtain this distance data, the director sends out a PATH_LENGTH message to its immediate downstream neighbor zone in all exit directions. When a normal zone receives the message, it increments a zone count field and forwards the message to its immediate downstream neighbor. Eventually, the message will reach the downstream director, which increments the count and sends the message back to the originating director. This information is added by the originating director to its routing table.

This process is also executed when a ROUTE_CONT message is received from a supervisor or when the application starts up and finds is does not have distance information to its downstream directors. Until a director has received distance information to its downstream directors, it will not generate ROUTE_ANNOUNCE messages.

Route Discovery

A transport system implemented in accordance with the present invention is capable of discovering the route(s) from a load/unload zone to any other load/unload zone in the system. Whenever a load/unload zone becomes active (e.g., the associated node powers up for the first time), the zone announces to the upstream node that it is a destination via a DEST_ANNOUNCE message. If the upstream node is not a director, it propagates the DEST_ANNOUNCE message to its upstream node until a director is reached. Each time this message is propagated back, a zone counter is incremented. The value of the zone counter thus indicates the distance to the load zone from the director.

Upon receipt of a DEST_ANNOUNCE message the director updates its routing table to include the destination. The director then sends a message out to its upstream directors announcing the destination. Eventually this data is propagated through all the directors and returns to the originating director. The originating director does not forward the message. By having the zone messages propagate from node to node up to the director every node that is upstream from the destination is able to determine which destination is closest to it. Thus, any zone can notify its upstream director of what destinations have become unavailable as the result of a fault. (This operation is described in detail below.)

Whenever a director becomes active, it establishes the path lengths to its downstream directors and then collects and propagate routing information. A few examples of how this is done is now described in reference to FIGS. 34–36. Examples of how a director modifes its routing information in the face of failed system components is then described in reference to FIGS. 37–38.

Each of these figures shows a physical layout of generic transport system wherein:

corners are represented as circles labeled "C";

directors are represented as circles labeled "Di" where "i" is an index;

zones are represented by empty boxes or as boxes labeled Zi, where "i" is an index;

a destination load/unload zone is labeled "L/U"; and permitted directions of travel are shown as thin, solid arrows.

Figure 34:
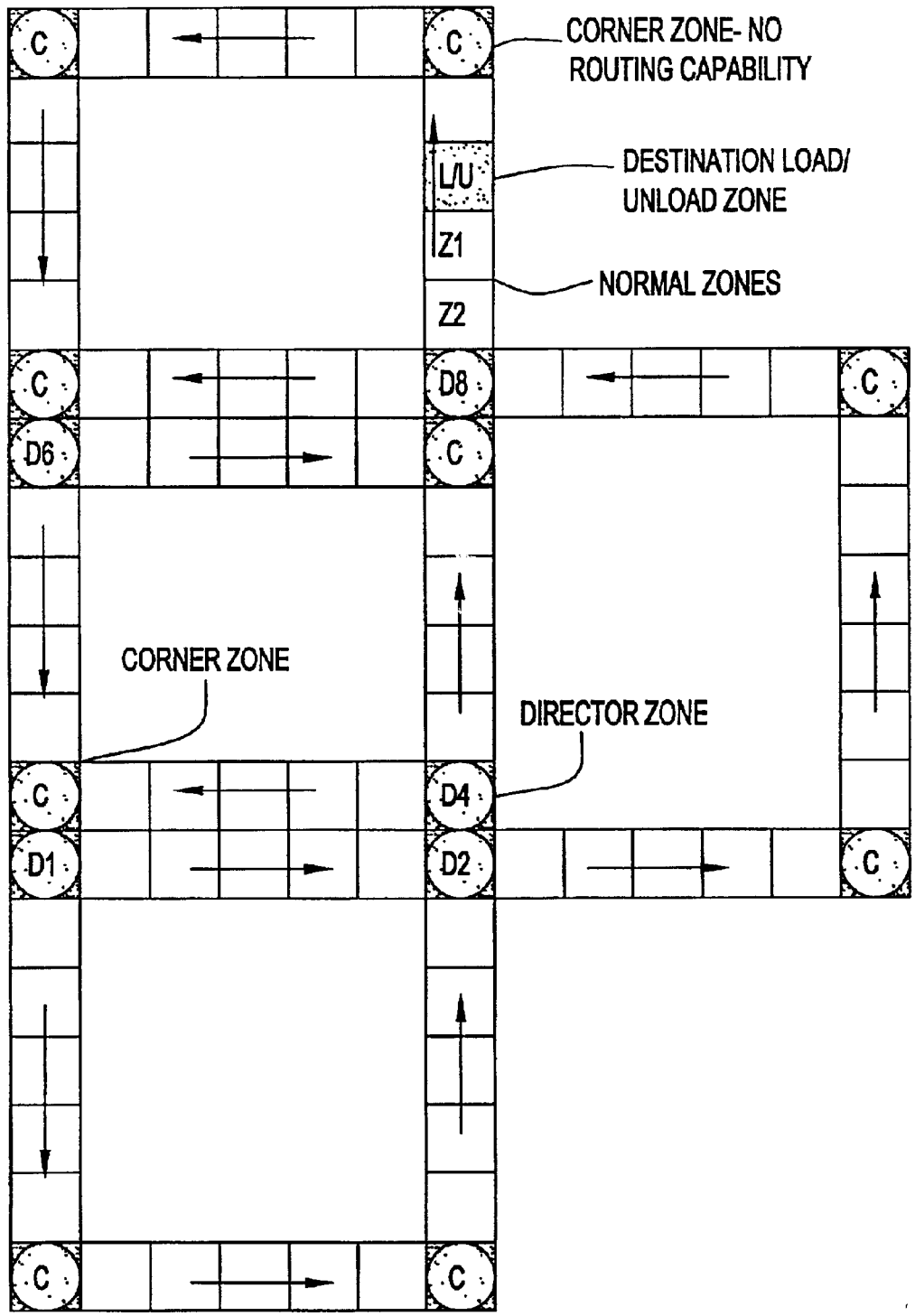
FIG. 34 is a schematic of a region of a transport system to illustrate route discovery principles embodied in the director control threads.
Figure 35:
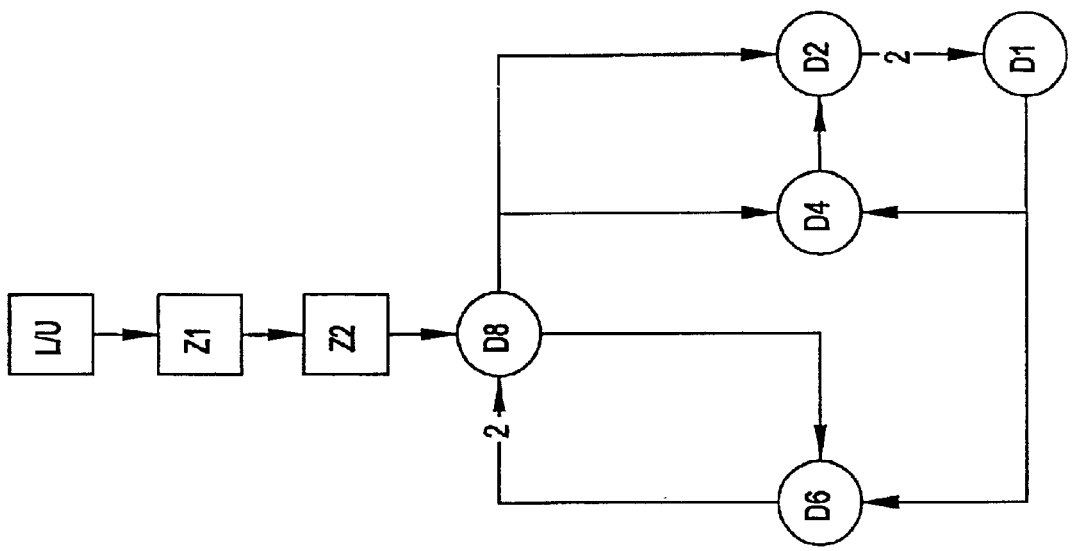
FIG. 35 is a schematic of a region of a transport system to illustrate route discovery principles that account for upstream zone connectivity.

In particular, FIG. 34 shows a physical layout with a single load/unload zone L/U, two upstream zones Z1 and Z2 and several directors D1, D2, D4, D6, D8. Messages used in route discovery generally flow upstream. To better illustrate the flow of these messages FIG. 35 shows the upstream connectively between the elements of FIG. 34 from the point of view of the zone L/U. Given the layout shown in FIG. 34, assume that the zone L/U is powering up for the first time. This zone examines its configuration information and determines that it is a Load/Unload destination. As this is its first power-up, a flag in its non-volatile memory is cleared, indicating that the zone L/U has not yet been registered as a destination.

As a result of the test on the flag, the zone L/U announces itself as a destination. The following messaging will result:

(1) L/U sends a DEST_ANNOUNCE message to its immediate upstream neighbor Z1 with distance 1.

(2) Z1 records the address and distance of L/U. Z1 forwards the DEST_ANNOUNCE message to its immediate upstream neighbor Z2, this time with distance 2.

(3) Z2 records the address and distance of L/U. Z2 forwards the DEST_ANNOUNCE message to its immediate upstream neighbor, D8.

(4) D8 adds L/U to its routing table as a direct route.

(5) D8 then sends a DEST_REGISTERED message back to L/U. L/U receives this information and modifies its registration flag so that on the next application startup it will not send DEST_ANNOUNCE messages. If no DEST_REGISTERED message is received back after a preset time period, the node waits a random time period an send another DEST_ANNOUNCE. This continues until a response is received.

(6) Once D8 has determined the distance to D2, D4, and D6, it sends a ROUTE_ANNOUNCE message to them. The message contains the distance from the direct path summed with the distance to each director. D2, D4, and D6 update their routing tables to include L/U as an indirect route or "via". The exit direction is set based on the director's knowledge of the physical orientation of the connection to D8.

(7) D6 then sends a ROUTE_ANNOUNCE message to the upstream director D8 As D8 has a direct route to L/U, it will discard messages defining a via route.

(8) D4 sends a message to director D2 with the total distance to L/U. D2 determines that the route through D4 takes a different exit direction than the D8 route, and stores the new route in the table.

(9) D2 sends D1 a message as a result of receiving the message from D8, and another as a result of receiving the message from D2. Which is sent first is indeterminate. Upon receipt of the first message, D1 adds two routes (one for each exit direction to D2) with the path length calculated from the message and known distances to D2. When the second message arrives, D1 determines the routes already exist, but recalculates the distances and modifies the table if the new distances are smaller. No messages will be sent out as a result of the second message set.

(10) D1 sends a ROUTE_ANNOUNCE message to D4 and D6. D4 and D6 recognize the new route and store the route in their tables.

(11) D4 sends a route message to D2. D2 determines it already has the route, re-calculates the distances, and modifies its routing table if required. No messages will be sent out as a result of the second message set.

(12) D6 also sends a message to D8 as a result of the route through D1. D8 discards the messages for via routes as it has a direct route.

As a result of these operations the routing tables of the directors D1, D2, D4, D6 and D8 is updated as shown in TABLE 9. In this table the "Destination" column indicates the ID of a route destination that can be reached through a director listed in the "Director" column, the "Route Type" is either "via" (if the destination is reached through another director) or "direct" (if the destination can be reached without going through another director) and the "Director Exit Direction" column gives for each "via" route the director and exit direction through which the route must go and for each "direct" route an exit direction only.

TABLE 9

Routing Information

| Director | Destination | Route Type | Director Exit Direction |
|---|---|---|---|
| D1 | L/U | via | D2: 90o |
|  | L/U | via | D2: 180o |
| D2 | L/U | via | D4: 0o |
|  | L/U | via | D8: 90o |
| D4 | L/U | via | D8: 0o |
|  | L/U | via | D1: 270o |
| D6 | L/U | via | D8: 90o |
|  | L/U | via | D1: 180o |
| D8 | L/U | direct | 0o |

Note that, for any given destination, the number of routes a director will have to that destination is equal to the number of exit paths the director has.

A second scenario exists when a new director is added to the system. This may be the result of the replacement of a failed director, or the addition of a new segment of track. The two cases are handled somewhat differently, and so are described separately.

When an existing director is replaced that director needs to:

Find path lengths.

Cause downstream destinations to announce themselves. This requires a message which is propagated node by node to avoid every destination in the system from re-announcing itself.

Upload all other routes from the downstream directors.

When a new director is added, possibly with a new section of track, in addition to finding path lengths in the manner already described, at least a subset of the routing information stored by the existing directors needs to be updated. An example of rerouting in this situation is now described in reference to FIG. 36.

Figure 36:
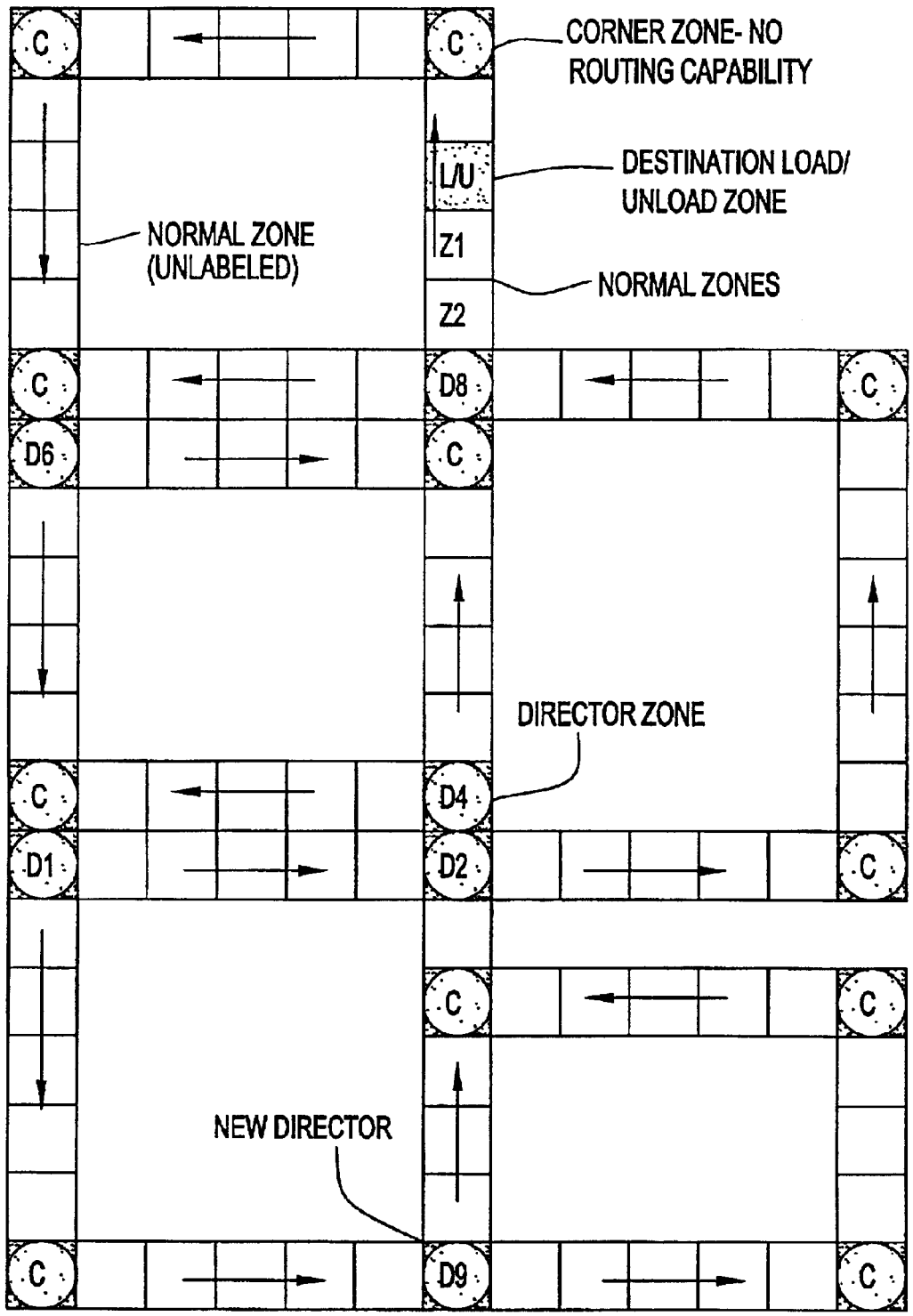
FIG. 36 shows the physical layout of FIG. 34 with the addition of a new director D9 and associated track.

FIG. 36 shows the physical layout of FIG. 34 with the addition of a new director D9 and associated track. As a result of adding the director D9, the director D1 is no longer connected to the director D2 along the 180° route, meaning its routing table is no longer valid. D2's list of upstream directors is also incorrect. Finally, D9 has an empty routing table. One method of handling this change is now described.

Note that in order to mechanically and logically add the new track sections, the director D1 previously needs to be told by its supervisor through a ROUTE_DISCON message to discontinue use of its 180° routes. Once the new track sections are powered up, the director D9 examines its routing table and finds it empty. As a result, the director D9 first establishs path lengths to the director D2 via the 0° and 90° exits. The director D9 then sends its downstream director D2 a ROUTE_TABLE_REQ message. If the director D2 for some reason does not have a routing table when it receives the messages from the director D9, it will not reply. The director D9 will then time-out and send the messages again. This continues until the director D2 sends the director D9 a routing table. (Note that if this entire system were starting up for the first time, the routing table received from D2 would likely be incomplete as all destination zone information would not have propagated through the network. The remaining information would eventually reach D9 as route information propagated through the network). The director D1's list of connected directors must also be updated to include D9. D1 also needs routing table updates for its 180° exit.

Routing Tables

As already described, in the illustrated embodiment each director maintains a routing table it uses to determine the output direction to which a container is to be routed. A routing table contains entries for all local destinations (i.e. those zone which can be reached directly without going through another director) and remote destinations (i.e. zones that can only be reached via other directors). In one embodiment the routing table contains the following information:

The destination.

The exit direction.

Whether the route is direct or a "via".

The route length (this is the number of zones from the current director to the ultimate destination). The route length is more generically a "Goodness Factor" which indicates the relative "goodness" of two routes to a particular destination. The simplest goodness factor is distance, but other algorithms could also be used, such as traffic conditions (i.e., relative speed), etc.

Route Status

The routing data is organized so that all routes for a given destination are contiguous. In one possible organization the direct route is first, followed by the via routes and the via routes are ordered by increasing distance.

Changes in Routing

Beyond the scenarios described above for adding routes, changes in routing can occur due to existing routes becoming temporarily unavailable. A route may become unavailable for the following reasons:

(F1) The destination zone detects a mechanical failure.

(F2) The destination zone's node fails.

(F3) A zone between the upstream director and destination detects a mechanical failure.

(F4) A node between the upstream director and destination's node fails.

(F5) The director upstream from the destination detects a mechanical failure.

(F6) The director upstream from the destination fails.

(F7) A supervisor sends a command to disable a route.

Scenari F7: Supervisor Route Disabling

In scenario (F7), the supervisor responsible for a director notifies the director that a particular set of routes are to be disabled. The supervisor specifies in a PATH_DISCON message the output direction of the director that is to be disabled. All routes associated with that direction then become unavailable. This type of disabling can be done in the course of taking a section of track off-line, possibly in anticipation of maintenance or track modifications.

Scenario F4: Total Node Failure

In scenario (F4), when a node fails (e.g., due to power loss or CPU failure), that node will no longer be able to move carriers or even to communicate its status to its upstream director. This condition needs to be detected by another node. To allow a node to detect the total failure of a downstream node, each node periodically sends a NODE_PING message to its immediate downstream node. If the receiving node does not receive a response to the ping, the sending node assumes the downstream node has failed. The sending node then sends a NODE_FAULT message to its upstream neighbor node, containing the address of the failed node and the closest destination to itself (this tells the director which destinations have become unreachable). This message is propagated back up to the director. The director sends the supervisor a NODE_FAULT message, locates all destinations using the exit direction the fault lies on, and disables the routes to those destinations. Once a node has detected that the downstream node has failed, it continues to attempt to ping the node. For each unsuccessful ping, the node sends another NODE_FAULT message back upstream.

Eventually, the downstream node will respond to the ping message, due either to repair or replacement. The node that originated the ping then sends a NODE_RESTORED message back upstream that will reach the director. If the node was replaced, it announces itself in the manner described above, but the downstream destinations still needs to be added back in. If the node was repaired, it does not announce itself again.

Figure 37:
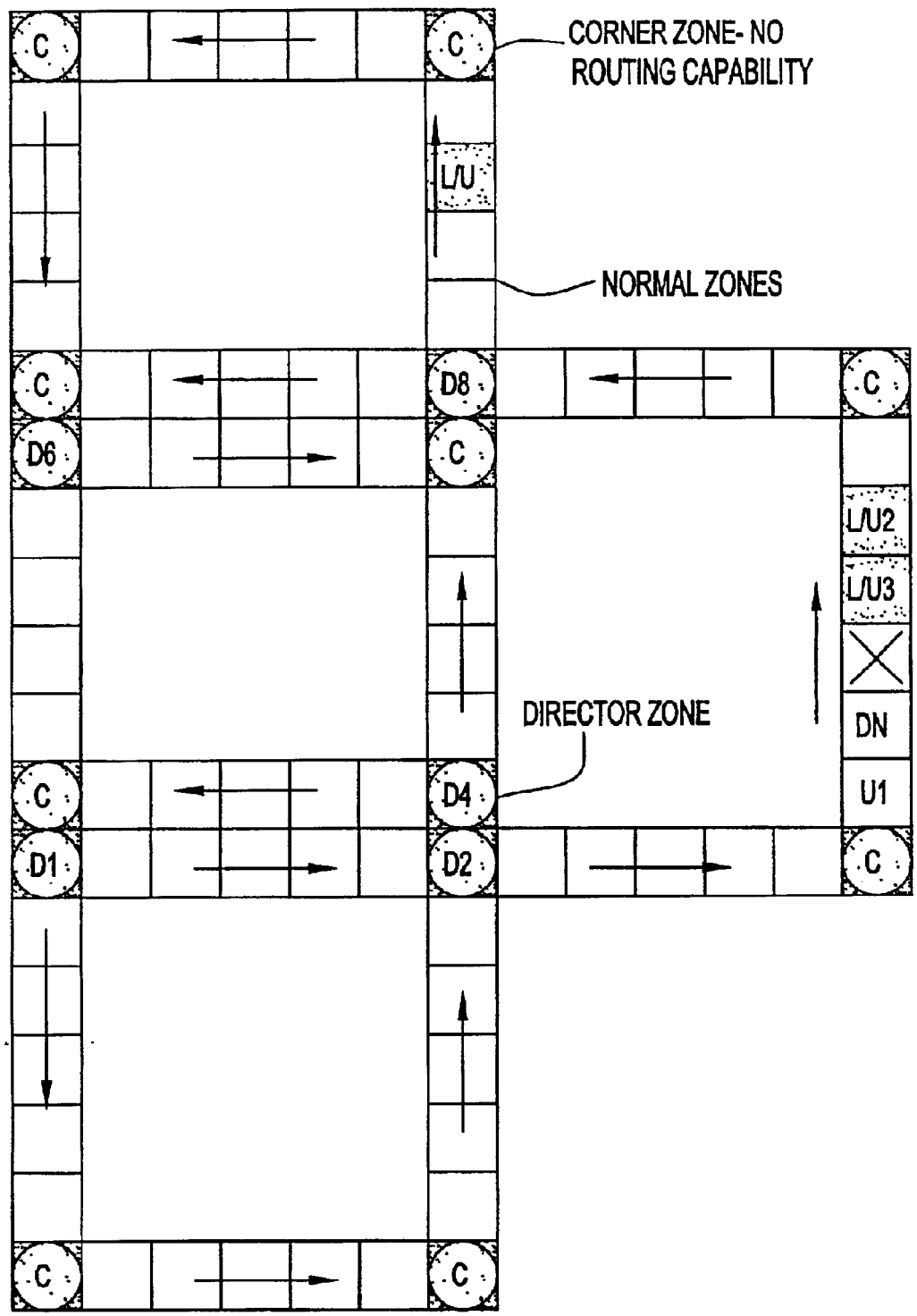
FIG. 37 is a schematic of a region of a transport system to illustrate route discovery principles that account for a failed transport system node.

FIG. 37 shows an exemplary physical layout to illustrate the processing performed by a system process for a failed node (marked "X"). The initial routing information for this layout prior to the node's failure is shown in TABLE 10. The columns in this table are the same as in Table 9, except for the "Final Director" column, which indicates whether the downstream director is the last director before the destination or not.

TABLE 10

Initial Routing Information

| Director | Destination | Route Type | Director Exit Direction | Final Director |
|---|---|---|---|---|
| D1 | L/U1 | via | D2: 90o | F |
|  | L/U1 | via | D2: 180o | T |
|  | L/U2 | via | D2: 90o | T |
|  | L/U2 | via | D2: 180o | T |
|  | L/U3 | via | D2: 90o | T |
|  | L/U3 | via | D2: 180o | T |
| D2 | L/U2 | direct | 90o | — |
|  | L/U3 | direct | 90o | — |
|  | L/U1 | via | D4: 0o | F |
|  | L/U1 | via | D8: 90o | T |
| D4 | L/U1 | via | D8: 0o | T |
|  | L/U1 | via | D1: 270o | F |
|  | L/U2 | via | D8: 0o | F |
|  | L/U2 | via | D1: 270o | F |
|  | L/U3 | via | D8: 0o | F |
|  | L/U3 | via | D1: 270o | F |
| D6 | L/U1 | via | D8: 90o | T |
|  | L/U1 | via | D1: 180o | F |
|  | L/U2 | via | D1: 180o | F |
|  | L/U2 | via | D8: 90o | F |
|  | L/U3 | via | D1: 180o | F |
|  | L/U3 | via | D8: 90o | F |
| D8 | L/U1 | direct | 0o | — |
|  | L/U2 | via | D6: 0o | F |

TABLE 10-continued

Initial Routing Information

| Director | Destination | Route Type | Director Exit Direction | Final Director |
|---|---|---|---|---|
|  | L/U2 | via | D6: 270o | F |
|  | L/U3 | via | D6: 0o | F |
|  | L/U3 | via | D6: 270o | F |

Assume that the node marked with an X has failed. The resultant processing will be:

(1) Node DN sends a NODE_PING to its downstream node and receives no reply.

(2) Node DN sends a NODE_FAILED message to its upstream node. The message contains the failed node's address and the address of L/U3 (information learned when the destinations announced themselves), the closest destination to node DN.

(3) The upstream nodes continue to forward the message until it is received by director D2. D2 finds L/U3 in the routing table and deletes the route along with all other direct destinations (i.e. L/U2) which are further away and accessed via the 90° exit. D2 will then delete the route to L/U1 via D8 at 90 . ROUTE_DISCON messages will be sent to D1 when L/U2 and L/U3 are removed from the routing table. No ROUTE_DISCON message will be sent for the via route to L/U1 as a route to L/U1 still exists via the 0° exit. (In the case of a failed node, the Final Director flag is not used).

(4) D1 will receive the message for discontinuing route L/U2. It will remove both entries for L/U2 from its routing table and send a ROUTE_DISCON message for L/U2 to D4 and D6. Similarly, the routes for L/U3 will deleted and ROUTE_DISCON messages sent to D3.

(5) D4 and D6 will receive the ROUTE_DISCON messages for L/U2 and L/U3 and delete the entries from their routing tables.

(6) D4 will send ROUTE_DISCON messages to D6 and D8. D6 will discard the messages as the routes are not found in its table (having already been deleted). D6 will not forward any messages. D8 will delete the routes from its table and send messages to D6 and D4. Both will discard the messages.

(7) D6 will also send ROUTE_DISCON messages to D8. D8 will discard these messages as the routes will no longer exist.

Following this processing, the routing information stored by the directors will be as shown in TABLE 11. The columns in this table are the same as in Table 9.

TABLE 11

Final Routing Information

| Director | Destination | Route Type | Director Exit Direction |
|---|---|---|---|
| D1 | L/U1 | via | D2: 90o |
|  | L/U1 | via | D2: 180o |
| D2 | L/U1 | via | D4: 0o |
| D4 | L/U1 | via | D8: 0o |
|  | L/U1 | via | D1: 270o |

TABLE 11-continued

Final Routing Information

| Director | Destination | Route Type | Director Exit Direction |
|---|---|---|---|
| D6 | L/U1 | via | D8: 90o |
|  | L/U1 | via | D1: 180o |
| D8 | L/U1 | direct | 0o |

Scenario F2: Zone Mechanical Failure

If a zone encounters a mechanical failure that curtails carrier movement, the zone notifies the upstream node of the failure and of the closest downstream destination address with a ZONE_FAULT message. The message is propagated back to the upstream director. The director uses the destination address from the ZONE_FAULT message to mark the routes to that destination and all destinations beyond as unavailable. The director then sends a ROUTE_DISCON message to its upstream directors for each route which has become unavailable.

Scenario F5/F6: Director Failure Processing

Figure 38:
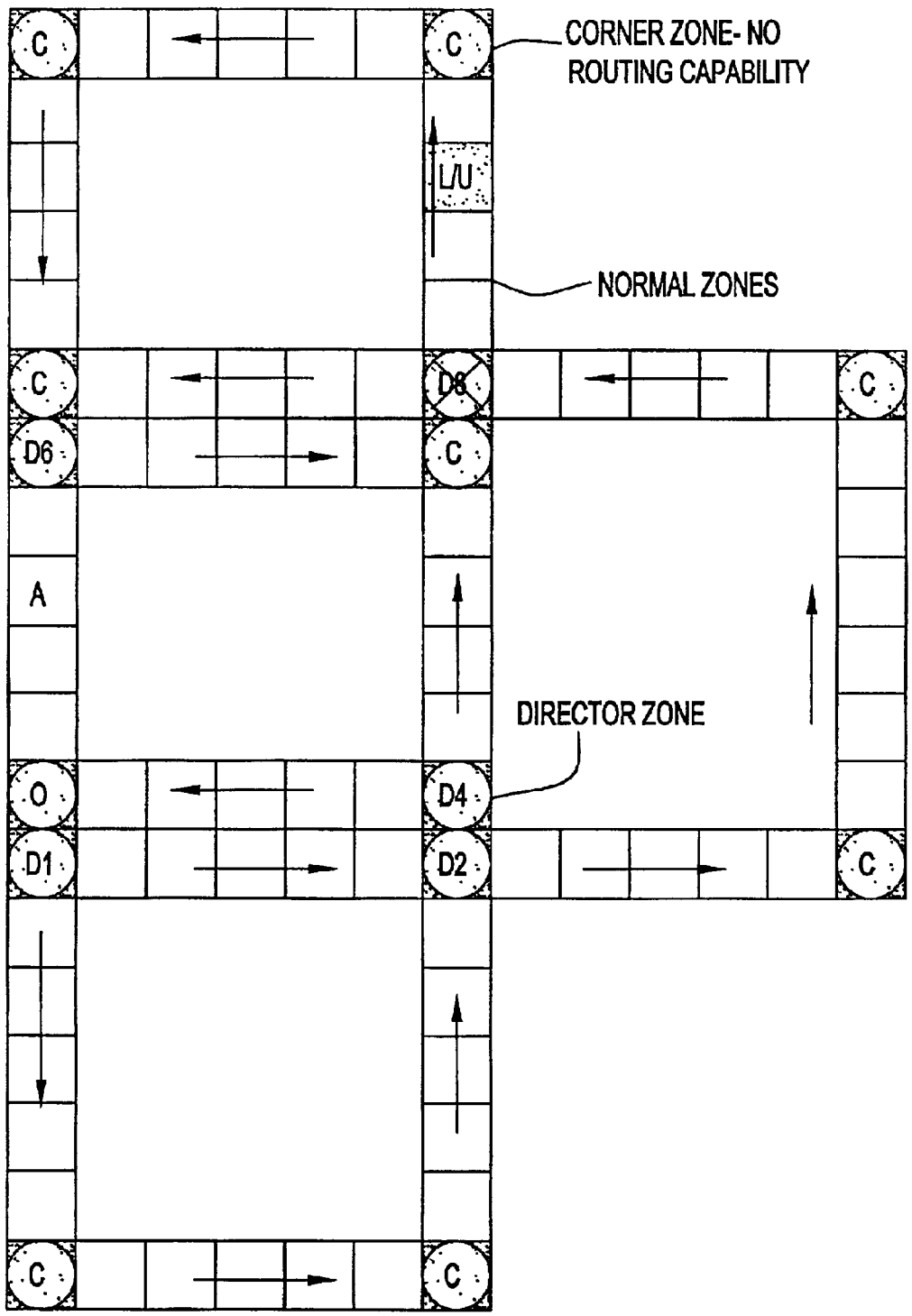
FIG. 38 is a schematic of a region of a transport system to illustrate route discovery principles that account for a failed director.

The following example describes in reference to FIG. 38 the processing that occurs when a director fails. In this example the director D8 has failed. The initial routing for this layout prior to the failure is the same as shown in TABLE 5. The system performs the following processing in this case:

(1) When the director D8 fails, it will no longer respond to NODE_PING messages.

(2) A NODE_FAILED message will be propagated from the upstream corner zone to D6, and D4. This information will also be propagated back to D2 via the nodes along its 90° path.

(3) When the director D2 is notified, it will search its routing table for routes through D8, and will find a route to A and L/U1. The route to A via D8 will be deleted from its routing table. As another route exists to A, it will not send a ROUTE_DISCON message. It will examine the L/U1 route through D8. As the route has the final director flagged marked, the D8 failure effectively terminates all routes. D2 will delete both routes to L/U1 and send a ROUTE_DISCON message to upstream director D1.

(4) D1 will receive the ROUTE_DISCON message for L/U1 and delete both routes in its routing table. As all routes are being deleted, it will send a ROUTE_DISCON message to upstream directors D4 and D6.

(5) D6 will receive a NODE_FAULT message from its upstream node as well as a ROUTE_DISCON message from D1. If it receives the NODE_FAULT message first, it will delete both routes (as the D8 route has the final director flag set), and not send out any ROUTE_DISCON messages (as the upstream director is the one which failed). If it receives the ROUTE_DISCON message first, it will delete both routes (without examining the final director flag), and determine it does not need to send ROUTE_DISCON messages as the upstream director is the one which failed. When the second message comes in the routes will have already been deleted and no processing will occur.

(6) D4 will also receive a NODE_FAULT message from its upstream node. It will locate the route to L/U1 via D8 and check the final director flag. Based on the flag, the node will delete both routes to L/U1 and send a ROUTE_DISCON message to upstream director D2. It will also delete the route to A via D8.

(7) If D2 has not already deleted its routes to L/U1, the ROUTE_DISCON message from D4 will cause them to be deleted.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX A

External Events
Transport System External Events

| Event | Source | Dest | Description |
|---|---|---|---|
| CARRIER_INSTALLED | Transport Controller | CIM | Sent by Transport Controller when material has been transferred from the Load Port onto the rail. Defined by the Intrabay SEM. |
| CARRIER_REMOVED | Transport Controller | CIM | Sent by the Transport Controller when material has been transferred from the rail to the Load Port. Defined by the Intrabay SEM. |
| HOST_COMMAND | CIM | Transport Controller | This event is sent from the CIM system to initiate a material movement command. Possible command values are: TRANSFER |
| HOST_COMMAND_INITIATED | Transport Controller | CIM | Response to the HOST_COMMAND message indicating the Transport Contoller has received, and is acting on, the command |
| REMOTE_COMMAND_SEND | Transport Controller | CIM | Intrabay SEM defined message. These messages are sent upon state transitions in a movement state machine. |
| HOST_COMMAND_COMPLETE | Transport Controller | CIM | Sent when a previously received HOST_COMMAND completes. |
| Event Report Send | Transport Controller | CIM | Sent by the Transport to indicate initiation and completion of atomic operations. Possible events include: Acquiring, Acquired, Moving, Moved, Depositing, Deposit Complete, Carrier Installed, Carrier Removed. |

APPENDIX B

Intra-CLC Events

| Event | Source | Dest | Multi or Point Cast | Description |
|---|---|---|---|---|
| ACQUIRE_MATERIAL | LAC thread | LPTD thread | Point | This event is sent by the LAC thread to instruct the LPTD thread to begin the process of transferring material from the specified load port to the specified load point. Information in the message: Source LAC address Load Port ID (or LPTD position[1]) Load Point ID (or LPTD position[2]) |
| ALARM | | | Multi | An alarm event is generated to notify another system of a fault. An ALARM event contains the following information: Alarm Instance Major Alarm Code Minor Alarm Code Response Options: Abort Retry Ignore No Response Alarm Specific Information |
| ALARM_RESPONSE | | | | This event is generated is response to an alarm which requires a response. The event will contain the following information: Alarm Instance Response Option: Abort Retry Ignore Movement direction |
| CARRIER_EXITED | Zone thread | neighbor Zone threads, LAC thread | Multi | Event tells other zones that the container has exited the current zone and should now be in the downstream zone. Information in message: Source Zone Address Container Identifier |
| CARRIER_EXITING | Zone Thread | neighbor Zone threads | Multi | Event announces that the container in the current zone has begun to exit the current zone. The appropriate downstream nodes are expected to begin profile following upon receipt. Information in message: Source Zone Address Container Destination Zone Address Internal Material ID Velocity Profile |
| CARRIER_REMOVED | Zone Thread | neighbor Zone threads | Multi | This event is sent by the current zone when material has been removed from the rail. This tells the neighbor zones to remove the carrier from its tracking table and to update its speed control table based upon the speed defined in the message Information in the message: Source Zone Address Internal Material ID Zone Max Speed Note that the zone max speed field could be used to indicate that while the material has been removed, the zone is still unavailable. |
| CARRIER_STOPPED | Zone thread | neighbor Zone threads | Multi | This event indicates that material has decelerated to a stop on the zone which initiated the message. The message may be used to stop any inter zone timing or to update speed tables. Information in the message Source Zone Address Internal Material ID |
| DELIVER_MATERIAL | LAC | LPTD | | This event is generated to the LPTD control thread to instruct it to move a pod from the rail to the load port. The event will contain the following information: Internal Movement ID Load Port Identifier Material Location Identifier |
| DEPOSIT_MATERIAL | R.C. | S.C. | | This event is generated to instruct the shuttle to deposit its material onto the rail. |
| DEST_ANNOUNCE | destination zone | any zone | | This message is sent by a zone which has been configured as a destination. The message will be sent to the zone immediately upstream, and will be forwarded zone to zone until it reaches a director. |

APPENDIX B-continued

Intra-CLC Events

| Event | Source | Dest | Multi or Point Cast | Description |
|---|---|---|---|---|
| | | | | The message must contain the address of the destination zone which originally sent the message, and a count field which each zone may increment. |
| | | | | If the zone does not receive a response within a defined time period, it will wait a random time period and then re-send the message. |
| DEST_REGISTERED | director | destination zone | | This message will be sent by a director to a destination zone when it receives the destination announcement message. The message tells the destination zone that it has been registered in the director's routing table. |
| FREE_LPTD | LAC | LPTD | | This event is generated once a transfer involving a LPTD has completed, signalling the LPTD control thread that the mechanism is now available for use by others. |
| FREE_ZONE | LAC | Zone thread | Point | This event is sent to instruct a zone to mark itself as free. |
| LPTD_NOT_RESERVED | LPTD thread | LAC thread | Point | This event is generated by the LPTD thread to indicate that the LPTD cannot be reserved by the requester. |
| LPTD_RESERVED MATERIAL_ACQUIRED | LPTD thread | LAC thread | Point | This event is sent once the LPTD thread has completed the transfer of material to the rail. |
| MATERIAL_ARRIVED | Zone thread or LAC thread | TC or RC | | This event is generated to inform the Transport Controller that material has arrived at its designated pre-load zone. Information in the event: Internal Material ID Destination Address The event is generated by a zone thread to the TC for a Track Arrival, and by an LAC thread to a SC for a delivery. |
| MATERIAL_DELIVERED | LPTD | LAC | | This event is generated once LPTD has successfully delivered the material to the load port. |
| MATERIAL_NOT_DELIVERED | LPTD | LAC | | This event is sent to indicate that a DELIVER_MATERIAL command did not complete successfully. |
| MATERIAL_MOVED | S.C. | R.C. | | This event will be sent upon successful completion of a move. For material acquisition, the event signifies that the material is now at the rail end of the shuttle with the shuttle in the up position. |
| MATERIAL_NOT_SENT | Load Area Controller thread | S.C. | Point | This event is sent by the Rail Controller if it fails to initiate the movement of the material from the current zone to its destination. The event will contain: Source Zone Address Internal Material Identification Error Code |
| MATERIAL_SENT | Load Area Controller thread | S.C. | Point | This event is sent by the Rail Controller to indicate is has successfully sent the material toward its destination. The event may be sent as soon as the carrier trips the end of rail sensor. The event will contain: Source Zone Address Internal Material ID |
| MOVE_STATUS_UPDATE | S.C. LAC thread | T.C. | | This event is sent to the T.C. to provide an update on the status of a particular movement. The event will contain: Sender Address Internal Material Identifier Status |
| NODE_FAULT | Any node | Immediate Upstream Node | | A node will send this message to its immediate upstream node (until received by a director) to indicate that a node has failed. The message will contain the address of the failed node, and the closest downstream destination to the node which reported the failure. |
| PATH_LENGTH | any | any | | A director will send this message to its immediate, downstream neighbor zones. The message will be forwarded from zone to zone until it reaches the next director. Each zone will increment a path length as it forwards the message. The receiving director will also increment the count and sent the message back to the originating director. |
| POSITION_TO | LAC thread | Upstream and Downsteam Load Zone threads | Point | The LAC sends this event to instruct the two zones to move the pod from the load point to the downstream load zone such that both sensors detect the pod. |

APPENDIX B-continued

Intra-CLC Events

| Event | Source | Dest | Multi or Point Cast | Description |
|---|---|---|---|---|
| POSITIONED_TO | Zone threads | LAC thread | Point | The zone sends this event once it has completed positioning. |
| RESERVE_LPTD | LAC thread | LPTD thread | Point | This event is sent by the LAC to attempt to reserve the LPTD for a material transfer. This event is included in case the LPTD may service multiple load ports and therefore be potentially requested by more than one LPTD. |
| RESERVE_ZONE | LAC thread | Zone thread | | This event is generated by a Rail Controller to cause a zone to be reserved. The event is generated by a Load Area Controller process. If the zone is under the control of the same RC as the LAC, the communication is inter-process. If the zone is under the control of a different RC as the LAC, then the communication is inter-processor. |
| ROUTE_ANNOUNCE | director | director | | After a director receives a new destination announcement and has updated its own routing table, it will send this message out to its upstream directors. A message will not be sent if the route already existed in the routing table. |
| ROUTE_CONT | Transport Controller | director | | This message will be sent to mark a director's previously deactivated exit path as again active. |
| ROUTE_DISCON | Transport Controller | director | | This message will be sent from a Transport Controller to a director to mark a director's exit path as unavailable. |
| ROUTE_TABLE | director | director | | This message is sent from a director to an upstream director identified in the ROUTE_TABLE_REQ message. The message will contain the complete routing table for the sending director. |
| ROUTE_TABLE_REQ | director | director | | This message is sent from a director to its downstream directors to request that those directors send their routing tables. If no response is received to the message after a defined time period, the director shall wait a random time period and re-send the message. |
| SEND_MATERIAL | LAC | Zone | Point | This event is sent by an to instruct the zone in which a pod resides to begin movement. The event will contain: Internal Movement ID Destination Address Movement Direction (left or right) |
| SET_PARAMETER | Transport Controller | Controller | | Command from Transport Controller to controller to replace a controller's current setup parameter with a new value. Parameter names which did not exist in the controller will be added. Parameter names which exist will have their values changed. Existing parameter names which have NULL new values will be removed from the controller. |
| SHUTDOWN_CMD | Transport Controller | Controllers | | Event tells all controllers to immediately decelerate all containers to zero speed. |
| SHUTDOWN_STATUS | Controller | Transport Controller | | Event provides status information on the controller's shutdown process. |
| ZONE_AVAILABLE | Zone thread | neighbor Zone threads, LAC thread | Multi | A zone thread sends this message to announce its availability and maximum entry speed to the neighborhood. If the zone had a pod on it, this event instructs the receivers to delete the pod from their database. |
| ZONE_FAULT | Any zone thread | Immediate Upstream Node | | A node will send this message to its upstream node upon detection of a failure condition with the node. The message will be forwarded up to the director. The message will contain a fault code, the address of the failed node and the closest downstream destination to that node. (this message may have identical implementation to the NODE_FAULT message) |
| ZONE_IS_SAFE_NOTIFICATION | Zone thread | LAC thread | Point | This event is sent in response to a NOTIFY_WHEN_SAFE_REQ event once the zone has determined it is 'safe'. |
| ZONE_RESERVED | Cur. Zone thread | Neighbor Zone threads, LAC thread | Multi | This event is generated by a zone to announce that it has been reserved. The event will contain: Source Zone Address |

[1]The position could be a simple numeric value which the LPTD understands to imply a physical location. In this way both load port and rail positions may be specified by integers 1, 2, 3, etc.
[2]The position could be a simple numeric value which the LPTD understands to imply a physical location. In this way both load port and rail positions may be specified by integers 1, 2, 3, etc.

APPENDIX C: Local CAN Bus Messages

The following abbreviations are used in the following descriptions of representative Local CAN Bus Messages/Events:

ZC Zone Controller
AC Axis Controller
IC ID Controller
HC (E23) Handshake Controller
XC SECS Controller
TC Transport Controller These descriptions are subdivided into four types of messages/events: Generic Messages/Events, Zone Controller Messages/Events, Handshake Controller Messages/Events and Axis Controller Messages/Events.

1. Generic Messages/Events

1.1 ACK

An ACK message is sent by an intelligent driver board in response to commands that require an acknowledgement; e.g. a SET_PROFILE command that contains an Execute ID.

1.2 ALARM

Alarm messages will contain a major code, minor code, and optional explanatory data fields. The major code is a system wide, 16-bit value. The minor code is unique within the major code only, and so can be represented by an 8-bit value. The optional data fields will vary based on the specific alarm.

1.3 CONTROLLER_STATUS_REQUEST

A CONTROLLER_STATUS_REQUEST command is sent to query a controller on its current status. The controller responds with a status message that is defined in the section for each individual controller; e.g. a zone controller responds with a ZONE_STATUS message.

1.4 FORCE_RESET

A FORCE_RESET command is sent to force a controller to reboot. The data pertaining to the force reset command will determine if the controller will reset using default values or not; i.e. those control parameters that are stored in non-volatile memory, especially its CAN bus address.

1.5 GET_PARAMETER

The GET_PARAMETER message is sent by the CLC to read the various control parameters stored by an Intelligent Driver; e.g. a driver board's CAN bus address. Parameters that can be read via this command depend on the controller board type. The parameter to be read is identified by a unique 2-byte number. This number is given in the first two data bytes, which corresponds to the values used with the SET_PARAMETER command. Intelligent driver's check the validity of the parameter ID and will respond with an ALARM message if the Parameter ID value is not appropriate for the controller.

1.6 I_AM_ALIVE

The I_AM_ALIVE message is sent whenever an intelligent driver board has completed its initialization after a bootstrap operation or in response to a PING or FORCE_RESET message. Bootstraps may be due to a power on reset, a manual reset, a watchdog timer reset, or a forced reset due to a command. The watchdog timeout is 630 milliseconds for a zone controller board.

1.7 PARAMETER_RESPONSE

A PARAMETER_RESPONSE message is sent by a controller in response to a previous GET_PARAMETER command from the CLC. The parameter being returned is identified by a unique 2 byte number given in the first 2 data bytes. The current value of the parameter is given in the following six bytes. Values that are less than 6 bytes are returned in the least significant bytes. ASCII data may be returned in the message. Up to 6 ASCII characters may be returned. If less than 6 characters are returned, the string shall be null terminated. If 6 characteres are returned, the calling application is responsible for null terminating the string. The Parameter ID values are the same as those given in the SET_PARAMETER command.

1.8 PING

The PING message is sent by the CLC to quickly query for the existence of an intelligent driver board with a given network address. If the driver board exists and is functioning, it will respond with an I_AM_ALIVE message.

1.9 SELF_TEST

The SELF_TEST message is sent by the CLC to force an intelligent driver board to execute its built-in diagnostic functions. Self-tests are performed as part of the system installation process, during maintenance, or during trouble shooting sessions with the system off-line. These tests generally take a significant amount of time (from a computer's point of view) and vary in length depending on the board type being tested. The SELF_TEST message includes 6 parameters whose meaning varies depending on the test. Unused parameters are sent anyway so the message always has 8 bytes of data.

1.10 SELF_TEST_RESULTS

A SELF_TEST_RESULTS message is sent by an intelligent driver board in response to a SELF_TEST message.

1.11 SENSOR_STATUS

SENSOR_STATUS is sent by a controller in response to a SENSOR_STATUS_REQUEST command. Additionally, most controllers automatically generate these messages when certain of their sensors change states. For example, a zone controller generates one of these messages whenever either a left or right sensor changes state.

1.12 SENSOR_STATUS_REQUEST

This command is sent to query a controller on the current state of one of its sensors. The controller responds with a SENSOR_STATUS message.

1.13 SET_PARAMETER

The SET_PARAMETER message is sent by the CLC to set or reset various control parameters for an Intelligent Driver, e.g. a driver board's CAN bus address. Parameters that can be set via this command depend on the controller board type. Most of these parameters are stored in a controller's non-volatile memory. The parameter to be set is identified by a unique 2 byte number given in the first 2 data bytes and the value to be set is given in the following six bytes. Intelligent drivers check the validity of the parameter where appropriate and may respond with an ALARM message if a) the Parameter ID value is not appropriate for the controller or b) the parameter value is out of range.

2. Zone Controller Messages

2.1 EXECUTE

The EXECUTE message tells a zone controller which of up to two possible motor profiles to execute. All pending profiles are flushed from the zone controller's queue. This command is used to synchronize multiple zone controllers so they are all running the same profile at the same speed.

EXECUTE commands are addressed to a set of zone controllers by incorporating the Execute ID number that was previously sent in a SET_PROFILE command in the Destination address portion of the EXECUTE message header.

2.2 EMERGENCY_DECEL

The EMERGENCY_DECEL message decelerates the motor as quickly as possible from its current speed to a smooth stop. This is accomplished by decelerating the motor at 3 times its normal speed.

2.3 FLUSH_QUEUE

The FLUSH_QUEUE command is used to delete all existing SET_PROFILE commands (including those that are waiting for an EXECUTE command) from the zone controller's command queue. Whatever profile is currently running will continue to run; only those profiles that have not been executed yet are deleted. The CLC cannot use this command to stop the motor. If there are no profiles waiting to be executed then this command has no effect.

2.4 MOTOR_IS_OFF

A MOTOR_IS_OFF message is sent to the CLC whenever either the motor is stopped or the motor is turned off (freewheels, no holding current). This message normally indicates the completion of a MOTOR_OFF command. This message is sent under the following conditions:

In response to a MOTOR_OFF command.

Motor has been decelerated to 0.

Motor has been stopped due to the Motor Stop profile.

2.5 MOTOR_OFF

The MOTOR_OFF command stops whatever profile may currently be running, flushes any queued profiles, and lets the motor freewheel (i.e. there is no current going to the motor). This command executes as soon as it is received. If the command should execute after the completion of existing profiles then a SET_PROFILE command specifying the Motor Stop profile should be sent instead.

A MOTOR_IS_OFF message is sent after this command has been executed.

2.6 MOVE_N

The MOVE_N message directs a zone controller board to move the motor a specified number of tenths of millimeters. This message is used to precisely position a pod; usually to place it in front of a Load Port that is positioned across two zones.

2.7 MOVE_N_DONE

The MOVE_N_DONE message is sent by a zone controller when it has completed a MOVE_N operation.

2.8 POSITION_REQUEST

The POSITION_REQUEST command is used to get the current position of a pod in a zone relative to the last transition of any one of the zone's sensors. The controller responds with a POSITION_RESPONSE message.

2.9 POSITION_RESPONSE

The POSITION_RESPONSE message is sent as a result of a previous POSITION_REQUEST command. The data fields in the response give the current position of a pod relative to the last transition of whichever sensor (i.e. either the left or right sensor) changed most recently. Position is given as an integer value in 10ths of a millimeter. If the pod is moving left in the zone then the value will be negative.

2.10 ROTATION_UPDATE

ROTATION_UPDATE messages are sent whenever a zone controller's wheel has rotated by the amount specified in a previous SET_PARAMETER message. Zone controllers have a default value corresponding to once every 5 centimeters. If the motor is stopped these messages also stop.

Note that a zone controller sends an ALARM message if the wheel stops rotating or fails to rotate at the expected rate based on the speed the zone controller has commanded.

2.11 SET_CONSTANT_SPEED

The SET_CONSTANT_SPEED command tells the zone controller to run the motor at a specified speed given in millimeters per second; e.g. for a speed of 56.7 cps the value would be 567. The execution of this command may be triggered in the same manner as a SET_PROFILE command; i.e. the 'Execution trigger' field can have the same values as given in the SET_PROFILE description.

2.12 SET_PROFILE_PARAM

The SET_PROFILE_PARAM message resets the current profile duration, a0, and a1 parameters to the specified values indicated by the CAN message.

2.13 GET_PROFILE_PARAM

The GET_PROFILE_PARAM message requests from the zone controller its significant parameters values.

2.14 PROFILE_PARAM_RESP

The PROFILE_PARAM_RESP is sent following a GET_PROFILE_PARAM. This message contains significant values to the requested profile.

2.15 SET_PROFILE

The SET_PROFILE message tells a zone controller which motor profile to execute and optionally when this profile should begin execution.

2.16 ZONE_STATUS

A ZONE_STATUS message is sent by the zone controller in response to a CONTROLLER_STATUS_REQUEST command.

3.1 Handshake Controller

3.1.1 BUSY_SET

This is a response message to the CLC indicating that the E23 busy line has been set.

3.1.2 COMPLETE_HANDSHAKE

This command from the CLC commands the controller to complete (i.e. terminate) the handshake currently in progress

3.1.3 HANDSHAKE_COMPLETE

This message is sent by the controller once it has successfully completed the handshake in progress.

3.1.4 INITIATE_HANDSHAKE

This command is sent from the CLC to instruct the controller to establish a handshake with the load port or other connected device.

3.1.5 LP_INIT_LOAD_REQ

This message is sent by the controller to the CLC whenever it detects that the load port or other connected device has begun requesting it be loaded with new material.

3.1.6 LP_UNLOAD_REQ

This message is sent by the controller to the CLC whenever it detects that the load port or other connected device has begun requesting that the current material be unloaded from it and onto the conveyor.

3.1.7 SET_BUSY

This command is sent from the CLC to the controller to instruct the controller to set the busy line to the connected device, indicating that a transfer is in progress.

3.2 Axis Controller Messages/Events

3.2.1 AXIS_STATUS

Requst status information from the axis controller.

3.2.1.1 DEFINE_LOCATION

This message is sent from the CLC to the axis controller to define the current position of the axis as a specified location. Subsequent GOTO commands may be issued to move to this position.

3.2.2 FIND_HOME

The FIND_HOME command is sent to cause the rotator to search for its home position sensor.

3.2.3 FIND_POSITION

The FIND_POSITION command would be sent by the CLC if the current position of the axis is unknown. This could happen as a result of a power failure during rotation such that the axis is in between sensors. The CLC must specify the motor direction to be used first in attempting to find the position. The total distance to travel may be specified. FIND_POSITIONS. The FIND_POSITIONS command will search for the number of positions previously defined. The axis must be in the home position prior to execution of the command.

3.2.4 GOTO

The GOTO command will cause the rotation controller to move to the specified sensor position from its current known position. The rotation controller will calculate the number of microsteps it needs to move, ramp up to top speed, cruise, and ramp down to creep speed, and hunt for the sensor (hopefully, it will stop directly on the sensor so no hunting is required).

3.2.5 MOTOR_IS_OFF

This message is sent whenever the motor is turned off, either by explicit command or the end of a profile.

3.2.6 MOTOR_OFF

This message is sent to immediately turn off the motor.

3.2.7 MOVE_N

This command moves the director a specified distance (in 1/10 millimeter increments). The format is identical to the zone controller's MOVE_N (Data has a different meaning).

3.2.8 MOVE_N_DONE

Sent upon completion of a MOVE_N. Format identical to that of zone controller.

3.2.9 POSITION_REQUEST

This message requests the sensors defined as position sensors be read and reported back.

3.2.10 POSITION_RESPONSE

This message is sent in response to the POSITION_REQUEST. The state of the position sensors will be reported back in a bit mapped field (to allow for fault cases in which multiple sensors read closed).

What is claimed is:

1. A distributed method for routing material from a source to a destination in a material transport system including track zones and directors connecting the track zones, wherein the directors include routing tables that store routing information for a plurality of routes across the material transport system to a destination, the method comprising:

launching the material from the source;

if the material enters a track neighborhood that includes a director through which the material must pass to proceed to the destination, notifying the director;

the director, in response to the notifying, selecting an optimal route for the material based on the destination and stored routing information indicating for each material transport system destination a director exit angle and a route metric characterizing quality of a path to the destination originating from the director exit angle;

the director subsequently decelerating the material, rotating to the director exit angle associated with the optimal route and relaunching the material along the optimal route; and automatically modifying said stored routing information to accommodate the addition of a new destination to the material transport system, said new destination announcing its presence to its immediate upstream neighbor using an announce message including an announce metric.

2. The distributed method of claim 1, wherein the route metric is a function of at least one of:

route length;

route transit time; and route congestion.

3. The distributed method of claim 1, wherein said step of automatically modifying comprises the steps, in response to the announce message, of:

(a) if the immediate upstream neighbor is a track zone, the track zone increments the announce metric and resends the announce message with the updated metric to an immediate upstream neighbor of the track zone;

(b) the immediate upstream neighbor is a first director, the first director increments the announce metric, stores the announce metric along with the exit angle and identity of the new destination and returns a registered message informing the new destination that it has been registered.

4. The distributed method of claim 3, further comprising, when the immediate upstream neighbor is the first director:

the first director announces the new destination to adjacent directors with route announce messages indicating a cumulative metric representing the metric from the first director to the new destination and the metric between the first director and respective ones of the adjacent directors;

repeating an operation wherein each of the adjacent directors updates their stored information for an appropriate exit angle with the cumulative metric and resends the route announce message to their adjacent directors until the route announce message arrives back at the first director.

5. The distributed method of claim 1, wherein the stored information for each of the routes comprises:

the destination;

the exit direction;

whether the route is direct, meaning there are no intervening directors, or via, meaning there is at least one intervening director;

the metric characterizing goodness of the route; and the route status.

6. The distributed method of claim 1, further comprising:

when the material comprises two or more material units moving in one neighborhood in need of routing through the director, the track zones cooperatively route the material units to the director so there is no possibility of a collision between the material units and the material units continue to move forward at optimal speeds.

7. The distributed method of claim 1, wherein the track zones are unidirectional, further comprising:

configuring the transport system for bidirectional movement within one neighborhood by:

arranging a subset of the directors in a director cluster of two or more directors;

enabling exit angles for each of the directors in the director cluster to permit the material moving in one direction on a first unidirectional track zone segment in the neighborhood to be turned using two or more of the directors in the director cluster onto a second unidirectional track zone segment for movement in another direction in the neighborhood.

8. The distributed method of claim 7, wherein the director cluster comprises a number of directors selected to prevent deadlock conditions where one or more material unit needing to move through the director cluster are prevented from moving due to each others presence in vicinity of the director cluster.

* * * * *